(12) United States Patent
Komma et al.

(10) Patent No.: US 8,441,907 B2
(45) Date of Patent: *May 14, 2013

(54) COMPLEX OBJECTIVE LENS INCLUDING SAW-TOOTH DIFFRACTIVE ELEMENT FOR USING ON BLUE, RED AND INFRARED LIGHTS

(75) Inventors: Yoshiaki Komma, Osaka (JP); Toshiyasu Tanaka, Osaka (JP); Fumitomo Yamasaki, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,465

(22) Filed: Jul. 26, 2012

(65) Prior Publication Data

US 2012/0314558 A1   Dec. 13, 2012

Related U.S. Application Data

(63) Continuation of application No. 12/671,634, filed as application No. PCT/JP2008/002094 on Aug. 1, 2008, now Pat. No. 8,254,239.

(30) Foreign Application Priority Data

Aug. 2, 2007 (JP) .................. 2007-201624
Aug. 31, 2007 (JP) .................. 2007-225561

(51) Int. Cl.
*G11B 7/00* (2006.01)
(52) U.S. Cl.
USPC ........ 369/112.08; 359/15; 359/566; 359/571; 359/629; 369/112.26

(58) Field of Classification Search ............. 369/112.08, 369/112.01–112.07, 44.11, 44.32; 359/5, 359/566, 571, 569, 629, 637
See application file for complete search history.

(56) References Cited

U.S. PATENT DOCUMENTS

| 4,829,508 A | 5/1989 | Arita |
| 5,657,303 A | 8/1997 | Namoto et al. |

(Continued)

FOREIGN PATENT DOCUMENTS

| JP | 05-114154 | 5/1993 |
| JP | 08-335327 | 12/1996 |

(Continued)

OTHER PUBLICATIONS

Co-pending U.S. Appl. No. 12/671,634, filed Feb. 1, 2010.

(Continued)

*Primary Examiner* — Tan X Dinh
(74) *Attorney, Agent, or Firm* — Renner, Otto, Boisselle & Sklar, LLP

(57) ABSTRACT

In an optical head device which performs recording/reading of data in/from a high-density optical disc using an objective lens with a large NA, a saw-tooth shape diffraction element is used for also performing recording/reading of data in/from a conventional optical disc, such as DVD, CD, or the like. A step difference that produces an optical path length for blue light which is equal to or longer than the wavelength of the blue light and optical path lengths for red and infrared light which are shorter than the wavelengths of the red and infrared light is utilized so as to exert an inverse action on the blue light to those exerted on the red and infrared light. The effect of increasing the working distances for CD and DVD enables multiple compatibility. The optical element is integrally combined with the objective lens to perform a tracking servo following operation.

30 Claims, 33 Drawing Sheets

U.S. PATENT DOCUMENTS

| | | | |
|---|---|---|---|
| 6,201,780 B1 | 3/2001 | Katayama | |
| 6,449,095 B1 | 9/2002 | Ohtaki et al. | |
| 7,433,290 B2 | 10/2008 | Komma | |
| 7,920,310 B2 | 4/2011 | Komma | |
| 2001/0000135 A1 | 4/2001 | Mori et al. | |
| 2002/0012313 A1 | 1/2002 | Kimura et al. | |
| 2003/0072246 A1 | 4/2003 | Nishiwaki et al. | |
| 2003/0095334 A1* | 5/2003 | Kim et al. | 359/637 |
| 2003/0227858 A1 | 12/2003 | Komma | |
| 2004/0109242 A1 | 6/2004 | Komma | |
| 2004/0170106 A1 | 9/2004 | Komma | |
| 2004/0257958 A1 | 12/2004 | Kimura et al. | |
| 2005/0152036 A1 | 7/2005 | Shiono et al. | |
| 2005/0237900 A1* | 10/2005 | Sano et al. | 369/112.08 |
| 2006/0062103 A1 | 3/2006 | Ogiwara et al. | |
| 2006/0146422 A1 | 7/2006 | Koike | |
| 2006/0158990 A1 | 7/2006 | Hineno | |
| 2007/0177483 A1* | 8/2007 | Kurogama et al. | 369/112.05 |
| 2008/0267046 A1 | 10/2008 | Komma | |
| 2008/0310284 A1* | 12/2008 | Takada et al. | 369/112.07 |
| 2009/0009886 A1* | 1/2009 | Nishiwaki et al. | 359/719 |
| 2009/0010142 A1 | 1/2009 | Komma | |
| 2009/0034398 A1 | 2/2009 | Kaneda et al. | |
| 2010/0142356 A1* | 6/2010 | Sano et al. | 369/112.13 |
| 2010/0220578 A1* | 9/2010 | Yamasaki et al. | 369/112.23 |
| 2012/0023514 A1 | 1/2012 | Komma et al. | |

FOREIGN PATENT DOCUMENTS

| | | |
|---|---|---|
| JP | 10-188314 | 7/1998 |
| JP | 63-142014 | 9/1998 |
| JP | 10-312565 | 11/1998 |
| JP | 10-334504 | 12/1998 |
| JP | 2000-298859 | 10/2000 |
| JP | 2004-071134 | 3/2004 |
| JP | 2004-281034 | 10/2004 |
| JP | 2005-038575 | 2/2005 |
| JP | 2005-209321 A | 8/2005 |
| JP | 2006-092720 | 4/2006 |
| JP | 2006-209931 | 8/2006 |
| JP | 2009-245575 A | 10/2009 |
| WO | 2006/040902 A1 | 4/2006 |

OTHER PUBLICATIONS

International Search Report for corresponding International Application No. PCT/JP2008/002094 dated Oct. 28, 2008.

Form PCT/IPEA/416/409 and a partial English translation for corresponding International Application No. PCT/JP2008/002094 dated Jun. 30, 2009.

Ryuichi Katayama et al., "Blue/DVD/CD-Compatible Optical Head With Three Wavelengths and a Wavelength Selective Filter", ISOM2001, Oct. 16-19, 2001, Session We-C-05, Preceedings, p. 30-31.

S. Nishioka et al., "BD/DVD/CD Compatible Optical Pick-up Technology", 27p-ZW-10, The 50th Spring Meeting, 2003, The Japan Society of Applied Physics and Related Societies, published in 2003, Extended Abstracts with a partial English Translation.

Notice of Reasons for Rejection for corresponding Japanese Application No. 2011-106278 issued on Feb. 19, 2013.

Notice of Reasons for Rejection for corresponding Japanese Application No. 2011-195094 issued on Feb. 19, 2013.

* cited by examiner

ONE STEP (um)
8-LEVEL DIFFRACTION
EFFICIENCY

9-LEVEL DIFFRACTION EFFICIENCY

ONE STEP (um)
6-LEVEL DIFFRACTION
EFFICIENCY

FIG.30
(a)
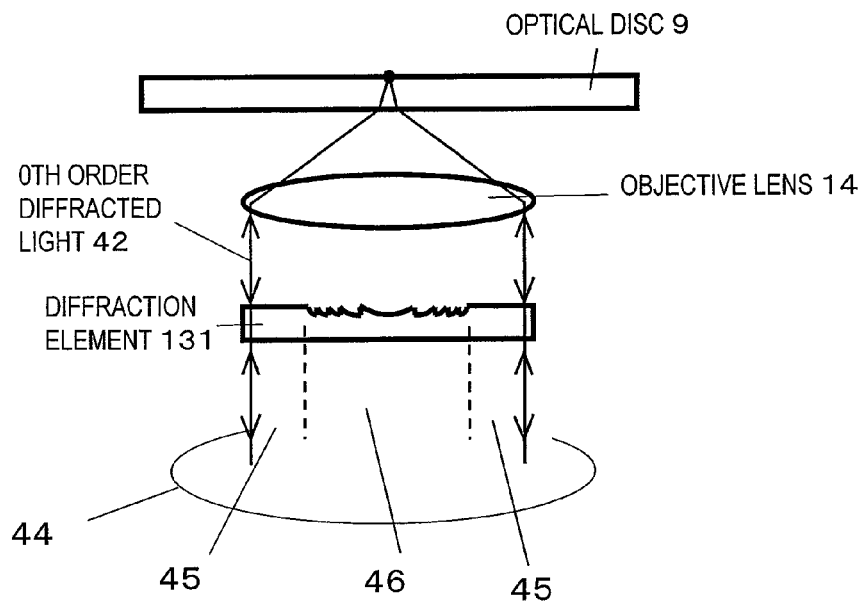
(b)
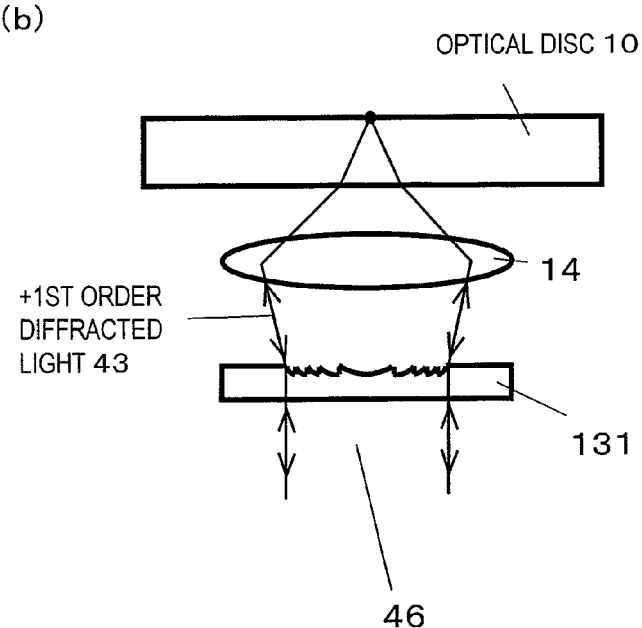

COMPLEX OBJECTIVE LENS INCLUDING SAW-TOOTH DIFFRACTIVE ELEMENT FOR USING ON BLUE, RED AND INFRARED LIGHTS

TECHNICAL FIELD

The present invention relates to an optical element which is used for recording and/or reading of data in/from optical data media, such as optical discs, and to control of the tilt of an objective lens.

BACKGROUND ART

Optical memory technology employing an optical disc with a pit pattern as a high-density and large-capacity storage medium has been put to practical use while expanding its uses to digital audio discs, video discs, document file discs, and data file discs. Functions which are necessary for successfully carrying out recording and reading of data in/from an optical disc with a high reliability, by using finely-condensed laser light, are generally classified into: a converging function of forming a diffraction-limited light spot; a focal point control (focus servo) function and a tracking control (tracking servo) function of an optical system; and a pit signal (data signal) detection function.

In recent years, advancement of optical system designing techniques and shortened wavelengths of semiconductor laser devices as light sources have enhanced development of optical discs which have higher recording densities and larger storage capacities than conventional optical discs. One of the approaches which are currently studied for higher densities is increasing the numerical aperture (NA) of a light-condensing optical system which is employed for forming a very small spot of condensed laser light on an optical disc. A disadvantage of this approach is increase in the amount of aberration caused due to the inclination (so-called "tilt") of the optical axis. As the NA is increased, the amount of aberration caused due to the tilt increases. This can be avoided by decreasing the base layer thickness of a substrate of an optical disc, i.e., the thickness of a transparent cover layer.

Compact Discs (CD), which are so-called first-generation optical discs, are used with infrared light (wavelength $\lambda 3$: 780 nm to 820 nm) and an objective lens of NA=0.45, and have the disc base layer thickness of 1.2 mm. DVDs (Digital Versatile Discs) of the second generation are used with red light (wavelength $\lambda 2$: 630 nm to 680 nm, typical wavelength: 650 nm) and an objective lens of NA=0.6, and have the disc base layer thickness of 0.6 mm. The third-generation optical discs (Blu-ray Discs) are used with blue light (wavelength $\lambda 1$: 390 nm to 415 nm, typical wavelength: 405 nm) and an objective lens of NA=0.85, and have the disc base layer thickness of 0.1 mm.

In this specification, the base layer thickness (substrate thickness) refers to a thickness from a laser light entry surface to a data layer of an optical disc which is a data medium.

As described above, the base layer thickness of the high-density optical discs is small. In view of economies and the space occupied by an apparatus, an optical data apparatus is desirable which is capable of recording and reading data in/from a plurality of types of optical discs having different base layer thicknesses and different recording densities. Such an apparatus cannot be realized without an optical head device which includes a light-condensing optical system capable of condensing laser light to the diffraction limit on optical discs of different base layer thicknesses.

In the case where data is recorded in or read from a disc which has a greater base layer thickness, it is necessary to condense laser light on a data layer which is at a deeper level than the disc surface. Therefore, it is necessary to increase the focal length.

A configuration designed for the purpose of realizing multiple compatibility reading or multiple compatibility recording in/from an optical disc having a base layer thickness of 0.6 mm with applicable wavelength $\lambda 2$ (red light) and an optical disc having a base layer thickness of 0.1 mm with applicable wavelength $\lambda 1$ (blue light) has been proposed. Patent Document 1 and Non-patent Document 1 disclose configurations in which a wavelength selecting phase plate is combined with an objective lens. This configuration is described with reference to FIG. 37 and FIG. 38.

FIG. 37 shows a configuration of an optical head device. Collimated light emitted from a blue light optical system 51 which includes a blue light source of emission wavelength $\lambda 1 = 405$ nm is transmitted through a beam splitter 161 and a wavelength selecting phase plate 205, and condensed by an objective lens 50 on a data layer of an optical disc 9 (third-generation optical disc) which has a base layer thickness of 0.1 mm. Light reflected by the optical disc 9 returns the path it has come and is detected by a detector of the blue light optical system 51. Divergent light emitted from emitted from a red light optical system 52 which includes a red light source of emission wavelength $\lambda 2 = 650$ nm is reflected by the beam splitter 161, transmitted through the wavelength selecting phase plate 205, and condensed by the objective lens 50 on a data layer of an optical disc 10 (second-generation optical disc: DVD) which has a base layer thickness of 0.6 mm. Light reflected by the optical disc 10 returns the path it has come and is detected by a detector of the red light optical system 52.

The objective lens 50 is designed such that collimated light incident thereon is condensed via the base layer thickness of 0.1 mm. In the case of recording or reading of data in/from a DVD, a spherical aberration is caused by a difference in base layer thickness. To correct this spherical aberration, the laser light emitted from the red light optical system 52 is divergent light, and the wavelength selecting phase plate 205 is used. When the divergent light enters the objective lens 50, another spherical aberration occurs. The spherical aberration caused by the difference in base layer thickness is canceled by this another spherical aberration, while the wavefront is corrected by the wavelength selecting phase plate 205.

FIG. 38(*a*) is a plan view of the wavelength selecting phase plate 205. FIG. 38(*b*) is a side view of the wavelength selecting phase plate 205. The wavelength selecting phase plate 205 is formed by a phase step structure 205*a* which has heights h and 3h where $h=\lambda 1/(n1-1)$ and n1 is the refractive index for wavelength $\lambda 1$. The optical path difference for light at wavelength $\lambda 1$ which is caused by height h is equal to wavelength $\lambda 1$, which corresponds to phase difference of $2\pi$. Therefore, it is equivalent to the phase difference of 0. Thus, this element does not affect the phase distribution and does not affect recording or reading of data in/from the optical disc 9. On the other hand, as for the light at wavelength $\lambda 2$, the wavelength selecting phase plate 205 generates the optical path difference of $h/\lambda 2 \times (n2-1) \approx 0.6\lambda$ where n2 is the refractive index of the wavelength phase plate 205 for wavelength $\lambda 2$, i.e., the optical path difference which is not an integral multiple of wavelength $\lambda 2$. The phase difference caused by this optical path difference is utilized for the above-described correction of the aberration.

Patent Document 2 discloses a configuration in which a refractive objective lens and a diffraction element are combined. In this example, in an optical head device which performs recording or reading of data in/from a high-density optical disc using an objective lens of a large NA, a saw-tooth shape diffraction element is used for recording or reading of data in/from a conventional type optical disc, such as a DVD. The height of the saw-tooth for blue light is equal to optical path length 2λ, and the 2nd order diffracted light is used. In the red light, the 1st order diffraction occurs. Blazing direction is a convex lens shape, and the chromatic aberration of a refractive lens is corrected. In this case, the red light has a lower diffraction order, and therefore, a concave lens action is relatively exerted, so that the working distance can advantageously be increased.

Patent Document 2 also discloses a configuration wherein the cross-sectional shape of the grating is a stepped shape, one step difference of the stepped cross-sectional shape is an integral multiple of the unit step difference, and the unit step difference provides the first laser light at wavelength λ1 with the optical path difference which is equal to about 1.25 times the wavelength. This configuration is shown in FIG. 39(a).

Wavelength λ1 is from 390 nm to 415 nm. The shape of the grating for one period is a stepped shape wherein the steps sequentially have heights equals to multiples of step difference d1 by factors of 0, 1, 2, and 3 from the outer perimeter side to the optical axis side of the diffraction element. The grating changes the phase of the blue light in the same direction as that of the grating shape as shown in FIG. 39(b) so as to exert a convex lens action on the blue light. The grating changes the phase of the red light in the opposite direction to that of the grating shape as shown in FIG. 39(c) so as to exert a concave lens action on the red light. Therefore, to the blue light, the grating provides the effect of correcting the chromatic aberration caused by the refractive lens. At the same time, as for the red light, the effect of increasing the working distance (the space between the objective lens surface and the optical disc surface) by means of a concave lens action is achieved.

Patent Document 3 proposes that a relay lens is interposed between an infrared light source and an objective lens to achieve multiple compatibility using infrared light (wavelength λ3: 780 nm to 820 nm) and the objective lens of NA 0.45, with first-generation optical discs having a base layer thickness of 1.2 mm and with optical discs of different types.

Next, disc tilt solutions are described. Patent Document 4 proposes tilting an objective lens as a solution to a disc tilt. This is described with reference to FIG. 40. The outputs of a photodetection region 263 and a photodetection region 264 of a two-division photodetector 262 are calculated by a differential amplifier 265. The resultant signal is converted to a digital signal by an A/D converter 266. The digital signal is processed by an arithmetic processing unit 267. The resultant signal is converted by a D/A converter 268 to an analog signal. Based on the analog signal, a driver circuit 269 drives an actuator 270 to tilt an unshown objective lens. An example of the actuator and the objective lens is disclosed in Patent Document 5 and is herein described with reference to FIG. 41. Currents If1 and If2 which depend on focus error signals flow through focusing coils 201 and 202, respectively. The magnetic fields generated by these currents are received by a magnet 204, so that a lens holder 203 on which an objective lens 206 is mounted moves up and down. By controlling the magnitudes of currents If1 and If2, the lens holder 203 and the objective lens 206 are tilted right and left in the drawing.

Next, a decreased thickness of the base layer of high-density optical discs, which is different from the base layer thicknesses of low-density optical discs, and different optimum numerical apertures are considered. In view of economies and the space occupied by an apparatus, an optical data apparatus is desirable which is capable of recording and reading data in/from a plurality of types of optical discs which have different base layer thicknesses and different recording densities. Such an apparatus cannot be realized without an optical head device which includes a light-condensing optical system capable of condensing laser light to the diffraction limit using different numerical apertures on optical discs of different base layer thicknesses.

[Patent Document 1] Japanese Laid-Open Patent Publication No. H10-334504
[Patent Document 2] Japanese Laid-Open Patent Publication No. 2004-071134
[Patent Document 3] Japanese Laid-Open Patent Publication No. 2004-281034
[Patent Document 4] Japanese Laid-Open Patent Publication No. H10-312565
[Patent Document 5] Japanese Laid-Open Patent Publication No. H5-114154
[Non-patent Document 1] ISOM2001 Session We-C-05 (Precedings, page 30)

DISCLOSURE OF INVENTION

Problems to be Solved by the Invention

Patent Documents 1 and 2 each only disclose how to establish multiple compatibility with second-generation optical discs (hereinafter, referred to as "DVD") which is used with red light (wavelength λ2: 630 nm to 680 nm) and an objective lens of NA 0.6 and which have the base layer thickness of 0.6 mm and with third-generation optical discs (hereinafter, referred to as "BD") which is used with blue light (wavelength λ1: 390 nm to 415 nm) and an objective lens of NA 0.85 and which have the base layer thickness of 0.1 mm. Patent Document 3 discloses how to establish multiple compatibility with first-generation optical discs (hereinafter, referred to as "CD") which is used with infrared light (wavelength λ3: 780 nm to 820 nm) and an objective lens of NA 0.45 and which have the base layer thickness of 1.2 mm and with other types of optical discs. However, a relay lens is necessary.

The present invention provides a complex objective lens compatible with CD, DVD, and BD.

Means for Solving the Problems

A complex objective lens of the present invention is a complex objective lens including: a diffraction element; and a refractive lens, wherein the diffraction element includes a first grating, a cross-sectional shape of the first grating is a stepped shape where one step difference is $d_1$, the one step difference $d_1$ is a value between a largest one and a smallest one among multiples of $(J \times \lambda_1)$, $(K \times \lambda_2)$, and $(L \times \lambda_3)$ by a factor of $1/(M \times (nc-1))$, and $(J \times \lambda_1)$, $(K \times \lambda_2)$, and $(L \times \lambda_3)$ are substantially equal where J, K, L, M are natural numbers which meet $J > M > K > L$, M is a number of step levels in one period of the first grating, and nc is a value between a largest one and a smallest one among refractive indices of a material of the diffraction element for blue light at wavelength $\lambda_1$, red light at wavelength $\lambda_2$, and infrared light at wavelength $\lambda_3$.

A complex objective lens of the present invention is a complex objective lens including: a diffraction element; and a refractive lens, wherein the diffraction element includes a first grating, a cross-sectional shape of the first grating is a stepped shape where one step difference is $d_1$, the one step difference $d_1$ is a value between a largest one and a smallest one among multiples of $(J \times \lambda_1)/(nb-1)$, $(K \times \lambda_2)/(nr-1)$, and $(L \times \lambda_3)/(ni-1)$ by a factor of $1/M$, and $(J \times \lambda_1)/(nb-1)$, $(K \times \lambda_2)/(nr-1)$, and $(L \times \lambda_3)/(ni-1)$ are substantially equal where J, K, L, M are natural numbers which meet J>M>K>L, M is a number of step levels in one period of the first grating, and nb, nr, and ni are refractive indices of a material of the diffraction element for blue light at wavelength λ1, red light at wavelength λ2, and infrared light at wavelength λ3, respectively.

In one embodiment, the one step difference d1 of the first grating provides the blue light with an optical path difference equal to about 1.25 times the wavelength of the blue light, provides the red light with an optical path difference equal to about 0.75 times the wavelength of the red light, and provides the infrared light with an optical path difference equal to about 0.62 times the wavelength of the infrared light, and the number of step levels in one period of the first grating is 8.

In one embodiment, the first grating is configured such that a diffraction efficiency for a 1st order diffraction of the blue light is 50% or higher, a diffraction efficiency for a 2nd order diffraction of the red light is 50% or higher, a diffraction efficiency for a 3rd order diffraction of the infrared light is 50% or higher, and polarities of the 2nd order diffraction and the 3rd order diffraction are opposite to that of the 1st order diffraction.

In one embodiment, the first grating is configured such that a diffraction efficiency for +2nd order diffracted light of the blue light is 50% or higher, a diffraction efficiency for −2nd order diffracted light of the red light is 50% or higher, and a diffraction efficiency for −3rd order diffracted light of the infrared light is 50% or higher.

In one embodiment, the diffraction element includes a first region, and a second region which is more distant from an optical axis of the diffraction element than the first region is, and the first grating is provided in the first region.

In one embodiment, a second grating is provided in the second region, a cross-sectional shape of the second grating is a stepped shape, one step difference of the stepped shape of the second grating provides the blue light with an optical path difference equal to about 1.25 times the wavelength of the blue light, and a number of step levels in one period of the second grating is 4.

In one embodiment, the diffraction element further includes a third region which is more distant from the optical axis of the diffraction element than the second region is, a third grating is provided in the third region, and a diffraction efficiency of the third grating for a predetermined diffraction order of the blue light is higher than a diffraction efficiency for any other diffraction order of the blue light which is different from the predetermined diffraction order, higher than a diffraction efficiency for a predetermined diffraction order of the red light, and higher than a diffraction efficiency for a predetermined diffraction order of the infrared light.

In one embodiment, the diffraction element further includes a third region which is more distant from the optical axis of the diffraction element than the second region is, a third grating is provided in the third region, a cross-sectional shape of the third grating is a stepped shape, one step difference of the third grating provides the blue light with an optical path difference equal to about 0.25 times the wavelength of the blue light, and a number of step levels in one period of the third grating is 4.

In one embodiment, the diffraction element further includes a third region which is more distant from the optical axis of the diffraction element than the second region is, a third grating is provided in the third region, a cross-sectional shape of the third grating is a saw-tooth shape, and the saw-tooth shape has a height which provides the blue light with an optical path difference equal to the wavelength of the blue light.

In one embodiment, the blue light undergoes a convex lens action of the diffraction element, and the red light and the infrared light undergo a concave lens action of the diffraction element.

In one embodiment, a focal length for the red light is longer than a focal length for the blue light, and a focal length for the infrared light is longer than a focal length for the red light.

In one embodiment, the complex objective lens is configured to converge light on a first data layer of a first data medium which has a first transparent portion, on a second data layer of a second data medium which has a second transparent portion, the second transparent portion having a larger thickness than the first transparent portion, and on a third data layer of a third data medium which has a third transparent portion, the third transparent portion having a larger thickness than the second transparent portion, to converge the blue light transmitted through the first, second, and third regions on the first data layer via the first transparent portion, to converge the red light transmitted through the first and second regions on the second data layer via the second transparent portion, and to converge the infrared light transmitted through the first region on the third data layer via the third transparent portion.

In one embodiment, the complex objective lens is configured to converge light on a first data layer of a first data medium which has a first transparent portion, on a second data layer of a second data medium which has a second transparent portion, the second transparent portion having a larger thickness than the first transparent portion, and on a third data layer of a third data medium which has a third transparent portion, the third transparent portion having a larger thickness than the second transparent portion, and the first region is configured to converge the blue light transmitted therethrough on the first data layer via the first transparent portion, converge the red light transmitted therethrough on the second data layer via the second transparent portion, and converge the infrared light transmitted therethrough on the third data layer via the third transparent portion, the second region is configured to converge the blue light transmitted therethrough on the first data layer via the first transparent portion, and converge the red light transmitted therethrough on the second data layer via the second transparent portion, and the third region is configured to converge the blue light transmitted therethrough on the first data layer via the first transparent portion.

In one embodiment, the diffraction element is provided in an optical element other than the refractive lens.

In one embodiment, one surface of the optical element is a flat surface; and the diffraction element is provided on the flat surface of the optical element.

In one embodiment, one surface of the optical element is a concaved surface; and the diffraction element is provided on the concaved surface of the optical element.

In one embodiment, the diffraction element is provided on a surface of the objective lens.

A diffraction element of the present invention is a diffraction element which is to be combined with a refractive lens to constitute a complex objective lens, the diffraction element including a first grating, wherein a cross-sectional shape of the first grating is a stepped shape where one step difference is d1, the one step difference d1 is a value between a largest one and a smallest one among multiples of (J×λ1), (K×λ2), and (L×λ3) by a factor of 1/(M×(nc−1)), and (J×λ1), (K×λ2), and (L×λ3) are substantially equal where J, K, L, M are natural numbers which meet J>M>K>L, M is a number of step levels in one period of the first grating, nc is a value between a largest one and a smallest one among refractive indices of a material of the diffraction element for blue light at wavelength λ1, red light at wavelength λ2, and infrared light at wavelength λ3.

A diffraction element of the present invention is a diffraction element which is to be combined with a refractive lens to constitute a complex objective lens, the diffraction element including a first grating, wherein a cross-sectional shape of the first grating is a stepped shape where one step difference is d1, the one step difference d1 is a value between a largest one and a smallest one among multiples of (J×λ1)/(nb−1), (K×λ2)/(nr−1), and (L×λ3)/(ni−1) by a factor of 1/M, and (J×λ1)/(nb−1), (K×λ2)/(nr−1), and (L×λ3)/(ni−1) are substantially equal where J, K, L, M are natural numbers which meet J>M>K>L, M is a number of step levels in one period of the first grating, nb, nr, and ni are refractive indices of a material of the diffraction element for blue light at wavelength λ1, red light at wavelength λ2, and infrared light at wavelength λ3, respectively.

In one embodiment, the one step difference d1 of the first grating provides the blue light with an optical path difference equal to about 1.25 times the wavelength of the blue light, provides the red light with an optical path difference equal to about 0.75 times the wavelength of the red light, and provides the infrared light with an optical path difference equal to about 0.62 times the wavelength of the infrared light, and the number of step levels in one period of the first grating is 8.

An optical head device of the present invention is an optical head device which includes the above-described complex objective lens, the optical head device including: a first light source configured to emit blue light at wavelength λ1; a second light source configured to emit red light at wavelength λ2; and a third light source configured to emit infrared light at wavelength λ3; wherein the complex objective lens is configured to condense the blue light emitted from the first light source on a data layer of a first data medium via a base layer of thickness t1, condense the red light emitted from the second light source on a data layer of a second data medium via a base layer of thickness t2, and condense the infrared light emitted from the third light source on a data layer of a third data medium via a base layer of thickness t3, and the optical head device further includes a photodetection section which is configured to receive reflected light from the first, second, and third data media and output an electric signal according to an amount of the received light, and t1<t2<t3.

An optical data device of the present invention includes: the above-described optical head device; a motor for spinning the first, second, and third data media; and an electric circuit for controlling and driving the motor, the complex objective lens, and the first, second, and third light sources based on a signal obtained from the optical head device.

An optical data device of the present invention includes: a light source for emitting laser light; an objective lens for converging the laser light emitted from the light source on a data medium; an actuator for adjusting a tilt of the objective lens; a photodetection section configured to receive laser light reflected by the data medium and output an electric signal according to an amount of the received light; and a control section for controlling an operation of the actuator based on the electric signal output by the photodetection section, wherein if a position of the objective lens is in a region of the data medium on an inner perimeter side, the actuator holds the objective lens generally horizontal without performing a tilt correction operation, and if the position of the objective lens is in a region of the data medium on an outer perimeter side, the actuator tilts the objective lens according to a tilt of the data medium.

In one embodiment, if a position of the objective lens is between a center of the data medium and a radial position R0 on the data medium, the actuator holds the objective lens generally horizontal without performing a tilt correction operation, and if the position of the objective lens is outer than the position R0, the actuator tilts the objective lens according to the tilt of the data medium.

In one embodiment, the position R0 is a position distant from the center of the data medium by a distance not less than 25 mm and not more than 35 mm.

In one embodiment, the objective lens is configured to converge the laser light on data layers of plural types of data media which have different base layer thicknesses, if the objective lens is at a position in a region on the inner perimeter side of one of the plural types of data media which has a greater base layer thickness, the actuator holds the objective lens generally horizontal without performing a tilt correction operation, and if the objective lens is at a position in a region on the outer perimeter side of the data medium which has a greater base layer thickness, the actuator tilts the objective lens according to the tilt of the data medium which has a greater base layer thickness.

In one embodiment, if a position of the objective lens is in a special-purpose region of the data medium, the actuator holds the objective lens generally horizontal without performing a tilt correction operation, and if the position of the objective lens is outside the special-purpose region of the data medium, the actuator tilts the objective lens according to the tilt of the data medium.

In one embodiment, the special-purpose region is any of the followings: a region for test recording; a region in which data describing specifications of the data medium is stored; a region for storing a type and attribute of recorded data; and a data region in which data for copyright protection is stored.

An objective lens actuating method of the present invention is an objective lens actuating method for actuating an objective lens included in an optical data device, the optical data device including a light source for emitting laser light, an actuator for adjusting a tilt of the objective lens, a photodetection section configured to receive laser light reflected by a data medium and output an electric signal according to an amount of the received light, and a control section for controlling an operation of the actuator based on the electric signal output by the photodetection section, the objective lens being configured to converge laser light emitted from the light source on the data medium, the objective lens actuating method including the steps of: holding the objective lens generally horizontal without performing a tilt correction operation if a position of the objective lens is in a region of the data medium on an inner perimeter side; and tilting the objective lens according to a tilt of the data medium if the position of the objective lens is in a region of the data medium on an outer perimeter side.

In one embodiment, if a position of the objective lens is between a center of the data medium and a radial position R0 on the data medium, the objective lens is held generally horizontal without performing a tilt correction operation, and if the position of the objective lens is outer than the position R0, the objective lens is tilted according to the tilt of the data medium.

In one embodiment, the objective lens is configured to converge the laser light on data layers of plural types of data media which have different base layer thicknesses, if the objective lens is at a position in a region on the inner perimeter side of one of the plural types of data media which has a greater base layer thickness, the objective lens is held generally horizontal without performing a tilt correction operation, and if the objective lens is at a position in a region on the outer perimeter side of the data medium which has a greater base layer thickness, the objective lens is tilted according to the tilt of the data medium which has a greater base layer thickness.

In one embodiment, if a position of the objective lens is in a special-purpose region of the data medium, the objective lens is held generally horizontal without performing a tilt correction operation, and if the position of the objective lens is outside the special-purpose region of the data medium, the objective lens is tilted according to the tilt of the data medium.

A controller of the present invention is a controller which is to be installed in an optical data device including a light source for emitting laser light, an objective lens for converging the laser light emitted from the light source on a data medium, an actuator for adjusting a tilt of the objective lens, and a photodetection section configured to receive laser light reflected by the data medium and output an electric signal according to an amount of the received light, the controller being configured to control an operation of the actuator based on the electric signal output by the photodetection section when installed in the optical data device, wherein if a position of the objective lens is in a region of the data medium on an inner perimeter side, the controller controls the actuator to hold the objective lens generally horizontal without performing a tilt correction operation, and if the position of the objective lens is in a region of the data medium on an outer perimeter side, the controller controls the actuator to tilt the objective lens according to a tilt of the data medium.

Effects of the Invention

According to the present invention, there is provided a complex objective lens capable of condensing infrared light, red light, and blue light on corresponding data media among CD, DVD, and BD. Thus, according to the present invention, there is provided a complex objective lens compatible with CD, DVD, and BD.

BRIEF DESCRIPTION OF DRAWINGS

[FIG. 30] (a) and (b) are diagrams showing an objective lens according to an embodiment of the present invention.

DESCRIPTION OF THE REFERENCE NUMERALS

| | |
|---|---|
| 1, 20 | laser light source |
| 3, 22 | 3-beam grating |
| 4, 16 | beam splitter |
| 5 | 1/4-wave plate |
| 6 | condensation lens |
| 7 | photodetector |
| 8 | collimator lens |
| 9, 10, 11 | optical disc |
| 131 | optical element |
| 14 | objective lens |
| 15 | actuating means |
| 32 | detector lens |
| 33 | photodetector |
| 72 | nonvolatile memory |
| 110 | complex objective lens |
| 151 | actuator of optical head device |
| 153 | electric circuit |
| 155 | optical head device |
| 181 | output device |
| 364 | arithmetic unit |
| 365 | keyboard (input device) |
| 366 | decoder |
| 167 | optical data device |
| 368 | encoder |
| 369 | input/output terminal |

BEST MODE FOR CARRYING OUT THE INVENTION (Embodiment 1)

Figure 1:
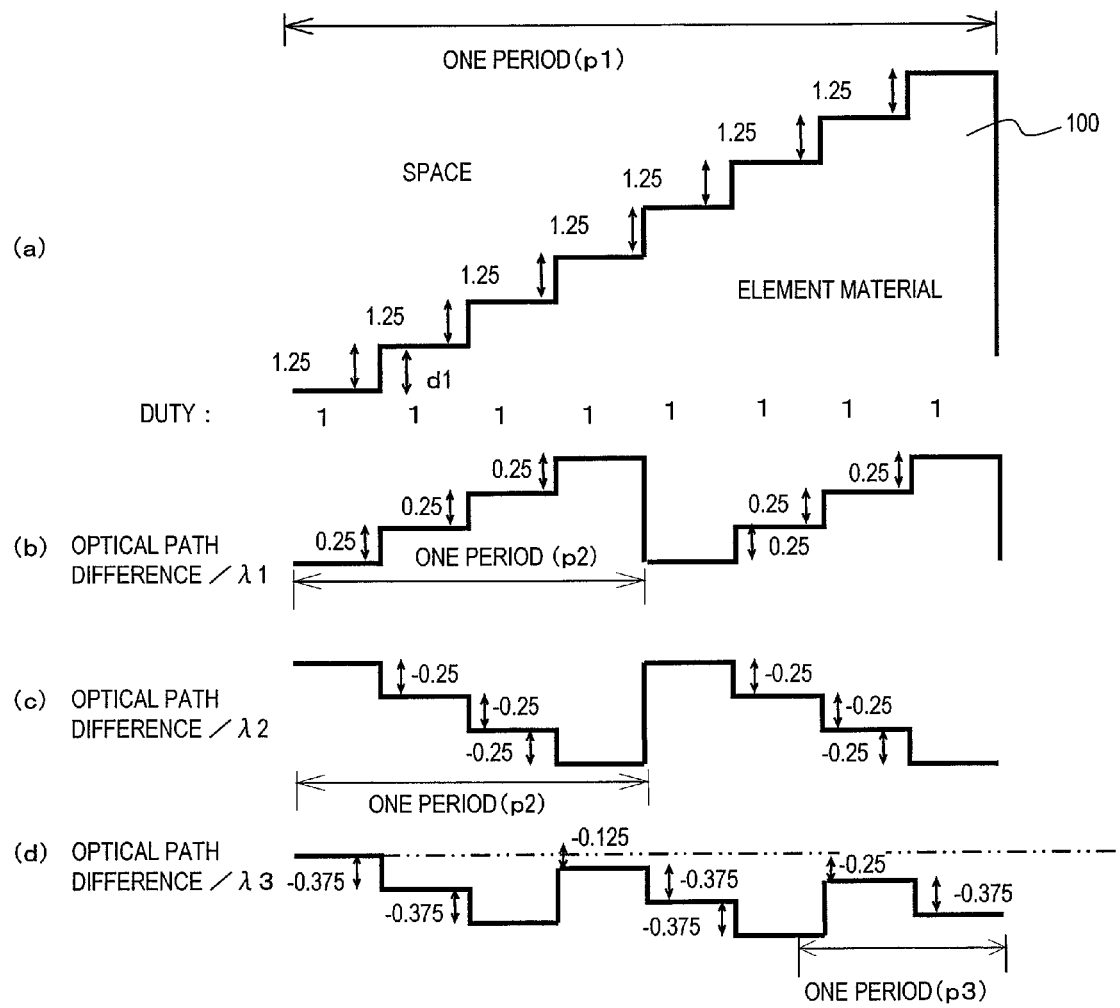
[FIG. 1] (a) is a diagram showing a cross-sectional shape of a diffraction element for one period according to an embodiment of the present invention. (b) is a diagram showing the phase modulation amount for blue light which is produced by the cross-sectional shape. (c) is a diagram showing the phase modulation amount for red light which is produced by the cross-sectional shape. (d) is a diagram showing the phase modulation amount for infrared light which is produced by the cross-sectional shape.

First, a shape of a diffraction element for one period according to embodiment 1 of the present invention, and the phase modulation amount produced by the shape of the diffraction element, are described with reference to FIG. 1. The diffraction element is a type of optical element and has a periodic structure.

FIG. 1(a) is a diagram showing a cross-sectional shape 100 of the diffraction element for one period. FIG. 1(a) shows a physical shape (cross-sectional shape 100) of a grating provided on a base. FIG. 1(b) shows the phase modulation amount for blue light which is produced by the cross-sectional shape 100. FIG. 1(c) shows the phase modulation amount for red light which is produced by the cross-sectional shape 100. FIG. 1(d) shows the phase modulation amount for infrared light which is produced by the cross-sectional shape 100.

The cross-sectional shape 100 shown in FIG. 1(a) is a cross-sectional shape of a diffraction element 131 (FIG. 15 to FIG. 17, FIG. 23, and FIG. 24) for one period. A complex objective lens 110 (FIG. 16, FIG. 23, and FIG. 24) includes the diffraction element 131 and an objective lens (refractive lens) 14. The complex objective lens 110 and a device including the lens 110 will be described later.

In FIG. 1(a), the vertical direction represents the thickness or height of the base along the optical axis direction. In the case where the material of the diffraction element is, for example, BK7, the refractive index of the material for blue laser light, nb, is 1.5302 (nb=1.5302). In the case of a polyolefin resin, for example, nb=1.522 approximately.

One step difference d1 has such an amount that the optical path difference for blue laser light is about 1.25 times the wavelength of the blue laser light, i.e., the phase difference is approximately $2\pi+\pi/2$. One step difference d1 is defined as unit step difference. For example, in the case where the base material is quartz, unit step difference d1 is expressed as follows:

$$d1=\lambda 1/(nb-1)\times 1.25=0.96 \ \mu m.$$

In the case where the base layer material is a resin, d1=0.97 μm.

FIG. 1(a) shows that the optical path difference provided by unit step difference d1 is equal to 1.25 times the blue wavelength λ1. Since the optical path difference provided by unit step difference d1 is equal to (the step difference)×(nb−1), 1.25 is a value obtained by dividing (the step difference)×(nb−1) by λ1. In FIG. 1(b), FIG. 1(c) and FIG. 1(d), it is simply represented as "optical path difference/wavelength", which means basically the same except that the integral part is omitted therefrom.

In the case where one step difference of the grating is d1, the phase modulation amount for the blue light which is produced by this shape is an integral multiple of $2\pi+\pi/2$. This substantially means that the phase modulation amount for one step is $\pi/2$ as shown in FIG. 1(b).

On the other hand, in the case where the material of the element is BK7, the refractive index of the material of the element for red laser light, nr, is 1.5142 (nr=1.5142). In the case of a polyolefin resin, for example, nr=1.505 approximately. The optical path difference provided by step difference d1 for the red laser light is $d1\times(nr-1)/\lambda 2 \approx 0.75$ irrespective of whether the base material is quartz or resin.

Specifically, it is about ¾ times the wavelength of the red laser light. The phase modulation amount for one step is about −π/2.

In the case where the material of the element is BK7, the refractive index of the material of the element for infrared laser light, ni, is 1.51 (ni=1.51). In the case of a polyolefin resin, for example, ni=1.501 approximately. The optical path difference provided by step difference d1 for the infrared laser light is d1×(ni−1)/λ3≈0.625 (i.e., approximately 0.62 to 0.63) irrespective of whether the base material is quartz or resin. Specifically, it is about ⅔ times the wavelength of the infrared laser light. The phase modulation amount for one step can be estimated at −⅓ times the wavelength of the infrared laser light, which can be converted to the phase of about −2π/3.

As shown in FIG. 1(a), one step difference of the grating is d1, and a stepped cross-sectional shape is employed. The stepped shape of the grating for one period as shown in FIG. 1(a) has 8 level parts (0th level part to 7th level part) separated by 7 step differences. In this specification, this shape is referred to as "a stepped shape in which the number of step levels is 8". That is, a shape which is defined by M level parts separated by (M−1) step differences is referred to as "a stepped shape in which the number of step levels is M". Here, M is a natural number.

Note that, in this specification, an M-level stepped shape is sometimes referred to as "M-step stepped shape". The step differences, the levels, and the steps are in the relationship of (M−1), M, and M.

In the 8-level stepped shape shown in FIG. 1(a), the phase modulation amount for the blue laser light changes stepwise by π/2 for one step along the ascent of the steps as shown in FIG. 1(b). That is, the optical path difference changes stepwise by +¼ of λ1 for one step. With a 4-step structure (3-step difference structure), the phase changes by 2π, and the diffraction efficiency for the +1st order diffracted light is calculated (scalar calculation) at about 80%. That is, among other diffraction orders, the +1st order diffracted light has the strongest intensity. In FIG. 1(a), a sequence of 8 steps (7 step differences) constitutes one period p1. The phase changes by 2π in 4 steps. Therefore, for blue light, one period p1 is equal to two cycles of period p2. Period p2 is a half of period p1. If it is regarded as a periodic structure of period p1, the diffraction efficiency for the +2nd order diffracted light of blue light is about 80%. This means that the +2nd order diffracted light has the strongest intensity.

For red laser light, the phase modulation amount changes stepwise by −π/2 for one step along the ascent of the steps as shown in FIG. 1(c). That is, the optical path difference changes stepwise by −¼ of λ2 for one step. With a 4-step structure, the phase changes by 2π, and the diffraction efficiency for the −1st order diffracted light is calculated (scalar calculation) at about 80% so that, among other diffraction orders, the −1st order diffracted light has the strongest intensity. In FIG. 1(a), a sequence of 8 steps constitutes one period p1. The phase changes by −2π in 4 steps. Therefore, for red light, one period p1 is equal to two cycles of period p2. Period p2 is a half of period p1.

If it is regarded as a periodic structure of period p1, the diffraction efficiency for the −2nd order diffracted light of red light is about 80%. This means that the −2nd order diffracted light has the strongest intensity. Note that the "negative (−)" diffraction order means that the light is bent in a direction opposite to that of the positive (+) diffraction order.

In general, increasing the number of steps in one period of the diffraction element deteriorates the diffraction efficiency, and therefore, designing the shape of the diffraction element with a decreased number of steps has been an orthodox theory. However, the present inventors went against the orthodoxy to convert their way of thinking and found that designing the shape of the diffraction element with step difference d1 and the number of step levels as described above secures diffraction efficiencies and working distances which are required by blue light, red light, and infrared light for CDs, DVDs, and BDs.

Figure 2:
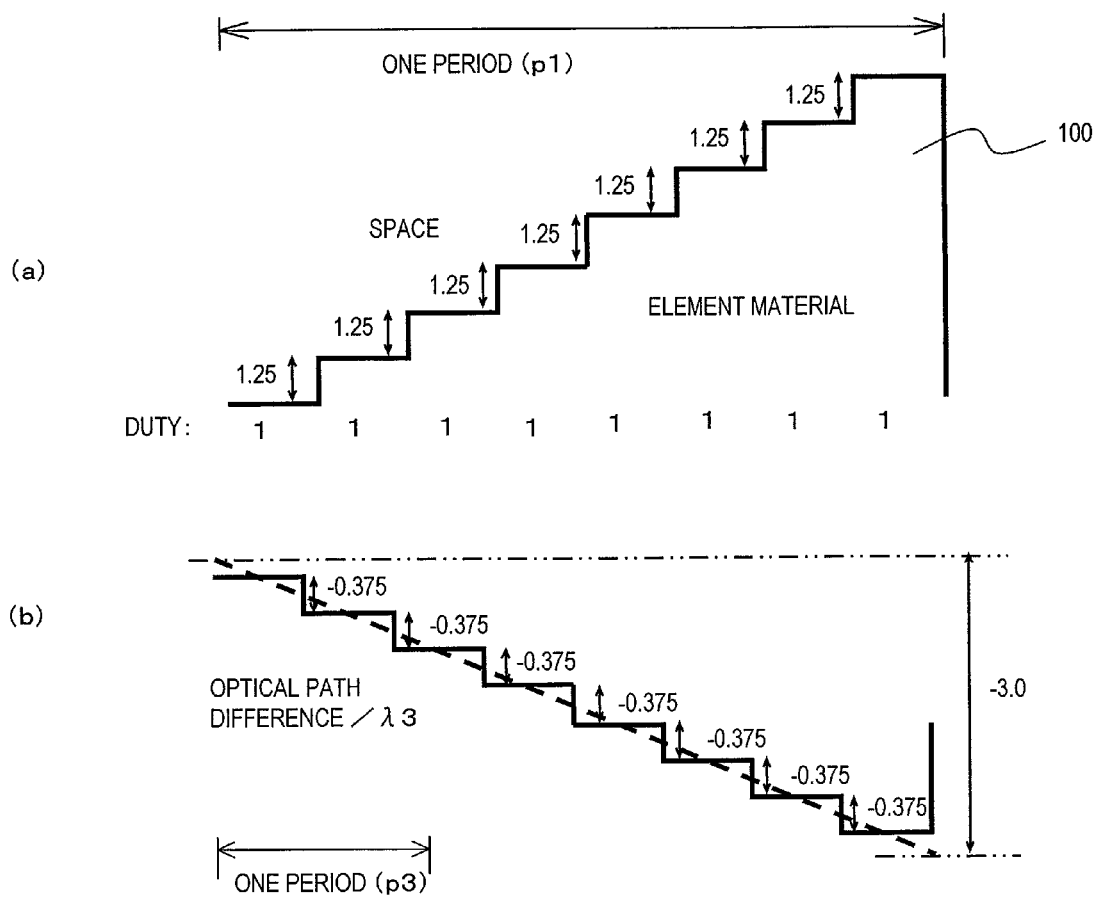
[FIG. 2] (a) is a diagram showing a cross-sectional shape of a diffraction element for one period according to an embodiment of the present invention. (b) is a diagram showing the phase change.

A stepped shape consisting of 4 steps corresponds to 5 times the blue light wavelength and to 3 times the red light wavelength and, i.e., corresponds to integral multiples of the wavelengths of the blue light and the red light. Therefore, the stepped shape is approximate to a saw-tooth blazed shape in which the phase change in each period is an integral multiple of 2π, so that a high diffraction efficiency is achieved. However, as for infrared light at λ3, the stepped structure corresponding to 5 times the blue light wavelength and to 3 times the red light wavelength corresponds to λ3×5/2, i.e., 2.5 times the infrared light wavelength, so that the diffraction efficiency is low. A stepped shape consisting of 8 steps is, as for infrared light, equivalent to a shape in which a periodic structure of 3 cycles lies in period p1 as shown in FIG. 1(d). In the periodic structure in period p1, the diffraction efficiency for the −3rd order diffracted light is about 60%, so that, among all the diffraction orders, the −3rd order diffracted light has the strongest intensity. A reason why the −3rd order diffracted light has the strongest intensity in this case can be simply understood by incrementally adding the phases provided by the respective steps to the infrared light. This will be described with reference to FIG. 2.

FIG. 2(a) shows the cross-sectional shape 100 which is the same as that shown in FIG. 1(a). Incrementally adding the phases provided by the respective steps to the infrared light results in the phase change as shown in FIG. 2(b). A stepped shape of 7 step differences and 8 levels which constitutes period p1 is approximated to a saw-tooth shape as illustrated by a broken line. The height of the saw-tooth shape illustrated by the broken line corresponds to 3 times the wavelength of the infrared light, so that the −3rd order diffraction intensely occurs.

As for blue light, the stepped shape of 7 step differences and 8 levels which constitutes period p1 is approximated to a saw-tooth shape which has a height equal to twice the blue light wavelength, so that the +2nd order diffracted light intensely occurs. The saw-tooth shape for the blue light is shaped in the inverse direction to the saw-tooth shape for the infrared light.

As for red light, the stepped shape of 7 step differences and 8 levels which constitutes period p1 is approximated to a saw-tooth shape which has a height equal to twice the red light wavelength, so that the −2nd order diffracted light intensely occurs. The saw-tooth shape for the red light is shaped in the same direction as the saw-tooth shape for the infrared light.

Figure 3:
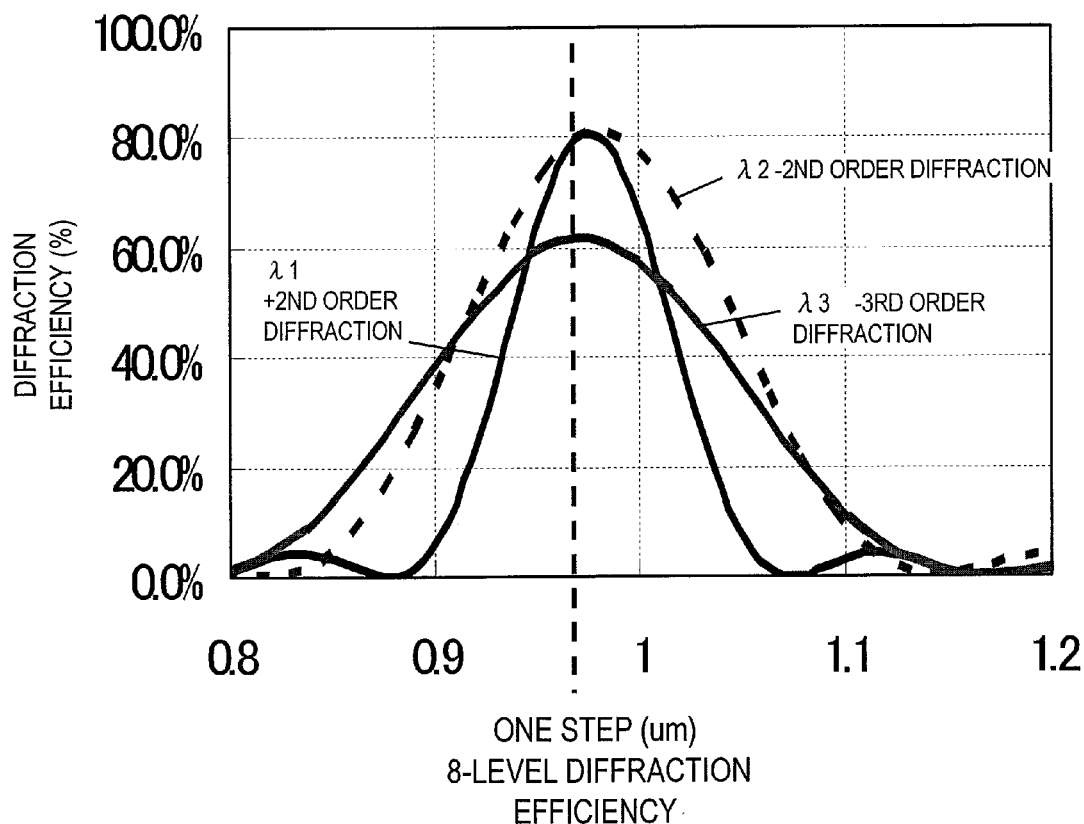
[FIG. 3] Graph showing the diffraction efficiency according to an embodiment of the present invention.

The diffraction efficiency of a diffraction grating in which the cross-sectional shape shown in FIG. 1(a) constitutes one period was calculated by scalar calculation. As a result, the diffraction efficiency was as shown in FIG. 3. In FIG. 3, the abscissa axis represents the actual dimension of one step difference under the circumstance where a resin material is used for the material of the element, and the ordinate axis represents the diffraction efficiency. In the case where the step difference is set near a position indicated by the vertical broken line, the diffraction efficiency for the +2nd order diffracted light of blue light (wavelength λ1) and the −2nd order diffracted light of red light (wavelength λ2) is about 80%, and the diffraction efficiency for the −3rd order diffracted light of infrared light (wavelength λ3) is about 60%. They are all higher than 50%. This means that these diffractions are larger than the other diffraction orders. The diffraction efficiency of 50% or higher in not only blue light and red light but also infrared light is attributed to the structure of FIG. 1(a). The respective design wavelengths may be λ1=408 nm, λ2=660 nm, and λ3=780 nm.

Now, the structure shown in FIG. 1(a) is studied. A saw-tooth shape approximated from a result of simple addition of the optical path differences provided by the respective step differences is now considered. As for the blue light, the height of the saw-tooth shape is equal to 1.25 times the blue light wavelength multiplied by 8, i.e., 10 times the blue light wavelength. As for the red light, the height of the saw-tooth shape is equal to 0.75 times the red light wavelength multiplied by 8, i.e., 6 times the red light wavelength. As for the infrared light, the height of the saw-tooth shape is equal to 0.625 times the infrared light wavelength multiplied by 8, i.e., 5 times the infrared light wavelength. That is, the height of the saw-tooth shape is integral multiples of all the wavelengths. These are replaced by J times the blue light wavelength, K times the red light wavelength, and L times the infrared light wavelength. The physical height of the approximated saw-tooth shape, H, meets the following relationship.

$$H \approx (J \times \lambda 1)/(nb-1)$$
$$\approx (K \times \lambda 2)/(nr-1)$$
$$\approx (L \times \lambda 3)/(ni-1)$$

Approximating that the refractive indices are substantially equal leads to a combination in which (J×λ1), (K×λ2), and (L×λ3) are substantially equal. J, K, and L are natural numbers. Considering the relationship of the wavelengths, J>K>L holds. The number of step levels, which is represented as "natural number M" herein although it is 8, is different from any of J, K, and L. Should M be equal to any of variables J, K, or L, the step difference would produce an optical path difference equal to the wavelength corresponding to the equal variable and produces substantially no phase difference for that wavelength. The relationship of the variables is J>M>K. This means that the optical path difference provided by one step difference is longer than the wavelength of the blue light and is shorter than the wavelength of the red light. Since twice the blue light wavelength is equal to the wavelength of the infrared light, J=2L is desirable.

The optical path difference provided by one step difference is equal to J/M times the blue light wavelength, to K/M times the red light wavelength, and to L/M times the infrared light wavelength. In the case where the values of (J×λ1)/(nb−1), (K×λ2)/(nr−1), and (L×λ3)/(ni−1) are equal, the diffraction efficiencies for the light of three different wavelengths reach the local maximums by designing the stepped shape such that one step difference d1 is equal to 1/M times the equal value. However, in the case where the three values are different, the largest value and the smallest value are selected among the multiples of (J×λ1)/(nb−1), (K×λ2)/(nr−1), and (L×λ3)/(ni−1) by a factor of 1/M, and one step difference d1 is limited within the range between the largest and smallest values, whereby high diffraction efficiencies can be achieved for the light of three different wavelengths. To achieve high diffraction efficiencies, the smallest value and the largest value among the three values are desirably within the range of ±10% relative to the average of the three values. In other words, it is desirable that the three values are substantially equal such that the smallest value and the largest value are within the range of ±10% relative to the average of the three values.

Considering that the refractive indices are substantially equal, all the refractive indices for the light of three different wavelengths may be approximate to nc. In this case, if the values of (J×λ1), (K×λ2), and (L'λ3) are equal, the diffraction efficiencies for the light of three different wavelengths reach the local maximums by designing the stepped shape such that one step difference d1 is equal to 1/(M×(nc−1)) times the equal value. However, if the three values are different, the largest value and the smallest value are selected among the multiples of (J×λ1), (K×λ2), and (L×λ3) by a factor of 1/(M×(nc−1)), and one step difference d1 is limited within the range between the largest and smallest values, whereby high diffraction efficiencies can be achieved for the light of three different wavelengths. Note that, in this specification, the phrase "A is equal to B" refers to not only a case where A is exactly equal to B but also a case where the difference between A and B is, for example, within the range of about ±10%.

Now, the range of the refractive index for the wavelength range of λ1 to λ3 is studied. In the case where the material of the element is BK7, the refractive index is 1.51 to 1.53. In the case where the material of the element is a polyolefin resin, the refractive index is 1.50 to 1.52. Even in the cases of other materials, a value between the smallest one and the largest one of the refractive indices in the wavelength range of λ1 to λ3, nc, which is considered as a representative of the refractive indices, has an error of, for example, 2%, i.e., at most several percents. To achieve high diffraction efficiencies, the smallest one and the largest one among the three values, (J×λ1), (K×λ2), and (L×λ3), are preferably within the range of ±10% relative to the average of the three values. In other words, the three values are preferably substantially equal such that the smallest one and the largest one are within the range of ±10% relative to the average of the three values.

Considering the combination which meets J=2L>M>K>L from the above study, other possible combinations than the previously-described combination (J,K,L,M)=(10,6,5,8) are as follows:
(10,6,5,7),
(10,6,5,9),
(8,5,4,7),
(8,5,4,6), and
(6,4,3,5).

With larger values for J, other combinations are possible. Under the conditions where natural numbers J, K, L, and M are selected such that J>M>K>L and J×λ1≈K×λ2≈L×λ3 hold, one step difference d1 is J/M times the blue light wavelength, and the diffraction element has a stepped cross-sectional shape with (M−1) step differences and M levels, the diffraction efficiencies for the light of three different wavelengths can reach or become closer to the local maximums, and the diffraction direction of the blue light can be opposite to those of the red light and the infrared light.

There is no conventional optical element configuration which enables the diffraction efficiencies for the light of three different wavelengths described in this embodiment to reach the local maximums.

With the optical element configuration described in this embodiment, the diffraction order of the blue light is opposite in polarity to those of the infrared light and the red light. Therefore, the minimum pitch of the diffraction element which is necessary for achieving the effect of correcting the aberration between the wavelengths and the effect of shifting the focal position can be increased. As a result, manufacture of the diffraction element can be facilitated, and a calculated amount of diffracted light can readily obtained.

The chromatic dispersion due to diffraction occurs in the opposite direction to that of refraction. Therefore, by designing the diffraction element so as to exert a convex lens action on blue laser light, the chromatic aberration caused by a change in wavelength of several nanometers or less, especially the wavelength dependence of the focal length, can be counteracted and reduced when combined with a refractive convex lens (the objective lens 14 (FIG. 16)). Further, the diffraction element exerts a concave lens action on the red light and the infrared light, and therefore, the working distance (WD) can be increased. The focal length for the red light is longer than the focal length for the blue light. The focal length for the infrared light is longer than the focal length for the red light.

(Embodiment 2)

Figure 4:
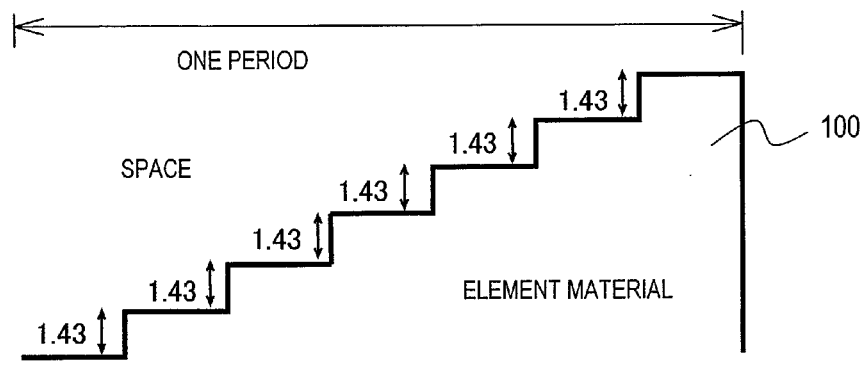
[FIG. 4] Diagram showing a cross-sectional shape of a diffraction element for one period according to an embodiment of the present invention.
Figure 5:
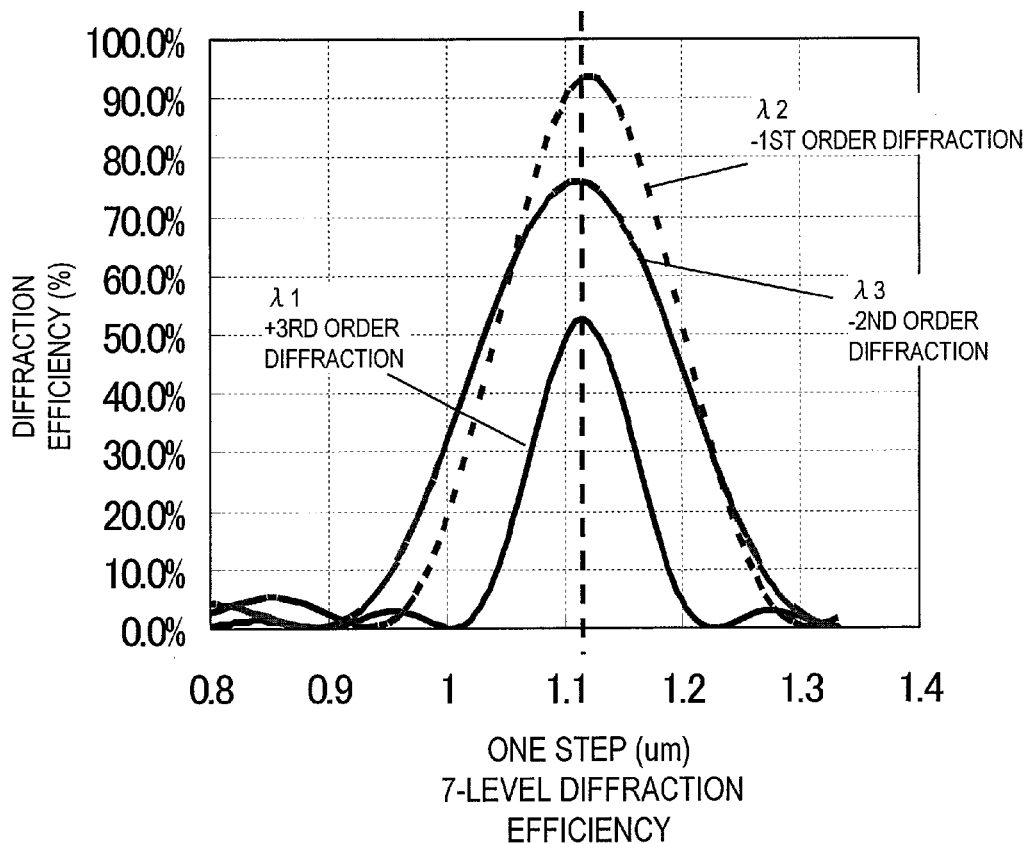
[FIG. 5] Graph showing the diffraction efficiency according to an embodiment of the present invention.

Next, the shape of the diffraction element 131 (FIG. 15 to FIG. 17, FIG. 23, and FIG. 24) for one period under the condition where (J,K,L,M)=(10,6,5,7) is shown in FIG. 4. Since J/M≈1.43, one step difference d1 is equivalent to the optical path difference which is about 1.43 times the blue wavelength, and the number of step levels is 7. The results of calculation of the diffraction efficiencies for the respective wavelengths are shown in FIG. 5. In FIG. 5, the abscissa axis represents the step difference where the material of the element is a resin material. The ordinate axis represents the diffraction efficiency. In the case where the step difference is set near a position indicated by the vertical broken line, the diffraction efficiency for the +3rd order diffracted light of blue light (wavelength $\lambda 1$) is about 50%, the diffraction efficiency for the −1st order diffracted light of red light (wavelength $\lambda 2$) is 90% or higher, and the diffraction efficiency for the −2nd order diffracted light of infrared light (wavelength $\lambda 3$) is 70% or higher. They are all higher than 50%. This means that these diffractions are larger than the other diffraction orders. Specifically, an advantage of this configuration is an improved diffraction efficiency for the red light. The respective design wavelengths may be $\lambda 1$=408 nm, $\lambda 2$=660 nm, and $\lambda 3$=780 nm.

(Embodiment 3)

Figure 6:
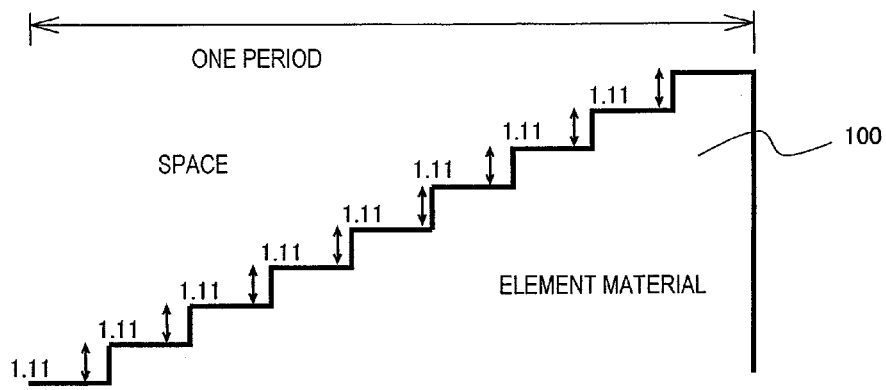
[FIG. 6] Diagram showing a cross-sectional shape of a diffraction element for one period according to an embodiment of the present invention.
Figure 7:
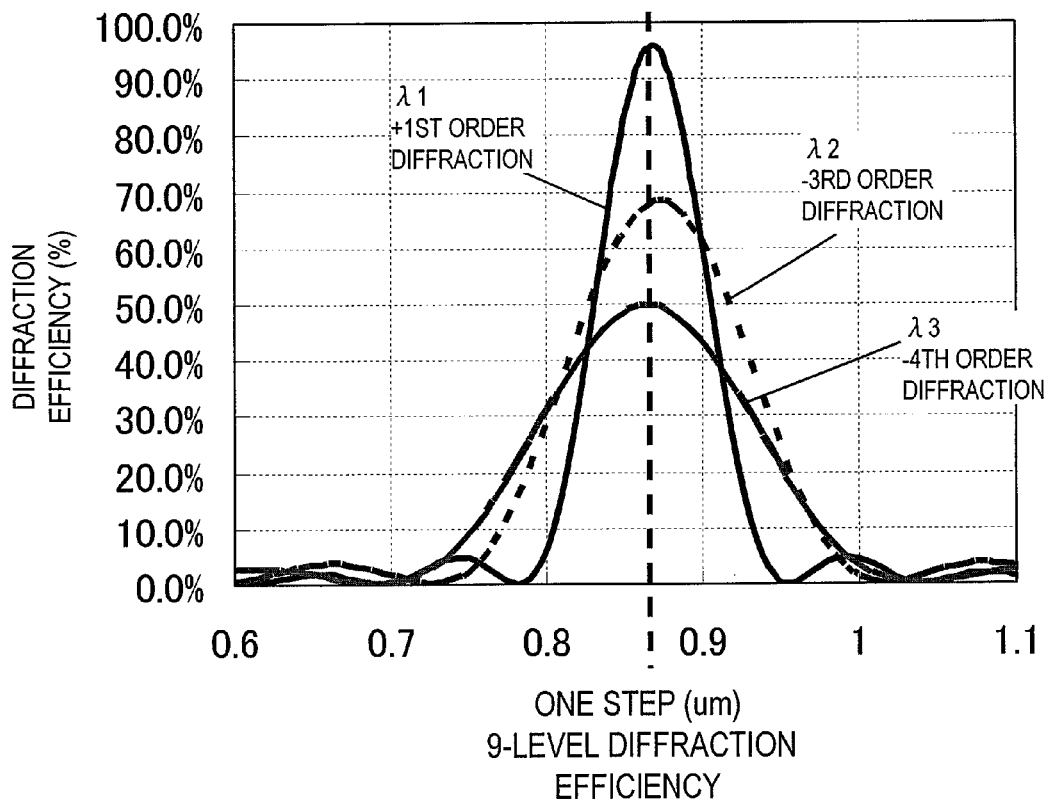
[FIG. 7] Graph showing the diffraction efficiency according to an embodiment of the present invention.

Next, the shape of the diffraction element 131 for one period under the condition where (J,K,L,M)=(10,6,5,9) is shown in FIG. 6. Since J/M≈1.11, one step difference is equivalent to the optical path difference which is about 1.11 times the blue wavelength, and the number of step levels is 9. The results of calculation of the diffraction efficiencies for the respective wavelengths are shown in FIG. 7. In FIG. 7, the abscissa axis represents the step difference where the material of the element is a resin material. The ordinate axis represents the diffraction efficiency. In the case where the step difference is set near a position indicated by the vertical broken line, the diffraction efficiency for the +1st order diffracted light of blue light (wavelength $\lambda 1$) is 90% or higher, the diffraction efficiency for the −3rd order diffracted light of red light (wavelength $\lambda 2$) is 60% or higher, and the diffraction efficiency for the −4th order diffracted light of infrared light (wavelength $\lambda 3$) is about 50%. The diffraction efficiencies for the blue light and the red light are higher than 50%. As for the infrared light, the remaining 50% part is constituted of the diffracted light of the other more than one diffraction orders, and therefore, the diffraction efficiency for the −4th order diffracted light is higher than the other diffraction orders. Specifically, an advantage of this configuration is an improved diffraction efficiency for the blue light. The respective design wavelengths may be $\lambda 1$=408 nm, $\lambda 2$=660 nm, and $\lambda 3$=780 nm.

(Embodiment 4)

Figure 8:
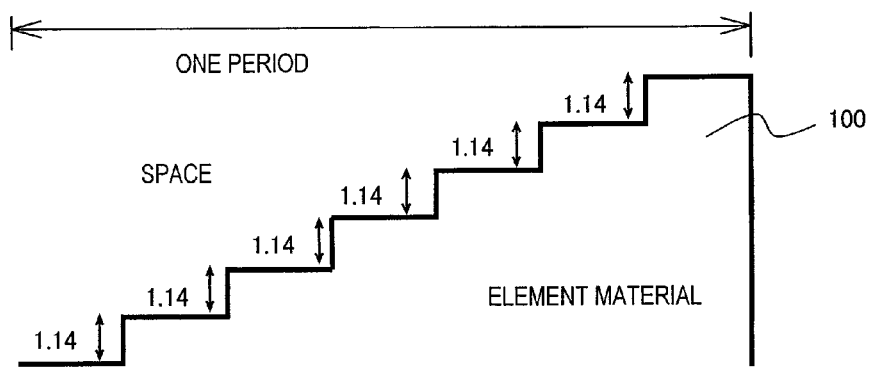
[FIG. 8] Diagram showing a cross-sectional shape of a diffraction element for one period according to an embodiment of the present invention.
Figure 9:
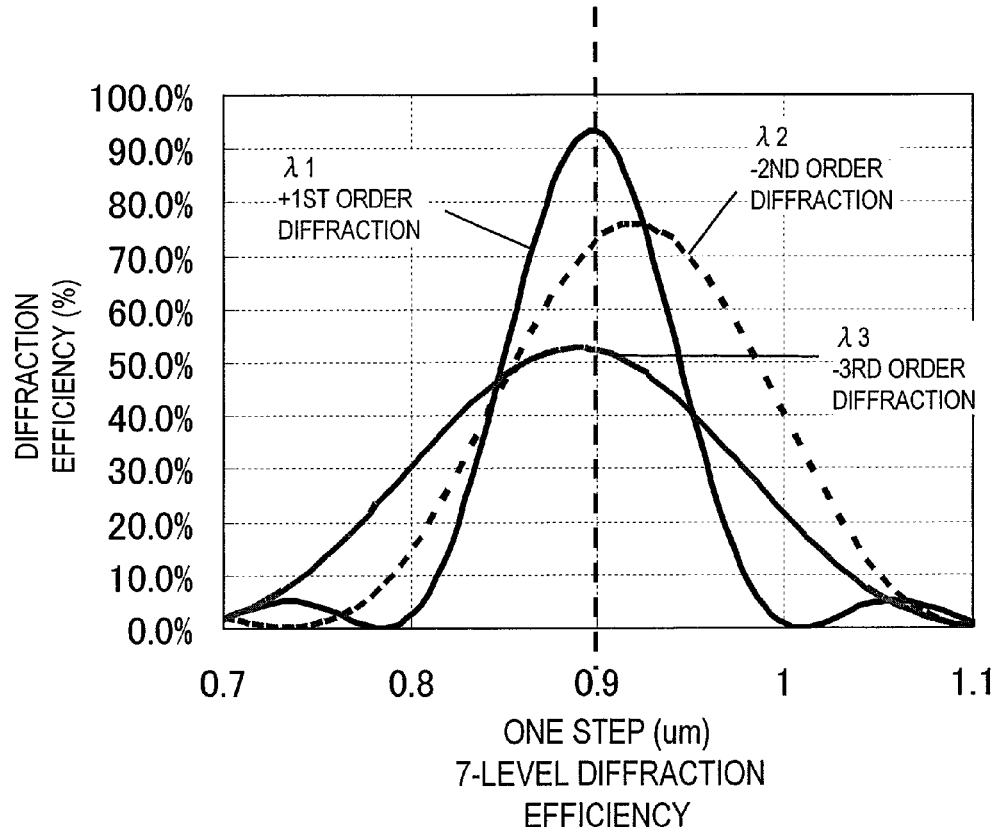
[FIG. 9] Graph showing the diffraction efficiency according to an embodiment of the present invention.

Next, the shape of the diffraction element 131 for one period under the condition where (J,K,L,M)=(8,5,4,7) is shown in FIG. 8. Since J/M≈1.14, one step difference is equivalent to the optical path difference which is about 1.14 times the blue wavelength, and the number of step levels is 7. The results of calculation of the diffraction efficiencies for the respective wavelengths are shown in FIG. 9. In FIG. 9, the abscissa axis represents the step difference where the material of the element is a resin material. The ordinate axis represents the diffraction efficiency. In the case where the step difference is set near a position indicated by the vertical broken line, the diffraction efficiency for the +1st order diffracted light of blue light (wavelength $\lambda 1$) is 90% or higher, the diffraction efficiency for the −2nd order diffracted light of red light (wavelength $\lambda 2$) is 70% or higher, and the diffraction efficiency for the −3rd order diffracted light of infrared light (wavelength $\lambda 3$) is 50% or higher. These diffraction efficiencies are higher than 50%, and the diffractions of these diffraction orders are larger than the other diffraction orders. Specifically, an advantage of this configuration is an improved diffraction efficiency for the blue light. The respective design wavelengths may be $\lambda 1$=408 nm, $\lambda 2$=650 nm, and $\lambda 3$=780 nm.

(Embodiment 5)

Figure 10:
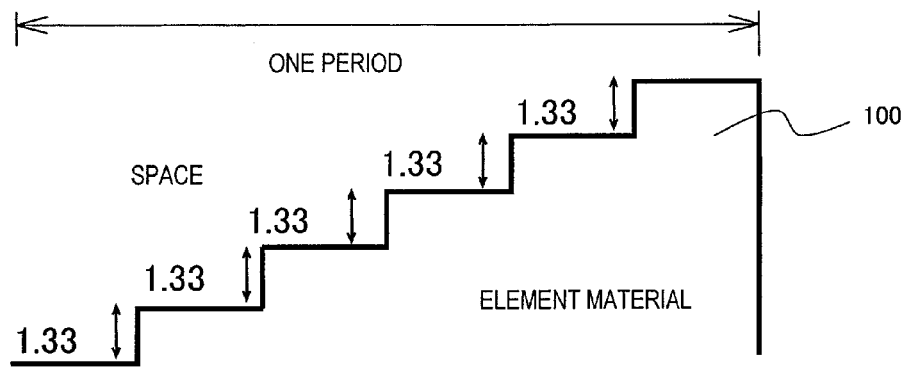
[FIG. 10] Diagram showing a cross-sectional shape of a diffraction element for one period according to an embodiment of the present invention.
Figure 11:
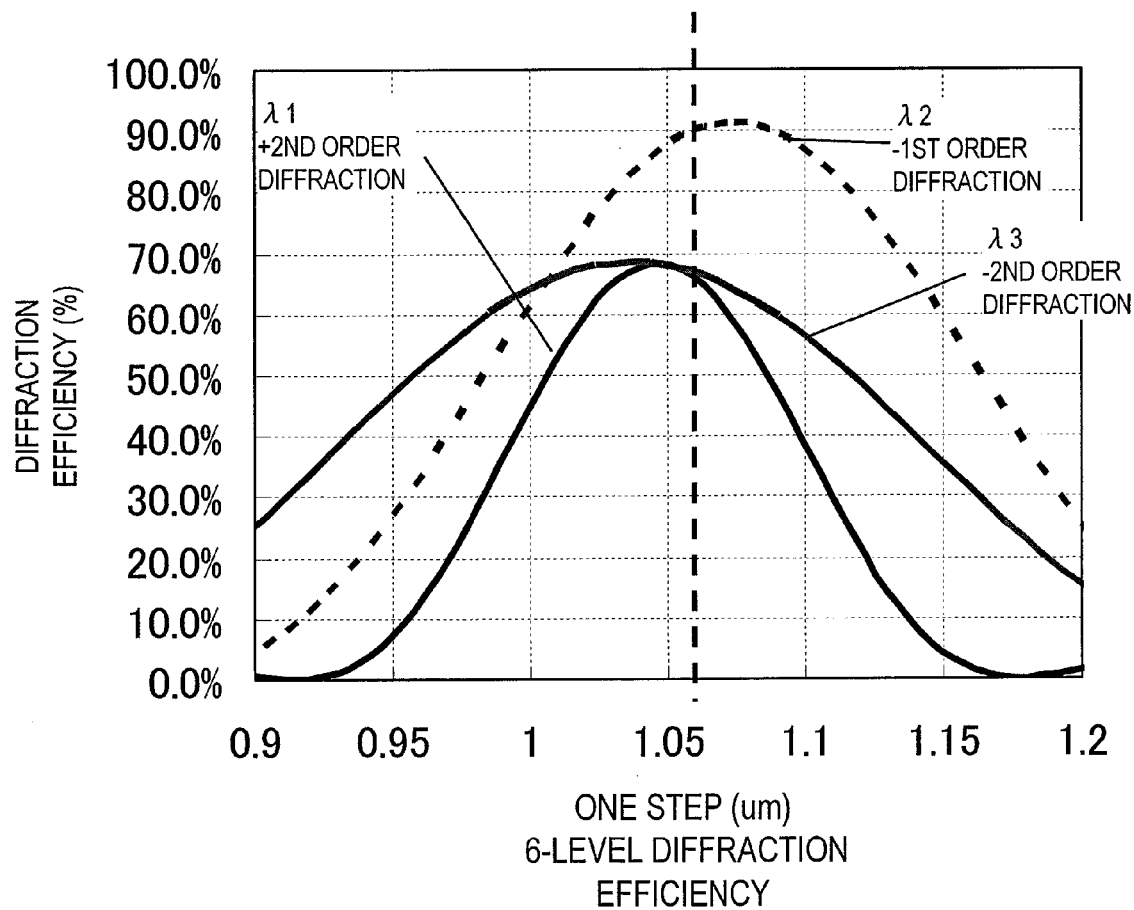
[FIG. 11] Graph showing the diffraction efficiency according to an embodiment of the present invention.

Next, the shape of the diffraction element 131 for one period under the condition where (J,K,L,M)=(8,5,4,6) is shown in FIG. 10. Since J/M≈1.33, one step difference is equivalent to the optical path difference which is about 1.33 times the blue wavelength, and the number of step levels is 6. The results of calculation of the diffraction efficiencies for the respective wavelengths are shown in FIG. 11. In FIG. 11, the abscissa axis represents the step difference where the material of the element is a resin material. The ordinate axis represents the diffraction efficiency. In the case where the step difference is set near a position indicated by the vertical broken line, the diffraction efficiency for the +2nd order diffracted light of blue light (wavelength $\lambda 1$) is 60% or higher, the diffraction efficiency for the −1st order diffracted light of red light (wavelength $\lambda 2$) is 90% or higher, and the diffraction efficiency for the −2nd order diffracted light of infrared light (wavelength $\lambda 3$) is 60% or higher. These diffraction efficiencies are higher than 50%, and the diffractions of these diffraction orders are larger than the other diffraction orders. Specifically, an advantage of this configuration is an improved diffraction efficiency for the red light. The respective design wavelengths may be $\lambda 1$=408 nm, $\lambda 2$=650 nm, and $\lambda 3$=780 nm.

(Embodiment 6)

Figure 12:
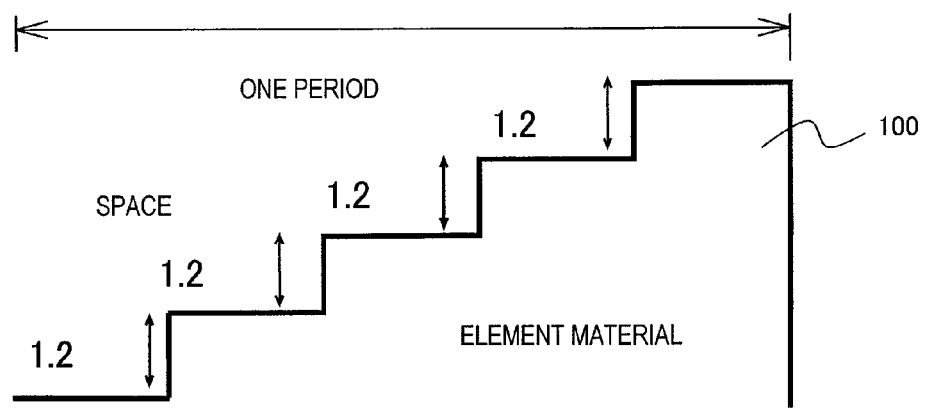
[FIG. 12] Diagram showing a cross-sectional shape of a diffraction element for one period according to an embodiment of the present invention.
Figure 13:
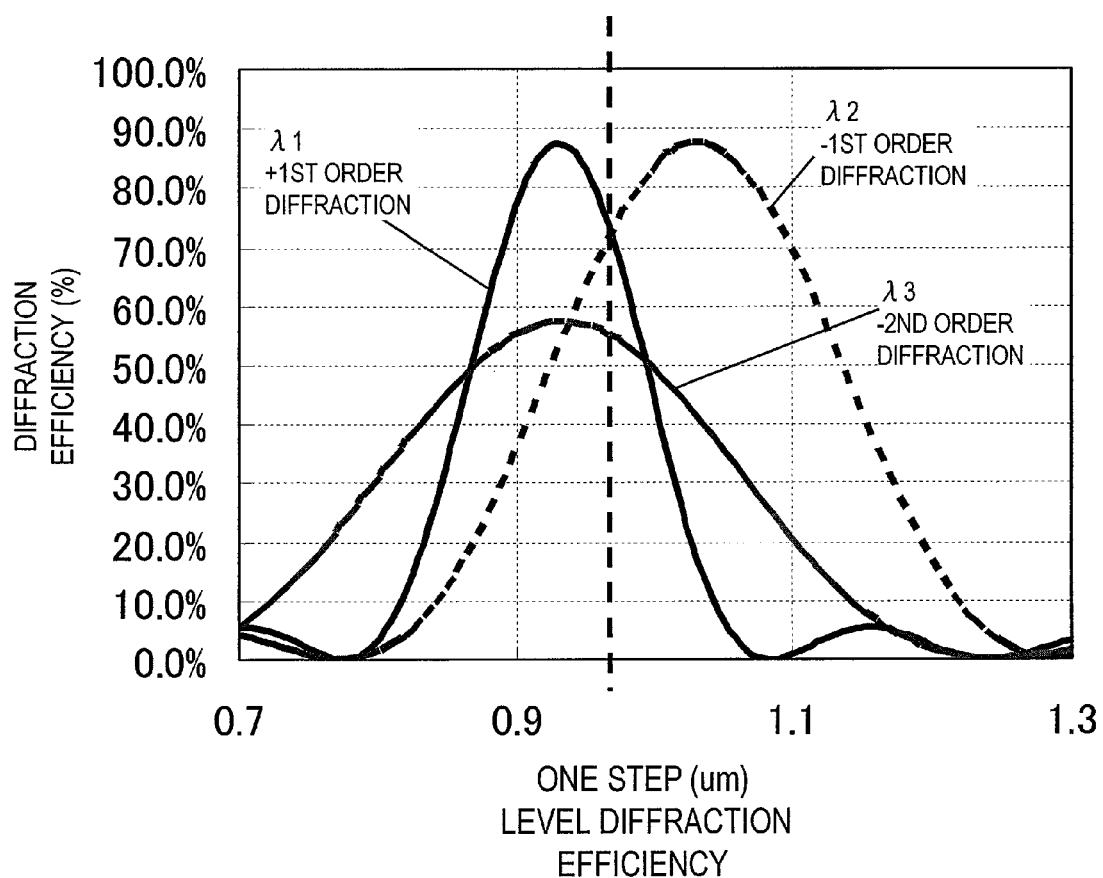
[FIG. 13] Graph showing the diffraction efficiency according to an embodiment of the present invention.

Next, the shape of the diffraction element 131 for one period under the condition where (J,K,L,M)=(6,4,3,5) is shown in FIG. 12. Since J/M≈1.2, one step difference is equivalent to the optical path difference which is about 1.2 times the blue wavelength, and the number of step levels is 5. The results of calculation of the diffraction efficiencies for the respective wavelengths are shown in FIG. 13. In FIG. 13, the abscissa axis represents the step difference where the material of the element is a resin material. The ordinate axis represents the diffraction efficiency. In the case where the step difference is set near a position indicated by the vertical broken line, the diffraction efficiency for the +1st order diffracted light of blue light (wavelength $\lambda 1$) is 70% or higher, the diffraction efficiency for the −1st order diffracted light of red light (wavelength $\lambda 2$) is 70% or higher, and the diffraction efficiency for the −2nd order diffracted light of infrared light (wavelength $\lambda 3$) is 50% or higher. These diffraction efficiencies are higher than 50%, and the diffractions of these diffraction orders are larger than the other diffraction orders. Specifically, an advantage of this configuration resides in that a change in diffraction efficiency due to a deviation of the wavelength from the design wavelength is especially small because the number of levels is small. The respective design wavelengths may be λ1=408 nm, λ2=650 nm, and λ3=780 nm.

(Embodiment 7)

Figure 14:
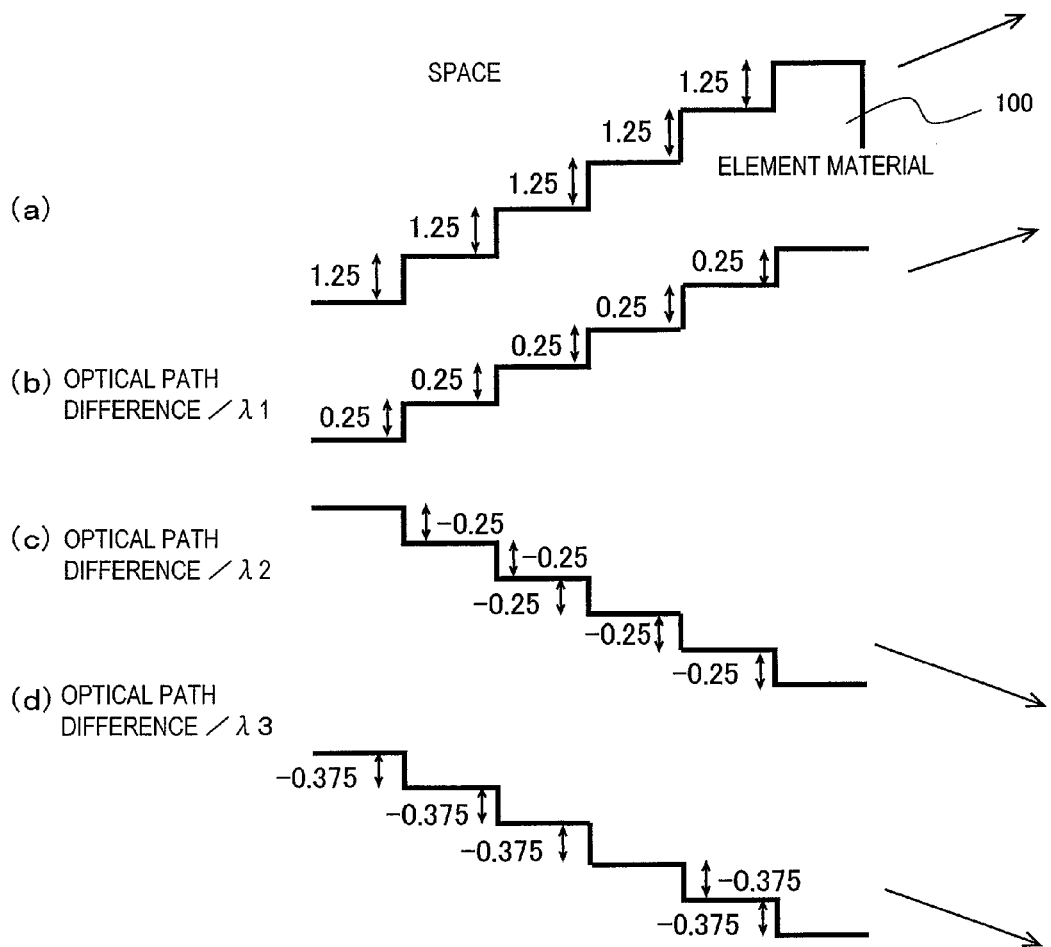
[FIG. 14] (a) is a diagram showing a cross-sectional shape of a diffraction element for one period according to an embodiment of the present invention. (b) is a diagram showing the phase modulation amount for blue light which is produced by the cross-sectional shape. (c) is a diagram showing the phase modulation amount for red light which is produced by the cross-sectional shape. (d) is a diagram showing the phase modulation amount for infrared light which is produced by the cross-sectional shape 100.

The optical element may have a phase-stepped element configuration in which the height is kept increased without being reset at every passage of a predetermined number of steps and which does not utilize a periodic structure. As shown in FIG. 14, by designing the step difference so as to have a height which produces an optical path difference equal to about 1.25 times the blue wavelength, the diffraction element provides the blue light with a positive phase and meanwhile provides the red light and the infrared light with negative phases. FIG. 14(a) shows the cross-sectional shape 100 of the diffraction element for one period. FIG. 14(b) shows the phase modulation amount for the blue light which is produced by the cross-sectional shape 100. FIG. 14(c) shows the phase modulation amount for the red light which is produced by the cross-sectional shape 100. FIG. 14(d) shows the phase modulation amount for the infrared light which is produced by the cross-sectional shape 100.

(Embodiment 8)

Figure 15:
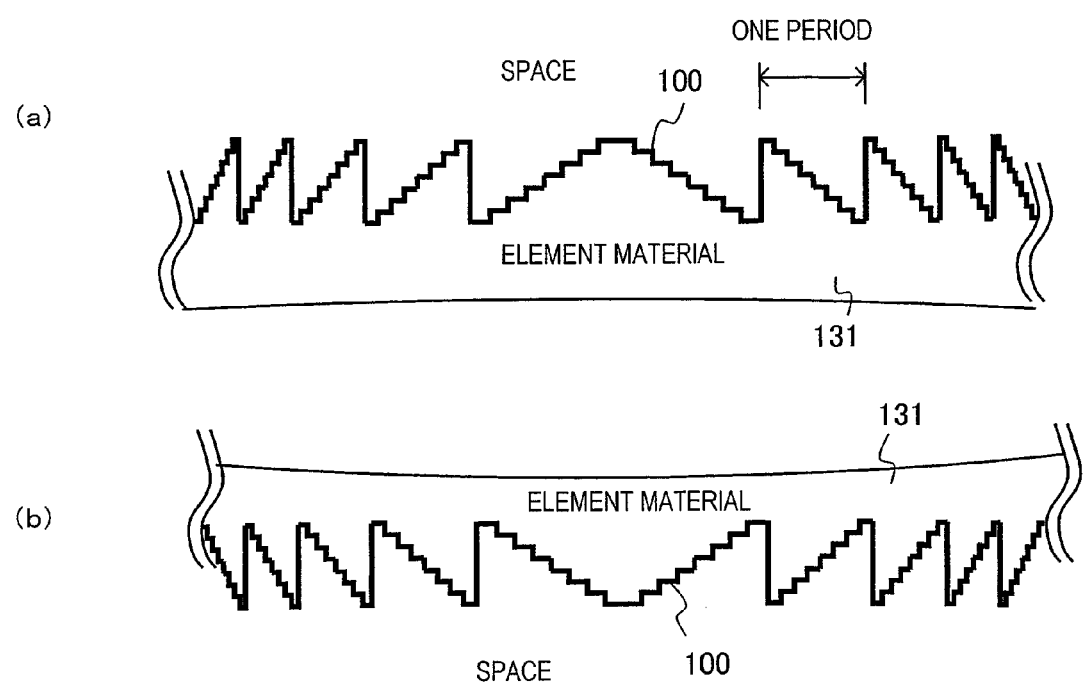
[FIG. 15] (a) is a diagram showing an optical element in which a grating shape is provided in the upper surface according to an embodiment of the present invention. (b) is a diagram showing an optical element in which a grating shape is provided in the lower surface.

An example of part of the optical element (diffraction element 131) which uses the shapes of the gratings described in the above embodiments is described with reference to FIG. 15. FIG. 15(a) shows an example in which a grating shape (phase steps) is provided in the upper surface. This example is approximate to a convex Fresnel lens. The structure of this example diffracts the blue laser light at wavelength λ1 to exert a convex lens action on the blue laser light. The structure of this example exerts a concave lens action on the red light at wavelength λ2 and the infrared light at wavelength λ3 by negative order diffraction. In the case where the cross-sectional shape of the optical element is the phase steps described in embodiment 7, the height is kept changed without being periodically reset. The phase steps exert a concave lens action on the red light at wavelength λ2 and the infrared light at wavelength λ3 by means of a negative phase change. Note that, when the lower surface has a grating shape or phase steps, the optical element may be shaped as shown in FIG. 15(b). The grating structure may be provided in a curved surface, such as a concaved surface on the opposite side, although the diffraction element is integrally formed in a flat surface in the example of FIG. 15.

In the case where one surface of the optical element 131 is a flat surface, the diffraction element may be provided on the flat surface of the optical element 131. In the case where one surface of the optical element 131 is a concaved surface, the diffraction element may be provided on the concaved surface of the optical element 131.

The diffraction element may be provided in an optical element other than the objective lens (refractive lens) 14 or may be provided on a surface of the objective lens.

Figure 16:
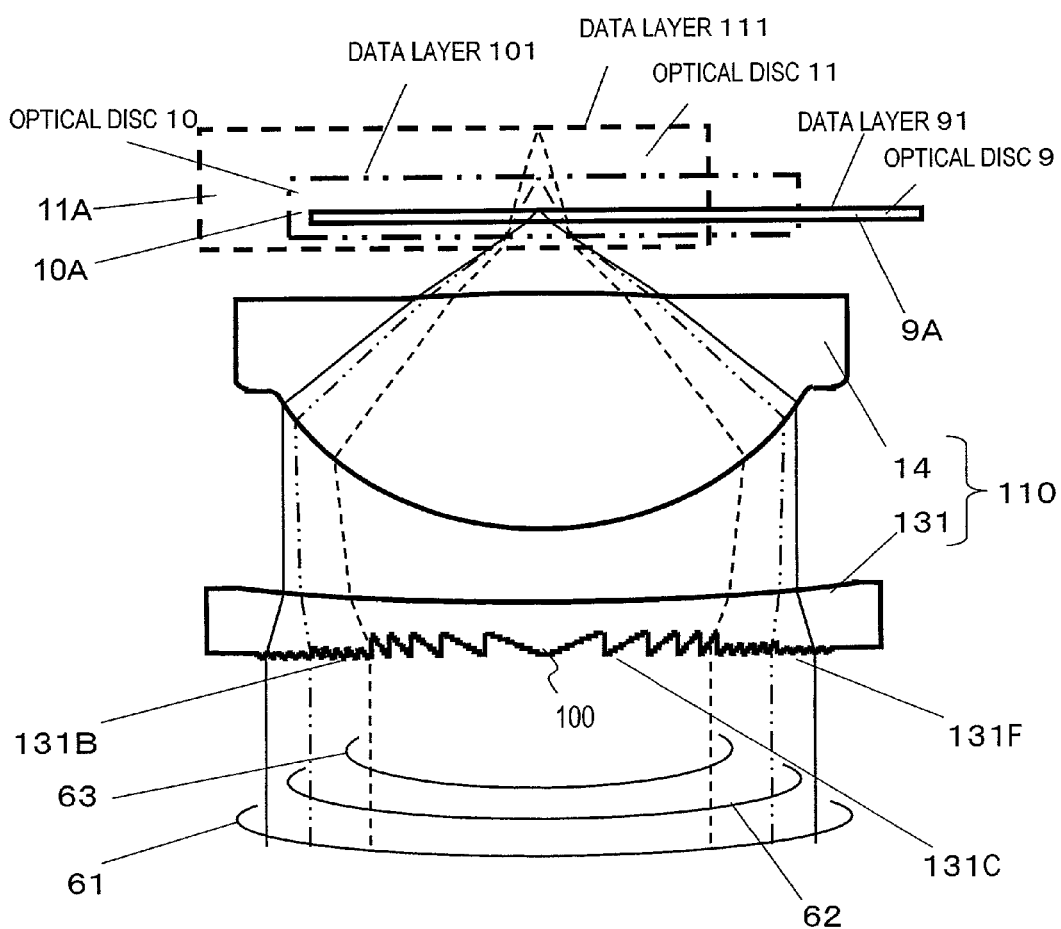
[FIG. 16] Diagram showing a complex objective lens according to an embodiment of the present invention.

Next, the complex objective lens 110 which is a CD/DVD/BD-compatible lens is described with reference to FIG. 16. The complex objective lens 110 includes the optical element 131 and the objective lens 14.

Although the optical element 131 is a diffraction element, it may be the phase-stepped optical element of embodiment 7. The diffraction element 131 may have a refraction surface on one surface or may have refraction surfaces on both surfaces. In the case where, as for the blue light, a concaved refractive surface is combined with a convex lens shaped diffraction element or phase-stepped element such that the lens power is canceled, the lens power of the entire optical element 131 to the standard wavelength of the blue light is zero. Under such circumstances, the refractive objective lens 14 which is to be used in combination with the optical element 131 only need to be designed such that light can be converged with the numerical aperture of NA1 or more through a transparent layer 9A of an optical disc 9 which has base layer thickness t1. Therefore, inspections of the objective lens 14 during manufacture can easily be carried out. Part of the optical disc 9 extending from the surface to the data layer 91 is the transparent layer 9A.

In any case, the objective lens 14 is designed so as to converge the blue laser light at wavelength λ1 modulated by the optical element 131 such that the blue laser light is condensed on the data layer 91 via the transparent layer 9A of the optical disc 9 which has base layer thickness t1. Also, it is designed so as to converge the red laser light at wavelength λ2 modulated by the optical element 131 such that the red laser light is condensed on a data layer 101 via a transparent layer 10A of an optical disc 10 which has base layer thickness t2. Part of the optical disc 10 extending from the surface to the data layer 101 is the transparent layer 10A. Also, it is designed so as to converge the infrared laser light at wavelength λ3 modulated by the optical element 131 such that the infrared laser light is condensed on a data layer 111 via a transparent layer 11A of an optical disc 11 which has base layer thickness t3. Part of the optical disc 11 extending from the surface to the data layer 111 is the transparent layer 11A. It can be designed by utilizing the difference in wavelength, the above-described difference in diffraction order (the difference in phase due to the phase steps), and the difference in refractive index of the refractive objective lens 14 which depends on the wavelengths (dispersion), such that the laser light at the respective wavelengths can be converged when being transmitted through the transparent layer of the different base layer thicknesses.

Among CD, DVD, and BD, the numerical aperture NA suitable for conversion of light is different. Numerical aperture NA1 suitable for BD is 0.85 or more. Numerical aperture NA2 suitable for DVD is about 0.6 to 0.67. Numerical aperture NA3 suitable for CD is about 0.45 to 0.55. If the numerical aperture is smaller than these values, the laser light cannot be sufficiently converged to form a small spot on a data layer. If the numerical aperture is excessively larger than these values, a large wavefront disturbance occurs in the case where an optical disc is deformed and tilted, for example. Therefore, such a value is not suitable to stable recording and reading of data. To make NA3 smaller than NA2 or NA1, the optical element 131 has three concentric regions about the optical axis.

An intermediate ring zone 131B is more distant from the optical axis of the diffraction element than an innermost zone 131C is. An outer ring portion 131F is more distant from the optical axis of the diffraction element than the intermediate ring zone 131B is.

The innermost zone 131C is provided with the diffraction element (or diffraction steps) which has been described in the above example. Infrared laser light 63 impinging on the innermost zone 131C is converged on the data layer 111 via the transparent base layer of about 1.2 mm as indicated by broken lines. Red laser light 62 impinging on the innermost zone 131C and the intermediate ring zone 131B at the outer side thereof is converged on the data layer 101 via the transparent base layer of about 0.6 mm. Blue laser light 61 impinging on the innermost zone 131C, the intermediate ring zone 131B, and the outer ring zone 131F at the outer side thereof is converged on the data layer 91 via the transparent base layer of about 0.1 mm.

Thus, the innermost zone 131C is a region commonly used by all of infrared light for CD, red light for DVD, and blue light for BD. The blue light which is at the shortest wavelength has a large dispersion of the refractive objective lens 14 and a shallow depth of focus and is therefore desirably corrected in terms of the axial chromatic aberration. Correction of the axial chromatic aberration can be realized by designing the diffraction element part of the optical element 131 so as to exert a convex lens action. In the case where the diffraction element configuration of the above-described example is used, the infrared light (broken line) and the red light (double-dot chain line) undergo an action inverse to that on the blue light. Therefore, the diffraction element exerts a concave lens action and has a long focal length. Especially, the infrared light has a longer wavelength than the red light and therefore undergoes a stronger concave lens action. Thus, the focal length is longer for the red light than for the blue light and is longer for the infrared light than for the red light. The focal positions for the red light and the infrared light can be shifted away from the objective lens 14, so that the red light and the infrared light can be focused via the thick base layers of the optical discs 10 and 11. That is, the distances between the surface of the objective lens 14 and the surfaces of the optical discs 10 and 11, i.e., the working distances (WD) can advantageously be secured.

Figure 17:
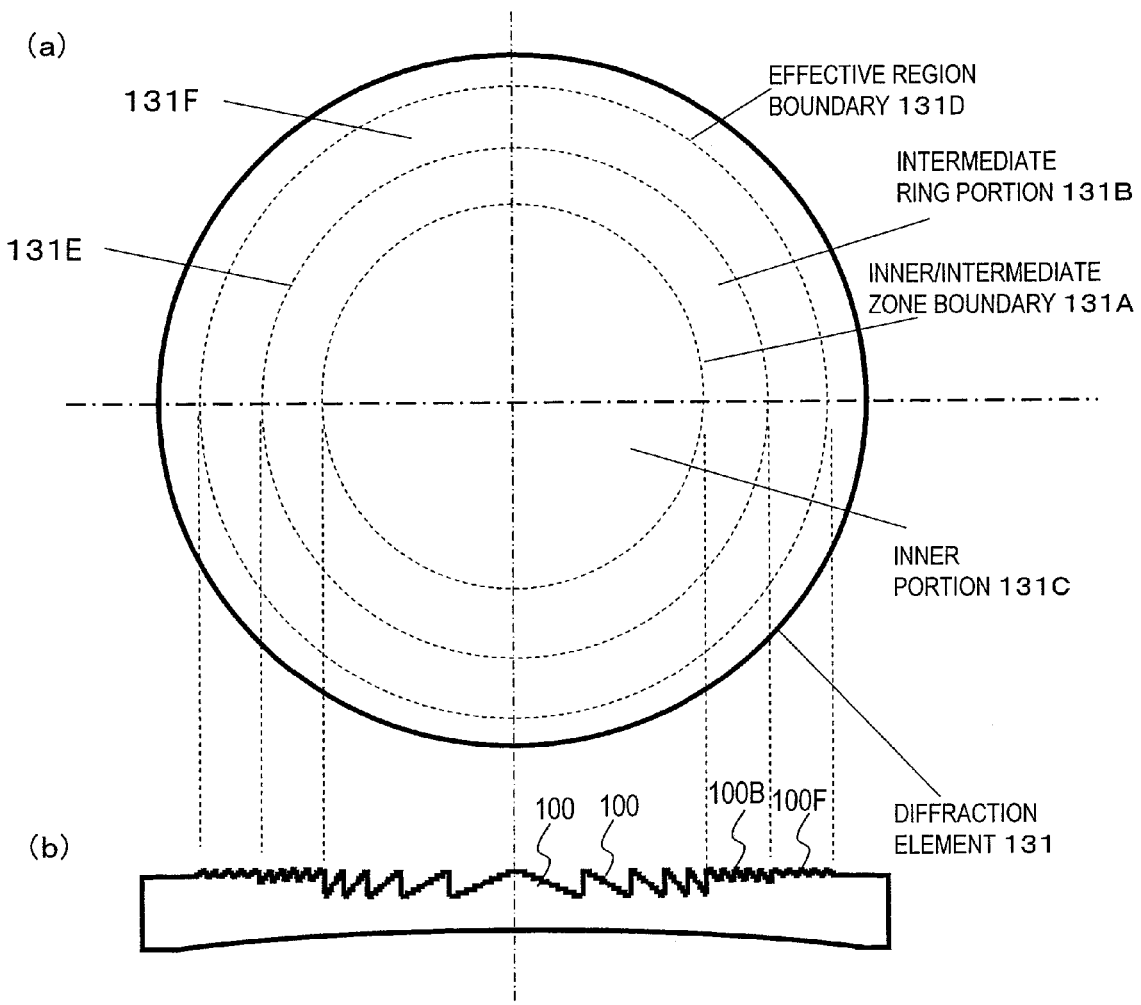
[FIG. 17] Diagram showing an optical element according to an embodiment of the present invention.

FIG. 17 shows the optical element (diffraction element) 131. FIG. 17(a) is a plan view of the optical element 131. FIG. 17(b) is a cross-sectional view of the optical element 131 which is identical to that of FIG. 16. As described with reference to FIG. 16, the cross-sectional structure of the optical element 131 varies among part of the optical element which is on the inner side of an inner/intermediate zone boundary 131A (the inner portion 131C), part of the optical element which is on the outer side of the inner/intermediate zone boundary 131A (the intermediate ring portion 131B between the inner/intermediate zone boundary 131A and an intermediate/outer zone boundary 131E), and part of the optical element which is on the outer side of the intermediate/outer zone boundary 131E (the outer ring portion 131F between the intermediate/outer zone boundary 131E and an effective region boundary 131D).

The inner portion 131C is a region which includes a crosspoint of the optical element 131 and the optical axis, i.e., the center of the optical element 131. This region is commonly used for recording and reading of data in/from the optical disc 11 with the infrared laser light, recording and reading of data in/from the optical disc 10 with the red laser light, and recording and reading of data in/from the optical disc 9 with the blue laser light.

The intermediate ring portion 131B is commonly used for recording and reading of data in/from the optical disc 10 with the red laser light and recording and reading of data in/from the optical disc 9 with the blue laser light. In the case where recording and reading of data in/from the optical disc 11 are carried out using the infrared laser light, part of the infrared light which passes through this region does not converge, and NA3 is made smaller than NA1 and NA2. The outer ring portion 131F is used only for recording and reading of data in/from the optical disc 9 with the blue laser light. In the case where recording and reading of data in/from the optical disc 10 are carried out using the red laser light, or in the case where recording and reading of data in/from the optical disc 11 are carried out using the infrared laser light, part of the red laser light and part of the infrared light which pass through this region do not converge, and NA2 is made smaller than NA1.

A circular band structure portion of the inner portion 131C has the cross-sectional shape which has been described above as the diffraction element or the phase-stepped element. The intermediate ring portion 131B and the outer ring portion 131F are described with reference to FIG. 18 to FIG. 22.

Figure 18:
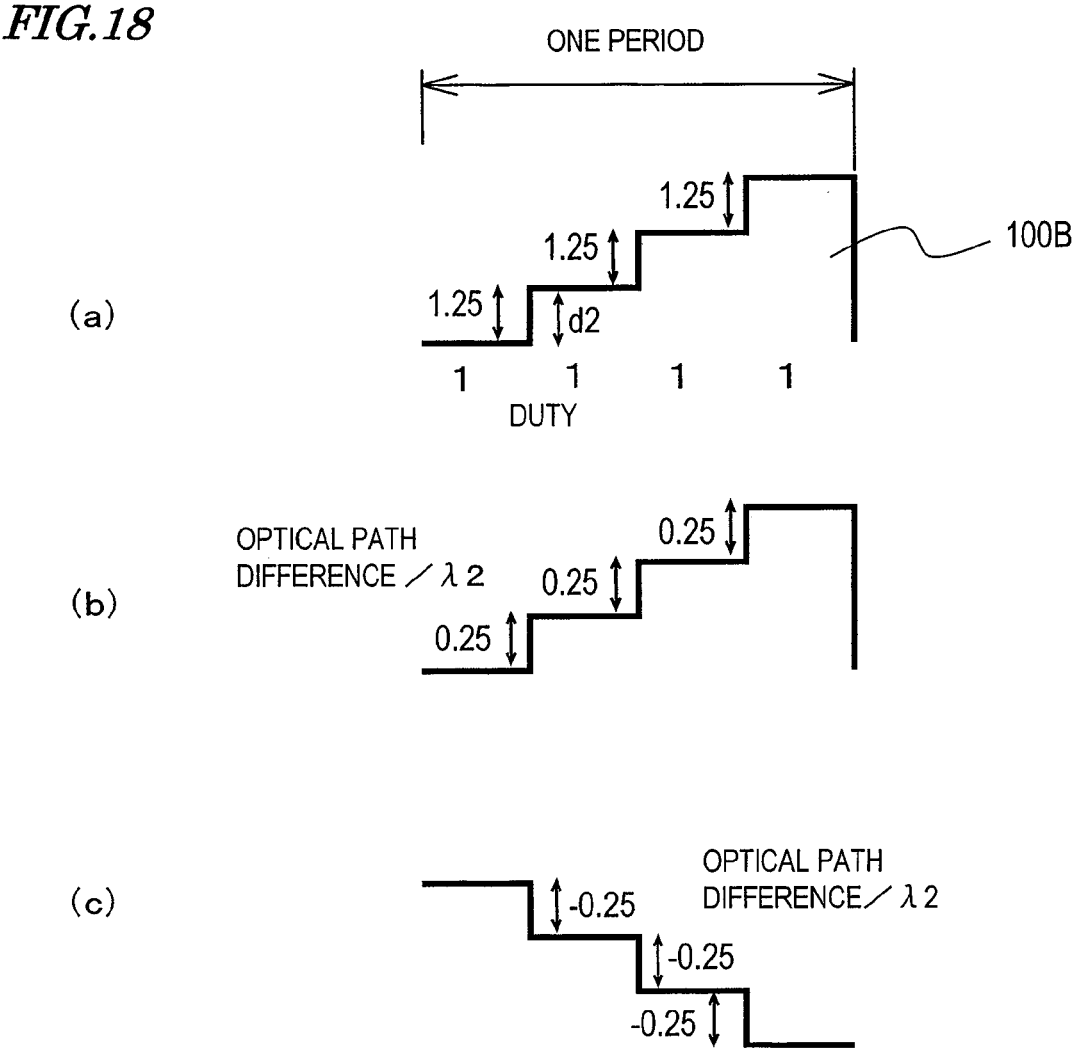
[FIG. 18] (a) is a diagram showing a cross-sectional shape of a diffraction element in an intermediate ring portion for one period according to an embodiment of the present invention. (b) is a graph showing the phase modulation amount for blue light which is produced by the cross-sectional shape. (c) is a graph showing the phase modulation amount for red light which is produced by the cross-sectional shape.

The shape of the diffraction element 131 in the intermediate ring portion 131B for one period and the phase modulation amount produced by the shape are described with reference to FIG. 18.

FIG. 18(a) shows a physical cross-sectional shape (stepped grating shape) 100B of the diffraction element 131 in the intermediate ring portion 131B for one period. FIG. 18(b) shows the phase modulation amount for the blue light which is produced by the cross-sectional shape 100B. FIG. 18(c) shows the phase modulation amount for the red light which is produced by the cross-sectional shape 100B.

In FIG. 18(a), the vertical direction represents the height of the element surface along the optical axis. The refractive index of the material of the element for the blue laser light is denoted by "nb". As one unit of the step difference, an amount which produces an optical path difference for the blue laser light of about 1.25 times the wavelength, i.e., an amount which produces the phase difference of about $2\pi+\pi/2$, is referred to as "unit step difference d2".

In the case of the cross-sectional shape 100B which has such a stepped shape that one step difference of the grating is d2, the number of step levels is 4, and the ratio of the step width is 1:1:1:1, the phase modulation amount for the blue light is an integral multiple of $2\pi+\pi/2$. This means that the substantial phase modulation amount for one step is $\pi/2$.

On the other hand, the optical path difference which is provided by step difference d2 in the red laser light is d2×(nr−1)/λ2 where nr is the refractive index of the material of the element for the red laser light. When a common optical material is used, the optical path difference is about ¾ times the wavelength of the red laser light, and the phase modulation amount for one step is about −π/2.

Figure 19:
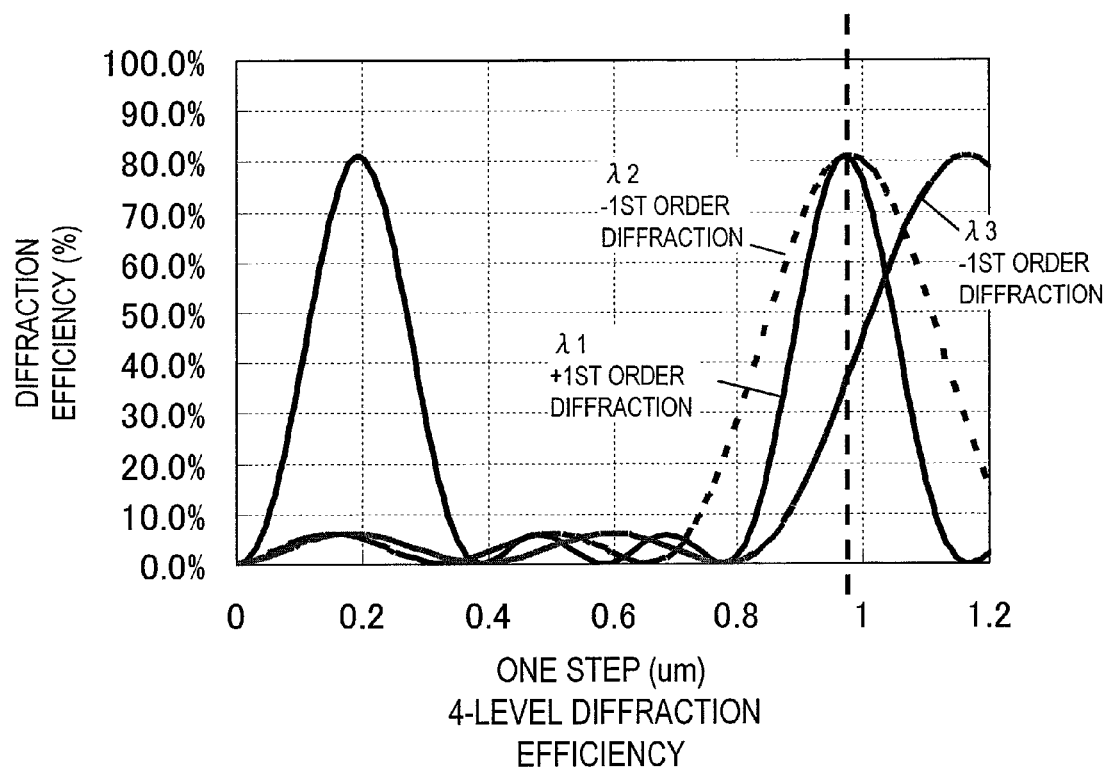
[FIG. 19] Graph showing the diffraction efficiency according to an embodiment of the present invention.

Therefore, in the case of the stepped cross-sectional shape of 4 steps as shown in FIG. 18(a) where one step difference of the grating is d2, the phase modulation amount for the blue laser light changes stepwise by π/2 for one step along the ascent of the steps as shown in FIG. 18(b). This means that the optical path difference changes stepwise by +¼ of λ1 for one step. In FIG. 19, the abscissa axis represents the step difference where the material of the element is a resin material. The ordinate axis represents the diffraction efficiency. In the case where the step difference is set near a position indicated by the vertical broken line, the diffraction efficiency for the +1st order diffracted light of the blue laser light (wavelength λ1) is calculated (scalar calculation) at about 80% so that, among other diffraction orders, the +1st order diffracted light has the strongest intensity.

As for the red laser light, the phase modulation amount changes stepwise by −π/2 for one step along the ascent of the steps as shown in FIG. 18(c). This means that the optical path difference changes stepwise by −¼ of λ2 for one step. As shown in FIG. 19, the diffraction efficiency for the −1st order diffracted light of the red laser light (wavelength λ2) is calculated (scalar calculation) at about 80% so that, among other diffraction orders, the −1st order diffracted light has the strongest intensity.

In this case, part of the infrared laser light (wavelength λ3) in which the strongest diffraction occurs is the −1st order diffracted light. The diffraction efficiency for this diffraction order is 40% or less as shown in FIG. 19. None of the diffraction efficiencies for the other diffraction orders exceeds the diffraction efficiencies of about 15% for ±2nd order diffracted light, and therefore, they are weak. By designing the element such that no part of the diffracted infrared light on the diffraction orders which have passed through the intermediate ring portion 1318 converges at the same point as part of the diffracted infrared light on a diffraction order which has passed through the inner portion 131C and which achieves a high diffraction efficiency, and such that the diffraction efficiency is less than 40% on every diffraction order, numerical aperture NA3 for CD is made smaller than NA1 and NA2, so that reading or recording of data from/in CD can stably be carried out.

Figure 20:
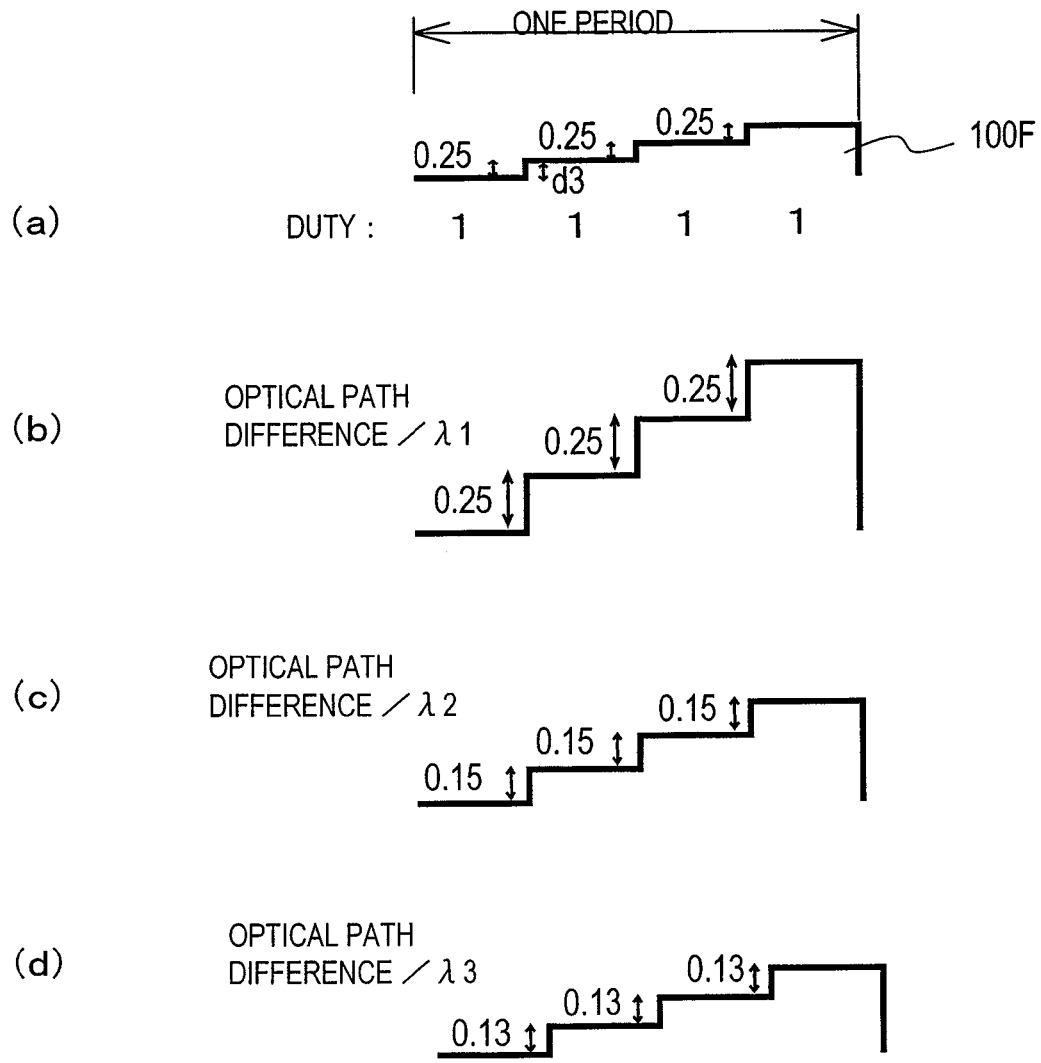
[FIG. 20] (a) is a diagram showing a cross-sectional shape of a diffraction element in an outer ring portion for one period according to an embodiment of the present invention. (b) is a diagram showing the phase modulation amount for blue light which is produced by the cross-sectional shape. (c) is a diagram showing the phase modulation amount for red light which is produced by the cross-sectional shape. (d) is a diagram showing the phase modulation amount for infrared light which is produced by the cross-sectional shape.

Next, the shape of the diffraction element 131 in the outer ring portion 131F for one period and the phase modulation amount produced by the shape are described with reference to FIG. 20.

FIG. 20(a) shows a physical cross-sectional shape (stepped grating shape) 100F of the diffraction element 131 in the outer ring portion 131F for one period. FIG. 20(b) shows the phase modulation amount for the blue light which is produced by the cross-sectional shape 100F. FIG. 20(c) shows the phase modulation amount for the red light which is produced by the cross-sectional shape 100F. FIG. 20(d) shows the phase modulation amount for the infrared light which is produced by the cross-sectional shape 100F.

In FIG. 20(a), the vertical direction represents the step difference. The refractive index of the material of the element for the blue laser light is denoted by "nb". As one unit of the step difference, an amount which produces an optical path difference for the blue laser light equal to about 0.25 times the wavelength, i.e., an amount which produces the phase difference of about $\pi/2$, is referred to as "unit step difference d3". The actual dimension of unit step difference d3 is $d3=\lambda1/(nb-1)\times0.25$.

On the other hand, the optical path difference which is provided by step difference d3 in the red laser light is $d3\times(nr-1)/\lambda2$ where nr is the refractive index of the material of the element for the red laser light. When a common optical material is used, the optical path difference is equal to about 0.15 times the wavelength of the red laser light, and the phase modulation amount for one step is about $0.3\pi$. Likewise, the optical path difference for the infrared light is equal to about 0.13 times the infrared light wavelength, and the phase modulation amount for one step is about $0.26\pi$.

Figure 21:
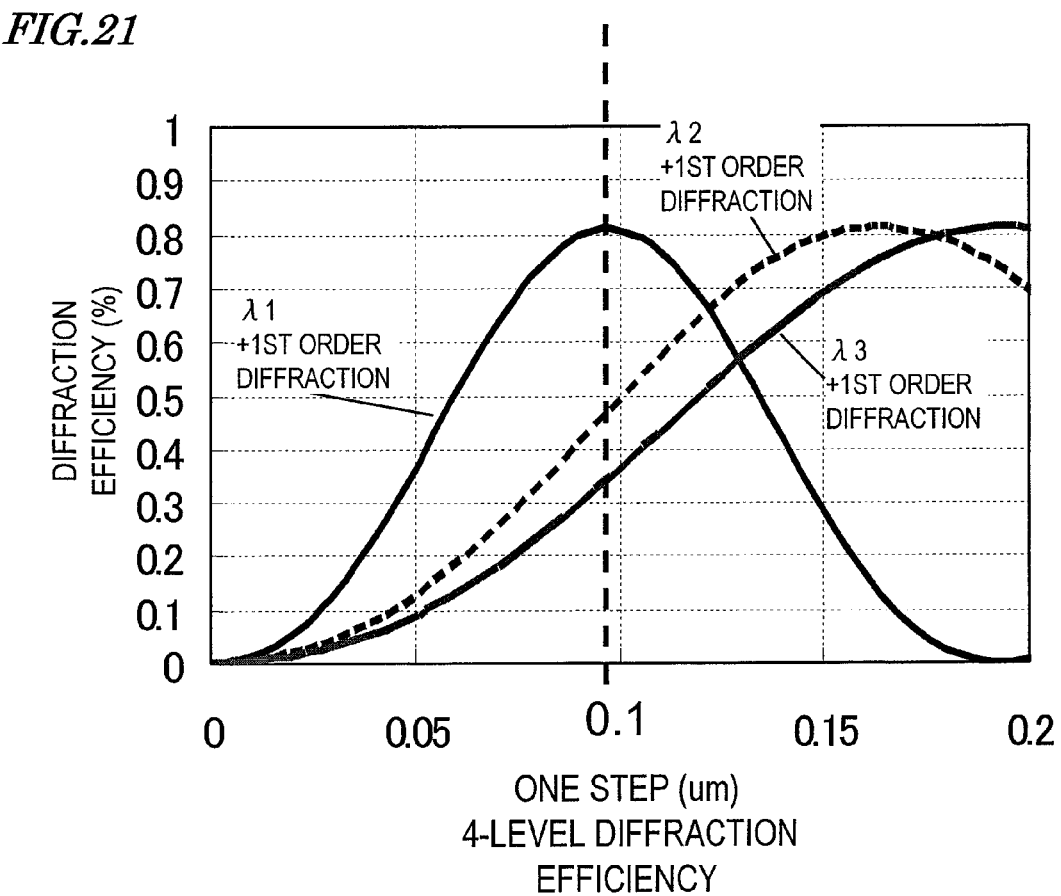
[FIG. 21] Graph showing the diffraction efficiency according to an embodiment of the present invention.

In the case of the cross-sectional shape shown in FIG. 20(a) which has such a stepped shape that one step difference of the grating is d3, the number of step levels is 4, and the ratio of the step width is approximately 1:1:1:1, the phase modulation amount changes stepwise by $\pi/2$ for one step along the ascent of the steps as shown in FIG. 20(b). This means that the optical path difference changes stepwise by $+\frac{1}{4}$ of $\lambda1$ for one step. In FIG. 21, the abscissa axis represents the step difference where the material of the element is a resin material. The ordinate axis represents the diffraction efficiency. In the case where the step difference is set near a position indicated by the vertical broken line, the diffraction efficiency for the +1st order diffracted light of the blue laser light (wavelength $\lambda1$) is calculated (scalar calculation) at about 80% so that, among other diffraction orders, the +1st order diffracted light has the strongest intensity.

As for the red laser light, the phase modulation amount changes stepwise by $0.3\pi$ for one step along the ascent of the steps as shown in FIG. 20(c). This means that the optical path difference changes stepwise by 0.15 times $\lambda2$ for one step. As shown in FIG. 21, the diffraction efficiency for the +1st order diffracted light of the red laser light (wavelength $\lambda2$) is calculated (scalar calculation) at about 50% so that, among other diffraction orders, the +1st order diffracted light has the strongest intensity. This is on the same diffraction order as that of the blue laser light so that the aberration for the optical disc 10 is large, and hence, the light is not condensed thereon. The diffraction efficiency of the −1st order diffracted light which undergoes a concave lens action is 10% or less, which means it is sufficiently weak. Thus, such requirements that a small numerical aperture is employed for the red laser light to the optical disc 10, and that numerical aperture NA1 used in recording and reading of data in/from the optical disc 9 with the blue laser light is larger than numerical aperture NA2 used in recording and reading of data in/from the optical disc 10 with the red laser light (NA1>NA2), can be met.

The same applies to the infrared light, and the requirement of NA1>NA3 can be met.

The diffraction efficiency of the grating formed in the outer ring portion 131F for part of the blue light on a predetermined diffraction order (e.g., +2nd) is higher than the diffraction efficiency for the remaining part of the blue light on the other diffraction orders than the predetermined diffraction order. The diffraction efficiency for the predetermined diffraction order (e.g., +2nd) of the blue light is higher than the diffraction efficiency for a predetermined diffraction order (e.g., −2nd) of the red light and is higher than the diffraction efficiency for a predetermined diffraction order (e.g., −3rd) of the infrared light.

With the above-described configuration, the height of the grating in the outer ring portion 131F in which the grating pitch is relatively narrow can be decreased, and therefore, the element can easily be manufactured. At the same time, such requirements that a small numerical aperture is employed for the red laser light to the optical disc 10, and that a small numerical aperture is employed for the infrared laser light to the optical disc 11, and that numerical aperture NA1 used in recording and reading of data in/from the optical disc 9 with the blue laser light is larger than NA2 and NA3, can be met.

Figure 22:
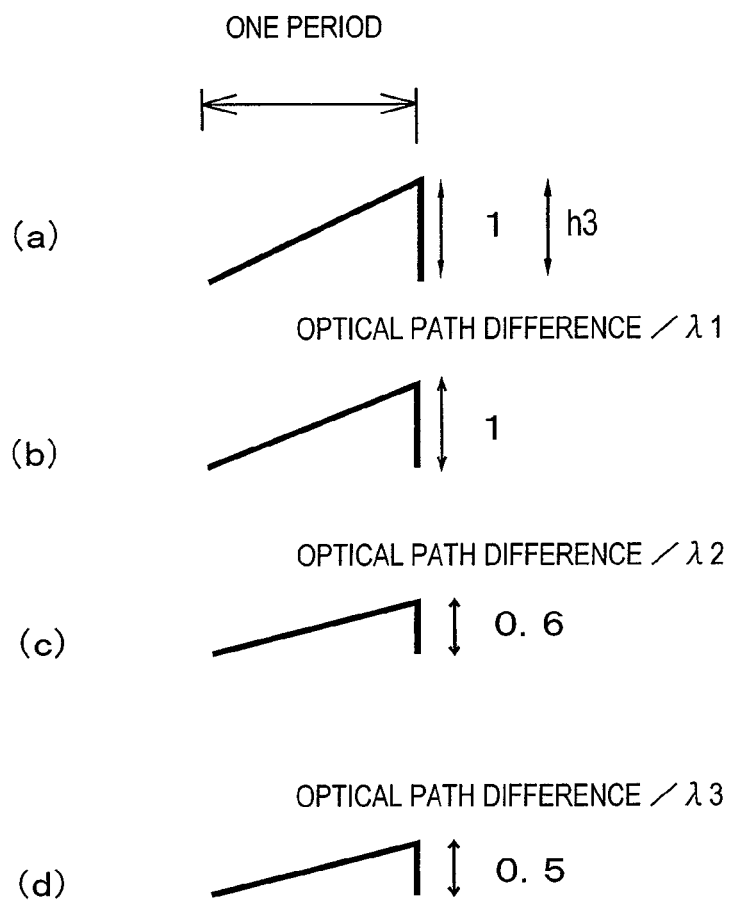
[FIG. 22] (a) is a diagram showing a cross-sectional shape of a diffraction element in an outer ring portion for one period according to an embodiment of the present invention. (b) is a diagram showing the phase modulation amount for blue light which is produced by the cross-sectional shape. (c) is a diagram showing the phase modulation amount for red light which is produced by the cross-sectional shape. (d) is a diagram showing the phase modulation amount for infrared light which is produced by the cross-sectional shape.

Next, other realization methods for the outer ring portion 131F are described with reference to FIG. 22. FIG. 22 shows a cross-sectional shape of the diffraction element in the outer ring portion 131F for one period and the phase modulation amount which is produced by the cross-sectional shape.

FIG. 22(a) shows a physical cross-sectional shape (comb teeth shape) of the diffraction element 131 in the outer ring portion 131F for one period. FIG. 22(b) shows the phase modulation amount for the blue light which is produced by the cross-sectional shape. FIG. 22(c) shows the phase modulation amount for the red light which is produced by the cross-sectional shape. FIG. 22(d) shows the phase modulation amount for the infrared light which is produced by the cross-sectional shape.

In FIG. 22(a), the vertical direction represents the depth of the comb teeth shape in the optical axis direction. The refractive index of the material of the element for the blue laser light is denoted by "nb". The depth of the comb teeth shape, h3, is such a depth that the optical path difference for the blue laser light is approximately equal to the wavelength of the blue laser light, i.e., the phase difference is about $2\pi$. The depth of the comb teeth shape, h3, can be calculated by the formula of $h3=\lambda1/(nb-1)$. When a common optical material is used, it is about 0.8 μm.

On the other hand, the optical path difference for the red laser light can be calculated by the formula of $h3\times(nr-1)/\lambda2$ where nr is the refractive index of the material of the element for the red laser light. It is thus calculated at about 0.6. This means that it is about 0.6 times the wavelength of the red laser light, and the phase modulation amount is about $1.2\pi$. Therefore, the +1st order diffracted light has the strongest intensity, which is about 60%.

In the case where the shape of the grating for one period is the comb-toothed cross-sectional shape with the depth of h3 as shown in FIG. 22(a), the blue laser light exhibits the strongest intensity in the +1st diffraction order. Also, the red laser light exhibits the strongest intensity in the +1st diffraction order, so that the diffraction occurs in the same direction but at a diffraction angle slightly greater than that of blue. The outer ring portion 131F of the optical element 131 is designed such that the blue laser light is condensed via the transparent layer with the base layer thickness of about 0.1 mm. In this case, the red laser light also undergoes the +1st order diffraction which is the same diffraction order as that of the blue laser light. The diffraction angle is greater because red light wavelength $\lambda 2$ is longer than blue light wavelength $\lambda 1$. In the case where the blazed direction of the diffraction element is designed such that a convex lens action is exerted as in the inner ring portion, the red laser light undergoes a strong convex lens action because the red laser light is diffracted at a greater diffraction angle. This is totally different from the fact that the red laser light undergoes a concave lens action in the inner portion 131C. Thus, the red laser light diffracted by the outer ring portion 131F is not condensed at a position where the red laser light which has passed through the inner portion 131C is condensed. In this way, numerical aperture NA1 used in recording and reading of data in/from the optical disc 9 with the blue laser light can be made larger than numerical aperture NA2 used in recording and reading of data in/from the optical disc 10 with the red laser light. This also applies to the infrared light. Numerical aperture NA1 used in recording and reading of data with the blue laser light can be made larger than numerical aperture NA3.

To converge the blue light with numerical aperture NA1 which has the largest value, it is necessary to converge all part of the blue light which has passed through the inner portion 131C, the intermediate ring portion 131B, and the outer ring portion 131F at the same focal point. Therefore, to reduce the axial chromatic aberration of the refractive objective lens 14, the diffraction element portion is desirably designed such that the three regions of the element as a whole exert a convex lens action.

Likewise, to converge the red light with numerical aperture NA2 which is smaller than NA1 and larger than NA3, it is necessary to converge all part of the red light which has passed through the inner portion 131C and the intermediate ring portion 131B at the same focal point. By using the above-described optical element configuration, the two regions of the diffraction element portion as a whole exert a concave lens action.

In the case where the diffraction element is designed using the above-described optical element configuration such that the inner portion 131C exerts a convex lens action on the blue light, the inner portion 131C exerts on the red light an inverse action to that on the blue light, i.e., a concave lens action. Therefore, a still larger concave lens action can be exerted on the infrared light. Thus, the focal length for the infrared light is the longest, the focal length for the red light is the second longest, and the focal length for the blue light is the shortest.

Figure 23:
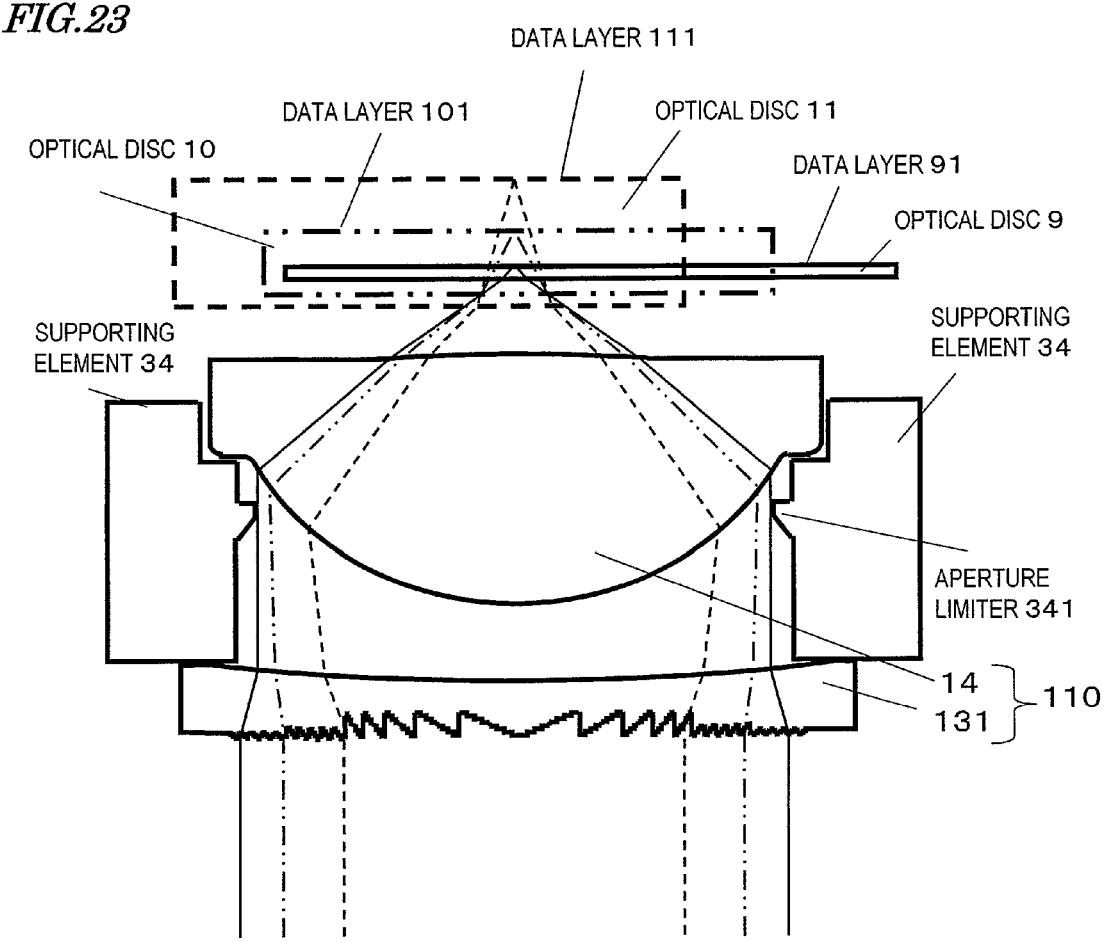
[FIG. 23] Diagram showing a complex objective lens according to an embodiment of the present invention.

Note that, as shown in FIG. 23, limiting the numerical aperture is effective at adjusting a value of numerical aperture NA which is employed in condensation of the blue laser light on the optical disc 9 to a desired value (about 0.85). Especially in the case where the objective lens 14 and the optical element 131 are integrally bound using a supporting element 34 and moved by an actuating means, the number of parts can be reduced by employing the shape of the supporting element 34 shown in FIG. 23 in which an aperture limiter 341 is integrally formed.

Also, the optical element 131 converts the wavefront. Thus, if there were errors in the relative positions of the optical element 131 and the objective lens 14, a wavefront as designed would not enter the objective lens 14, and a wavefront which actually impinges on an optical disc would have an aberration, so that the light condensing characteristics can deteriorate in some cases. In view of such an undesirable case, the optical element 131 and the objective lens 14 are thus integrally bound and integrally actuated by a common actuating means for focus control and tracking control, whereby the light condensing characteristics do not deteriorate.

(Embodiment 9)

Figure 24:
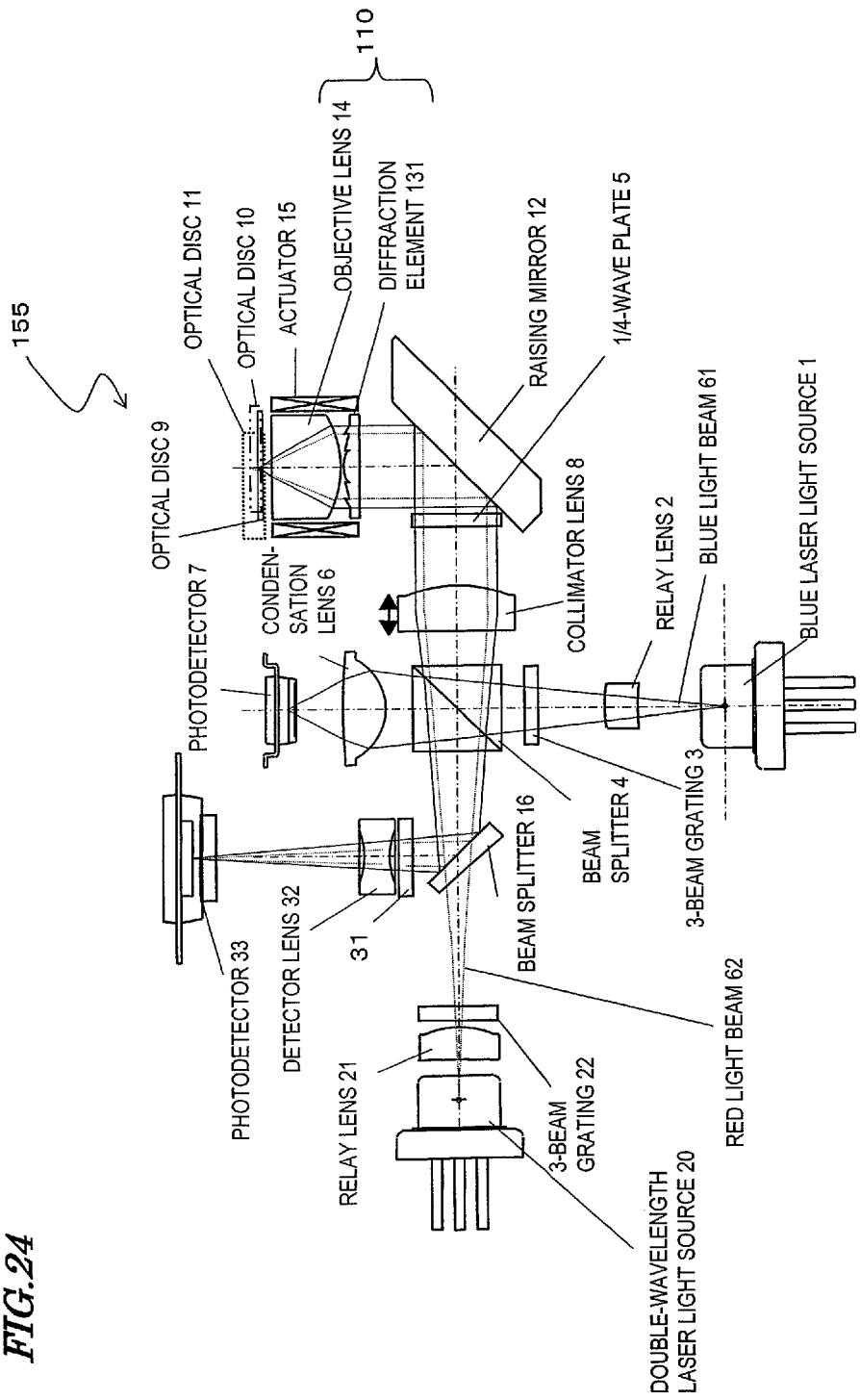
[FIG. 24] Diagram showing an optical head device according to an embodiment of the present invention.

FIG. 24 shows an optical head device 155 which is an embodiment of the present invention. The optical head device 155 includes components as shown in FIG. 24. Referring to FIG. 24, a laser light source 1 emits blue light at wavelength $\lambda 1$ (390 nm to 415 nm: typically about 408 nm). A double-wavelength laser light source 20 emits red light at wavelength $\lambda 2$ (630 nm to 680 nm: typically 660 nm to 660 nm in many devices) and infrared light at wavelength $\lambda 3$ (770 nm to 810 nm: typically 780 nm). Note that the red light and the infrared light may be emitted from different light sources.

A collimator lens (first convex lens) 8 converts laser light to generally-collimated light. A raising mirror 12 bends the optical axis. The objective lens 14 condenses laser light on a data layer of an optical disc. In the optical disc 9 which is a third-generation disc, base layer thickness t1 is about 0.1 mm (the base layer thickness of 0.11 mm or less including fabrication errors is herein referred to as "about 0.1 mm") or a smaller thickness. Recording and reading of data in/from the optical disc 9 are realized with the laser light at wavelength $\lambda 1$. In the optical disc 10 which is a second-generation disc, such as DVD, base layer thickness t2 is about 0.6 mm (the base layer thickness of 0.5 mm to 0.7 mm including fabrication errors is herein referred to as "about 0.6 mm"). Recording and reading of data in/from the optical disc 10 are realized with the laser light at wavelength $\lambda 2$. In the optical disc 11 which is a first-generation disc, such as CD, base layer thickness t3 is about 1.2 mm (the base layer thickness of 0.8 mm to 1.5 mm including fabrication errors is herein referred to as "about 1.2 mm"). Recording and reading of data in/from the optical disc 11 are realized with the laser light at wavelength $\lambda 2$. Here, t1<t2<t3.

As for the optical discs 9 and 10, only part of the base layer extending from a light entry surface to data layer is shown. The actual discs include a protecting plate combined therewith into a laminate, for improving the mechanical strength and for adjusting the external dimension to 1.2 mm which is the same as CD. The optical disc 10 is combined with a protecting member having a thickness of 0.6 mm. The optical disc 9 is combined with a protecting member having a thickness of 1.1 mm. The optical disc 11 is also provided with a thin protecting member. For the sake of simple illustration of the invention, such protecting members are not shown in FIG. 24.

Although in the described configuration the double-wavelength laser light source 20 which emits at two wavelengths, wavelength $\lambda 2$ and wavelength $\lambda 3$, is used, a different configuration may be possible. For example, different light sources may be used for the respective wavelengths, and the respective optical paths may be adapted using a dichroic mirror.

The laser light sources 1 and 20 may preferably be semiconductor laser device light sources. In this case, an optical head device and an optical data device using the same can be small-size, light-weight, small-power consumption devices.

In the case of recording or reading of data in/from the optical disc 9 which has the highest recording density among others, blue laser light 61 at wavelength $\lambda 1$ emitted by the laser light source 1 is reflected by a beam splitter 4, converted by the collimator lens 8 to generally-collimated light, and converted by a ¼-wave plate 5 to circularly-polarized light. The ¼-wave plate 5 is designed to act as a ¼-wave plate on both wavelength λ1 and wavelength λ2. Then, the optical axis is bent by the raising mirror 12. The light is condensed on the data layer 91 by the optical element 131 and the objective lens 14 via the base layer of the optical disc 9 which has a thickness of about 0.1 mm.

Note that the ¼-wave plate 5 may be interposed between the beam splitter 4 and the collimator lens 8. Although for the convenience of the drawings the laser light is shown as if it was bent upward by the raising mirror 12 in the drawing, the optical axis of the laser light in an actual device is bent toward the viewer of the drawing (or in the direction away from the viewer), i.e., in a direction perpendicular to the drawing sheet. For example, although the optical disc may extend in parallel with the drawing sheet, part of the shown system from the raising mirror 12 to the optical disc is rotated by 90° so that it lies across the drawing sheet for the convenience of illustration.

The blue laser light 61 reflected by the data layer returns the optical path it has come (return path), and converted by the ¼-wave plate 5 to linearly-polarized light in a polarization direction orthogonal to that of the first linear polarization. The linearly-polarized light totally passes through the beam splitter 4 and is totally reflected by a beam splitter 16. The reflected light is diffracted by a detector diffraction element 31. The focal length of the diffracted light is elongated by a detector lens 32. The light output from the detector lens 32 reaches a photodetector 33. By calculating the output of the photodetector 33, servo signals and data signals which are used for focus control and tracking control are obtained. As described above, the beam splitter 4 includes a polarization separator film by which, as for the laser light at wavelength λ1, linearly-polarized light in one direction is totally reflected, and linearly-polarized light in a direction perpendicular to that light is totally transmitted. Meanwhile, as will be described later, as for laser light at wavelength λ2, the red laser light 62 and infrared light emitted by the light source 20 are totally transmitted. Thus, the beam splitter 4 is an optical path branching element which has both optical polarization characteristics and wavelength selectivity. Note that the beam splitter 4 may be lacking in polarization dependence, and the ¼-wave plate 5 may be omitted.

In recording or reading of data in/from the optical disc 10, generally linearly polarized laser light at wavelength λ2 is emitted by the laser light source 20 and is transmitted through the beam splitter 16 and the beam splitter 4. The light is converted by the collimator lens 8 to generally-collimated light. Then, the optical axis is bent by the raising mirror 12. The light is condensed on the data layer 101 by the optical element 131 and the objective lens 14 via the base layer of the optical disc 10 which has a thickness of about 0.6 mm.

The blue laser light reflected by the data layer returns the optical path it has come (return path), and totally passes through the beam splitter 4 and is totally reflected by the beam splitter 16. The reflected light is diffracted by the detector diffraction element 31. The focal length of the diffracted light is elongated by the detector lens 32. The light output from the detector lens 32 reaches the photodetector 33. By calculating the output of the photodetector 33, servo signals and data signals which are used for focus control and tracking control are obtained. To obtain the servo signals for the optical discs 9 and 10 from the photodetector 33 which is commonly used, the blue laser 1 and the red light emitting point of the light source 20 are adapted to be in an image formation relationship relative to a common position on the objective lens 14 side. With such an arrangement, the number of detectors and wires can be reduced.

The beam splitter 16 is a polarization separator film by which, as for wavelength λ2, linearly-polarized light in one direction is totally transmitted, and linearly-polarized light in a direction perpendicular to that light is totally reflected. Meanwhile, as for laser light at wavelength λ1, the blue laser light 61 is totally transmitted. Thus, the beam splitter 16 is also an optical path branching element which has both optical polarization characteristics and wavelength selectivity. Note that the beam splitter 16 may also be lacking in polarization dependence, and the ¼-wave plate 5 may be omitted. Recording or reading of data in/from the optical disc 11 with infrared light emitted by the light source 20 may be realized in the same way as the recording or reading of data in/from the optical disc 10 with red light emitted by the light source 20.

Now, referring again to FIG. 23, the functions and structures of the optical element 131 and the objective lens 14 are described.

The optical element 131 is desirably configured such that, by combing a diffraction element and a refraction surface, the degree of collimation of the blue laser light 61 at the design reference wavelength is scarcely varied. In the case where the wavefront of the blue laser light is not converted, the objective lens 14 is designed such that generally-collimated light at wavelength λ1 is condensed on the data layer 91 via base layer thickness t1 of the optical disc 9. Since the optical element 131 does not perform a wavefront conversion on the blue laser light, it is not necessary to adjust the relative positions of the optical element 131 and the objective lens 14 with high accuracy in the context of recording or reading of data in/from the optical disc 9. As for the light at wavelength λ1 which has the shortest wavelength and which is employed for recording or reading of data in/from the optical disc 9 having the highest recording density, the positioning error tolerances of the objective lens 14 and the optical element 131 can be relaxed. In the case of recording or reading of data in/from an optical disc having a lower recording density with laser light at a longer wavelength, the recording or reading of data may be carried out with consideration for the relative positions of the optical element 131 and the objective lens 14. Therefore, the error tolerances of the relative positions can be relaxed, so that an optical head device of higher productivity can be realized.

The red laser light 62 at wavelength λ2 undergoes a wavefront conversion by the optical element 131.

Thus, if there were deviations in the relative positions of the optical element 131 and the objective lens 14 from the design specifications, a wavefront as designed would not enter the objective lens 14, and a wavefront which actually impinges on the optical disc 10 would have an aberration, so that the light condensing characteristics can deteriorate. In view of such, desirably, the optical element 131 and the objective lens 14 are integrally bound by the supporting element 34, or the above-described diffraction element or phase-type element is directly formed in the surface of the objective lens 14, so that they can be integrally actuated by a common actuating means (actuator) 15 for focus control and tracking control. The lens tilt control can also be realized by the actuating means (actuator) 15.

Furthermore, effective element examples in the general structure of the optical head device will be additionally described below. However, the essence of the present application resides in the optical element 131 which is configured to realize multiple compatibility recording and reading with the optical discs 9, 10 and 11. The other elements described herein, including the elements which will be described later and the elements which have been previously described, such as the beam splitters, the detector lenses, and the detector diffraction elements, are not indispensable. These elements may be preferable elements which have some advantages, but may be replaced by any other elements as necessary.

In FIG. 24, a 3-beam grating (diffraction element) 3 may be further provided at a position between the blue laser 1 and the beam splitter 4, so that a tracking error signal of the optical disc 9 can be detected using a well-known differential push pull (DPP) method.

A relay lens 2 may be further provided at a position between the blue laser 1 and the beam splitter 4, so that the numerical aperture for the blue laser light 61 on the collimator lens 8 side can be adjusted to an appropriate value.

A 3-beam grating (diffraction element) 22 may be further provided at a position between the light source 20 and the beam splitter 16, so that a tracking error signal of the optical disc 10 can be detected using a well-known differential push pull (DPP) method.

Displacing the collimator lens 8 along the optical axis (in the horizontal directions of FIG. 1) to change the degree of collimation of the laser light may be effective. If there is an error in thickness of the base layer, or a base layer thickness error due to the interlayer thickness provided when the optical disc 9 is a two-layer disc, a spherical aberration occurs. The spherical aberration can be corrected by displacing the collimator lens 8 along the optical axis.

The correction of the spherical aberration by displacing the collimator lens 8 is possible by the amount of about several hundreds of mA under the condition where NA for the condensed light on the optical disc is 0.85. Also, a variation in thickness of the base layer of ±30 μm can be corrected. Recording or reading of data in/from the optical disc 11 with the infrared laser light may be carried out using a configuration where the collimator lens 8 is displaced leftward in FIG. 24, i.e., to a position closer to the light source 20. In this case, the infrared laser light traveling toward the objective lens 14 becomes divergent light so that a condensation spot on the optical disc 11 is moved away from the objective lens 14. Meanwhile, part of the aberration due to the base layer thickness is corrected, and the aberration correction amount required in the optical element 131 is reduced. Therefore, the diffraction element pitch is increased, so that manufacture of the optical element 131 can be facilitated.

The beam splitter 4 may be configured to transmit part of the linearly-polarized light emitted from the blue laser light source 1 (e.g., about 10%) and pass the transmitted laser light to a photodetector 7 via a condensation lens 6. In this case, the change in amount of emission by the blue laser 1 can be monitored using a signal obtained from the photodetector 7. Also, the monitored emission amount change can be fed back such that the amount of emission by the blue laser 1 can be maintained constant. The photodetectors 7 and 33 receive reflected light from the data media 9, 10, and 11 to output electric signals according to the amount of the received light.

The beam splitter 4 may be configured to reflect part of the linearly-polarized light emitted from the light source 20 (e.g., about 10%) and pass the reflected laser light to the photodetector 7 via the condensation lens 6. In this case, the change in amount of emission by the light source 20 can be monitored using a signal obtained from the photodetector 7. Also, the monitored emission amount change can be fed back such that the amount of emission by the light source 20 can be maintained constant.

The optical head device 155 is compatible with three disc types, BD, DVD, and CD, but may be a device compatible with two disc types, BD and DVD. Alternatively, it may be a device compatible with HD-DVD.

(Embodiment 10)

Figure 25:
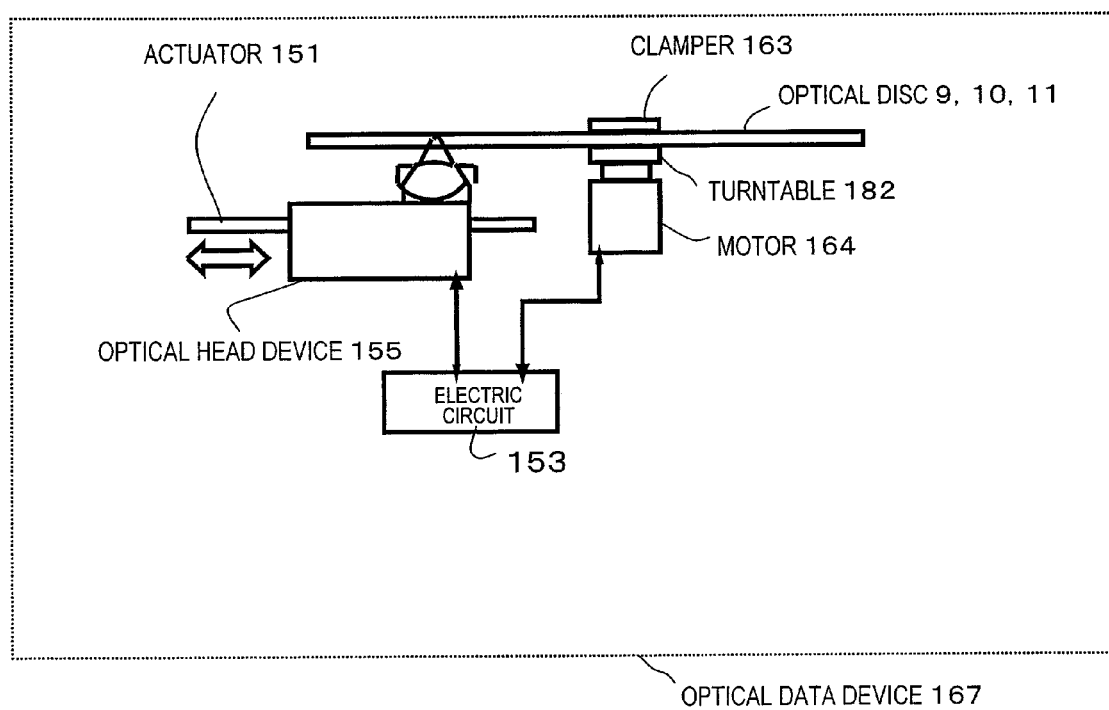
[FIG. 25] Diagram showing an optical data device according to an embodiment of the present invention.

FIG. 25 shows an optical data device 167 including the optical head device 155 which is an embodiment of the present invention. The optical head device 155 includes the components as shown in FIG. 25. In FIG. 25, the optical disc 9 (or 10, 11: not repeated below) is loaded on a turntable 182 and spun by a motor 164. The previously-described optical head device 155 is roughly moved by an actuator 151 of the optical head device to a track of the optical disc in which desired data is stored.

The optical head device 155 sends a focus error signal or a tracking error signal to an electric circuit 153 in accordance with the positional relationship with the optical disc 9. The electric circuit 153 is a control section for controlling the operations of the components of the optical data device 167, such as the optical head device 155, the motor 164, etc. According to a received signal, the electric circuit 153 sends a signal to the optical head device 155 for minutely moving the objective lens. Based on this signal, the optical head device 155 performs focus control and tracking control with respect to the optical disc, and the optical head device 155 reads, writes (records), or erases data from/in the disc. The electric circuit 153 operates based on signals obtained from a photodetector of the optical head device 155 to control and drive the motor 164, the complex objective lens 110, the light sources 1 and 20, the actuating means 15, and other components.

The optical data device 167 of this embodiment uses the above-described optical head device as the optical head device 155. Therefore, a small-size, inexpensive, light-weight device which uses a single unit of optical head device composed of a smaller number of parts and which is compatible with a plurality of optical discs of different recording densities can advantageously be realized.

(Embodiment 11)

Next, the lens tilt correction control in the optical data device 167 of embodiment 10 of the present invention is described.

Figure 37:
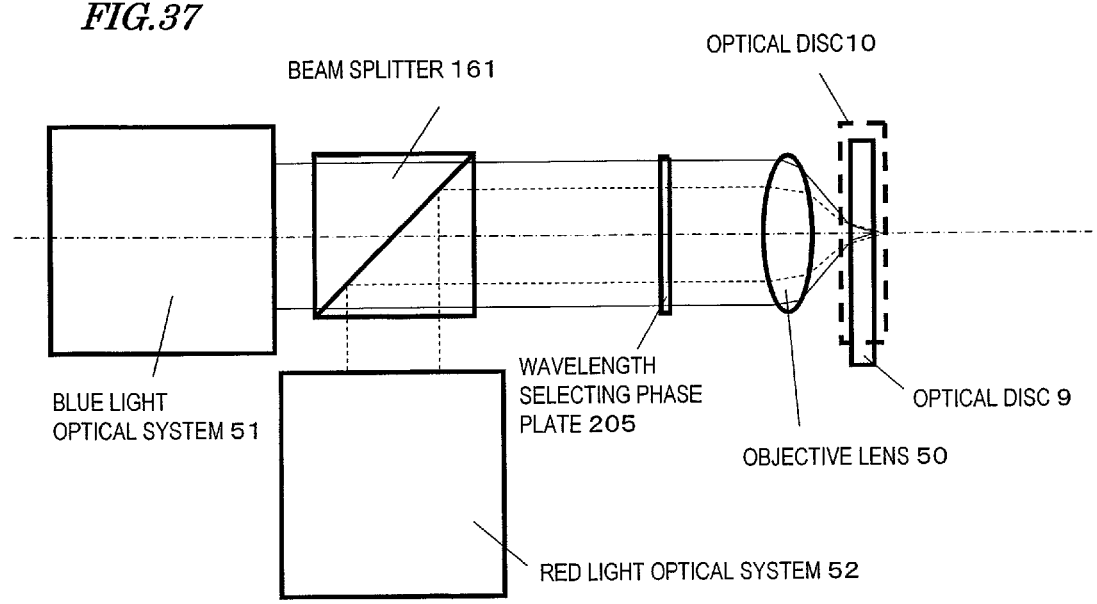
[FIG. 37] Diagram showing an optical head device according to an embodiment of the present invention.
Figure 38:
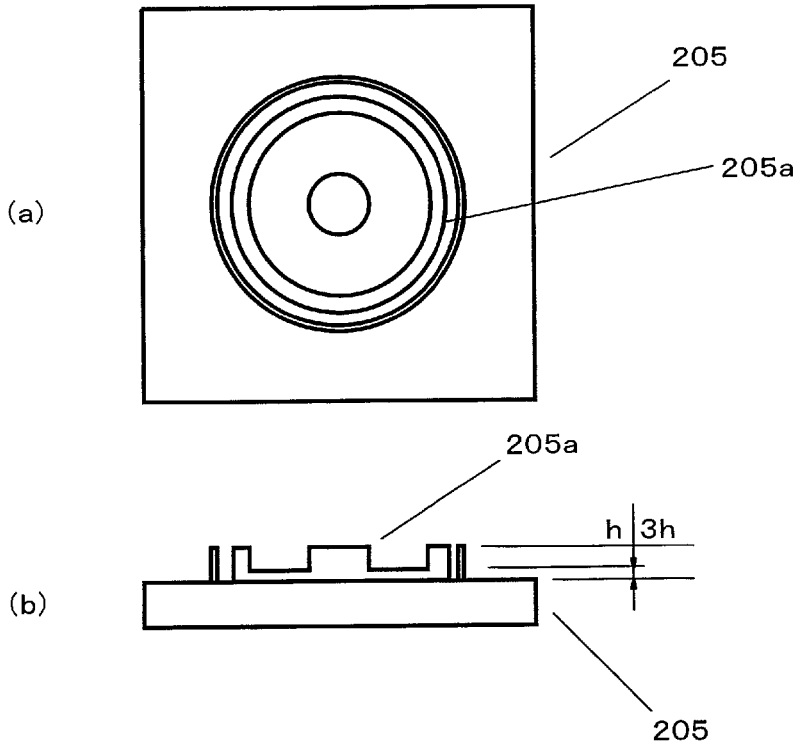
[FIG. 38] (a) is a plan view of an optical element. (b) is a cross-sectional view of the optical element.
Figure 39:
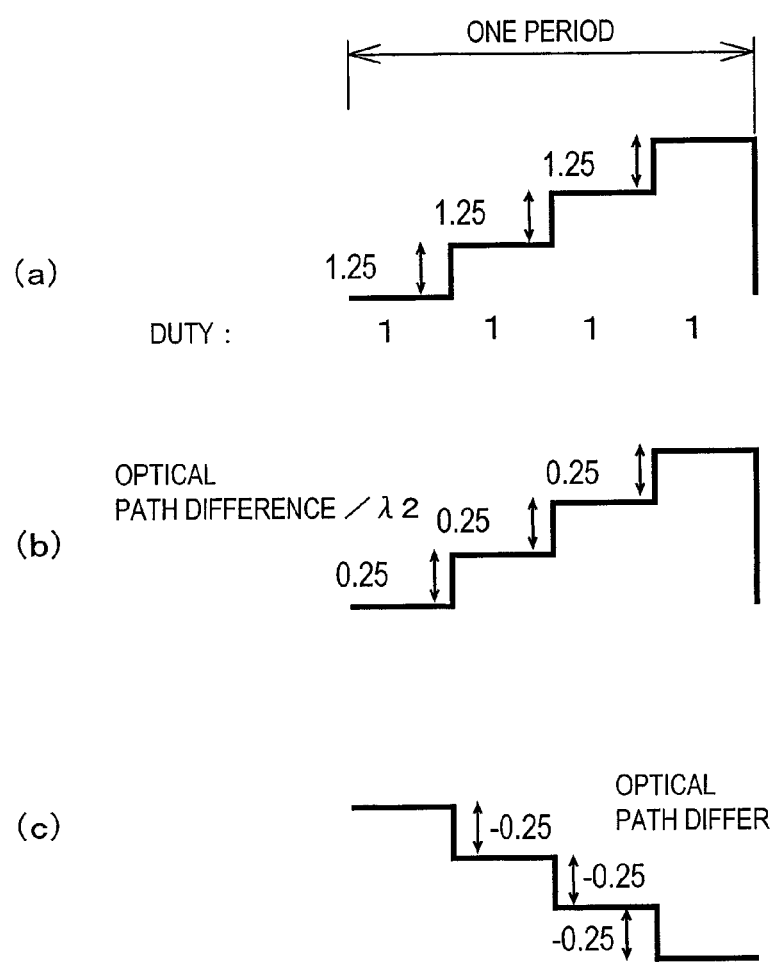
[FIG. 39] (a) is a diagram showing a cross-sectional shape of a diffraction element. (b) is a diagram showing the phase modulation amount for blue light which is produced by the cross-sectional shape. (c) is a diagram showing the phase modulation amount for red light which is produced by the cross-sectional shape.
Figure 40:
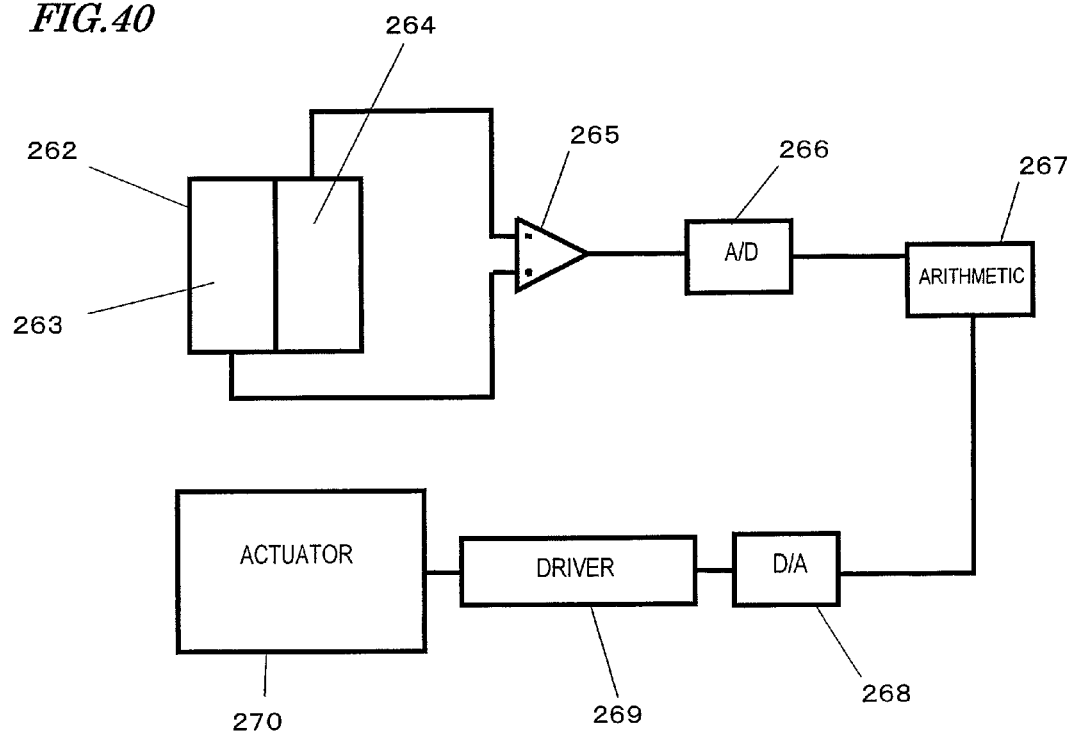
[FIG. 40] Diagram showing an optical head device.
Figure 41:
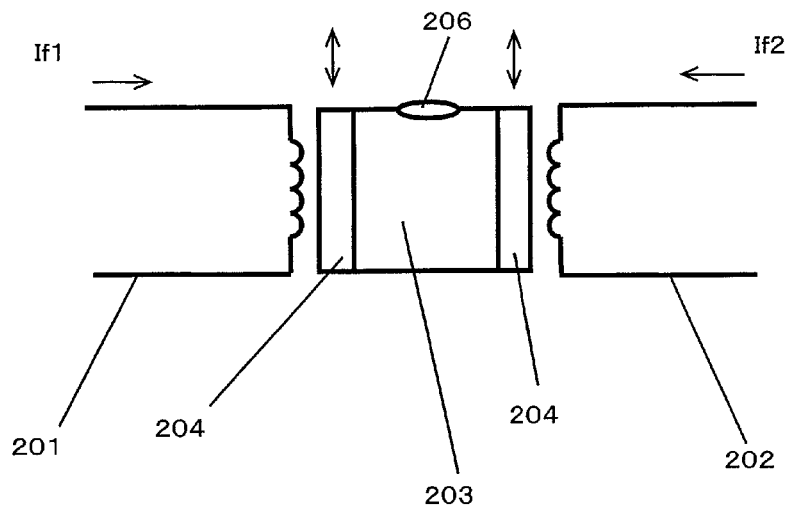
[FIG. 41] Diagram showing an objective lens actuator.

As described above, the base layer thickness of the third-generation optical discs is about 0.1 mm, and the base layer thickness of the second-generation optical discs is about 0.6 mm. When multiple compatibility is realized using a single objective lens, the position of the convergence point can be moved by at most about 10% of the focal length of the objective lens, i.e., by only about 0.1 mm to 0.2 mm (this amount is referred to as "d0") even when the wavelength of the light source is changed or when a wavelength selecting phase plate 205 or the like is provided. Considering that the difference between the base layer thickness of the second-generation optical discs and the base layer thickness of the third-generation optical discs is 0.5 mm and that the refractive index of the base layer material is about 1.5, the distance of a space between the objective lens surface and the optical disc surface when light is converged on the data layer (a surface of the optical disc on the right side in FIG. 37), so-called "working distance (WD)", is shorter in the second-generation optical discs. Assuming that d0 is at most 0.3 mm, amount dWD which makes WD shorter is:

$$dWD = (T3 - T2)/n - d0$$
$$= (0.6 - 0.1)/1.5 - d0$$
$$\approx 0.33 - d0 > 0.$$

Recording and reading of data in/from a high-density optical disc requires using an objective lens which has a high numerical aperture (NA). In the manufacture of a high-NA objective lens, the tolerances to the center misalignment between refraction surfaces and the tilt are small, and therefore, precise manufacture techniques are necessary. Since the tolerances become smaller as the WD is designed to be larger, the manufacture difficulty increases. Thus, the WD of the objective lenses for high-density optical discs is desirably designed to be the minimum necessary, which is typically about 0.3 mm. Here, according to the above formula of dWD, the WD for the second-generation optical discs is shorter than that for the third-generation optical discs when multiple compatibility is realized, and therefore, it is at most 0.3 mm.

Figure 42:
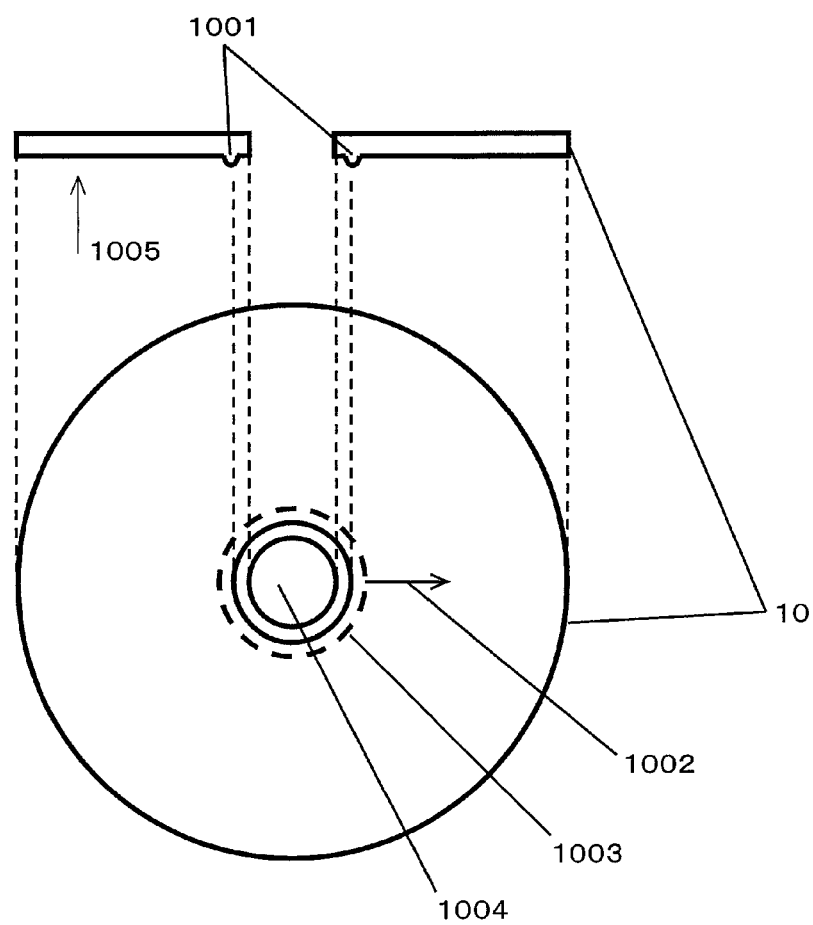
[FIG. 42] Diagram showing an optical disc.

A configuration of a DVD, which is a second-generation optical disc, is schematically shown in FIG. 42. The upper part of the drawing sheet shows a cross-sectional view, and the lower part shows a plan view. In the cross-sectional view, laser light 1005 comes in from the lower part of the drawing sheet for recording or reading of data. At the inner perimeter of the optical disc 10, the disc has a hole 1004. At a slightly outer position thereof, there is a protrusion 1001, and at a more outer position, there is a data zone boundary 1003. A region more outer than the data zone boundary 1003 is a data region on which the laser light 1005 is to impinge. The protrusion 1001 serves to protect a laser light entry surface of the optical disc 10. However, as previously described, the WD is small when multiple compatibility reading is realized using the same objective lens for a third-generation optical disc and a second-generation optical disc, it is necessary to ensure that the protrusion 1001 and the objective lens do not come in contact with each other.

In the case where the aberration generated due to the tilt of the optical disc 10 is reduced by tilting the objective lens, the objective lens cannot always be tilted at an optimum angle. The objective lens may sometimes be tilted at an angle greater than necessary in some cases. Furthermore, there is a probability that, on the inner perimeter side, the optical disc may be tilted in such a direction that the objective lens and the optical disc 10 come closer to each other. There has not been an effective way to avoid the objective lens and the optical disc 10 being tilted in such directions that they come closer and come in contact with each other.

Figure 26:
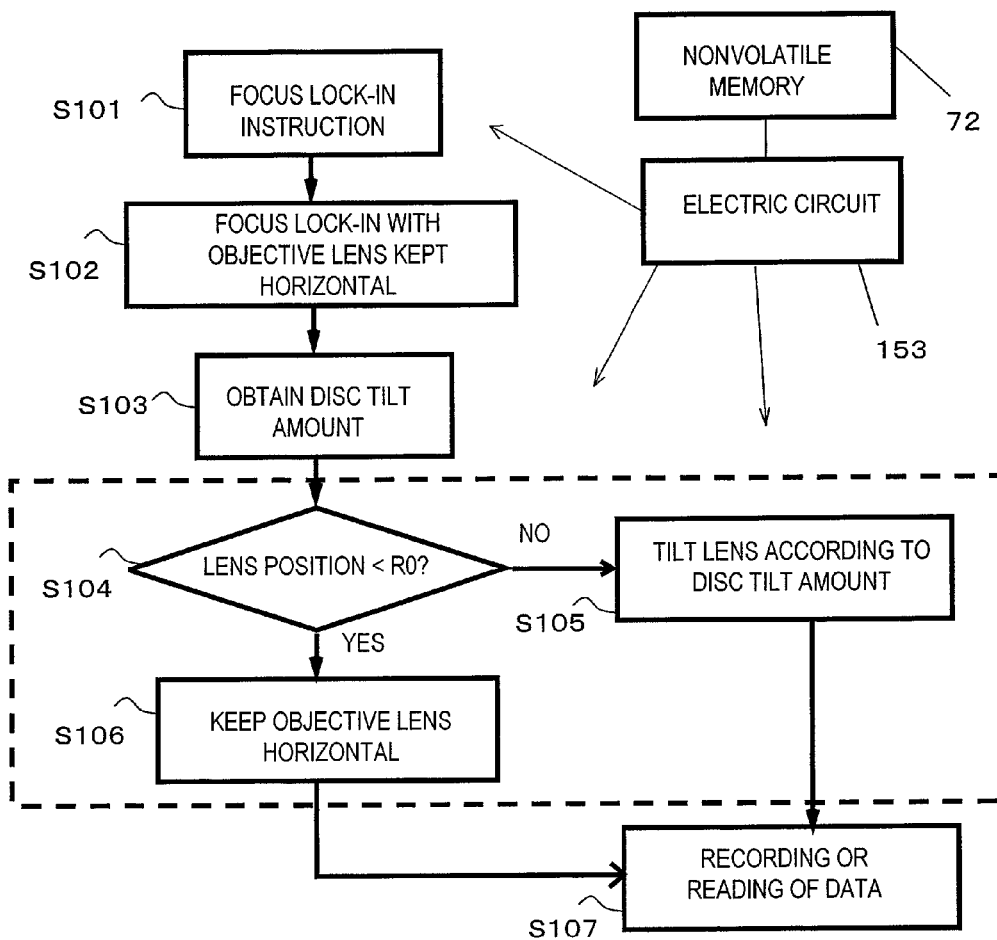
[FIG. 26] Chart illustrating a lens tilt correction control operation according to an embodiment of the present invention.

FIG. 26 shows an example of the procedure for determining whether or not a lens tilt operation is performed according to an embodiment of the present invention. Although omitted from the drawing, this process starts at power-on or insertion of an optical disc. When a focus lock-in instruction is issued by the electric circuit (control section) 153 of the optical data device 167 (step 101), a focus lock-in operation is carried out without tilting of the objective lens 14 (step 102). The electric circuit 153 is a circuit which is composed of one or more integrated circuit elements. The process which will be described below is performed according to an instruction from the electric circuit 153. The "horizontality" of the objective lens is defined in accordance with the installation requirements of a disc clamp or an optical head device. The optical disc surface orientation of an optical disc with no warpage under the circumstance where the optical disc is loaded on an optical data device errorlessly manufactured as designed is defined as "horizontal". The extent of "horizontal" includes a tilt deviation caused due to fabrication errors or the like. An advantage of the present invention is to maintain the objective lens basically horizontal without using a tilt function of the objective lens for focus lock-in. Should the objective lens be tilted, an edge of the objective lens or part of a lens holder of the objective lens would come closer to and collide with the optical disc at the time of focus lock-in. The probability of such a problem can advantageously be decreased by the present invention.

The focus lock-in operation includes activating a focus control loop (ON) at a timing when a certain condition is met, e.g., when a focus servo signal goes beyond a specific threshold while the objective lens is moving along the optical axis. The operation desirably includes, prior to the step of activating the focus control loop (ON), the process of determining the optical disc type or the process of determining the condition parameters of the condition for activating the focus control loop (ON). The determination of the optical disc type may be realized by, for example, moving the objective lens along the optical axis and detecting a change in the focus error signal which is caused by the movement of the objective lens. At the same time, for example, the condition parameters for activating the focus control loop (ON), such as a focus error signal threshold, can be determined based on the amount of light reflected from the optical disc. Also, subsequent to the focus control procedure, the tracking control procedure may be carried out to detect the current position of the objective lens.

After the focus lock-in, the amount of the tilt of the disc is obtained (step 103). The disc tilt amount can be obtained by radially moving the objective lens with the focus control being kept active (ON), estimating the axial position of the data layer along the optical axis from a change in the focus actuation electric current of the objective lens, and calculating the disc tilt amount from the amount of axial position shift of the data layer and the radial position of the objective lens. Alternatively, by tilting the objective lens position to detect a state of the objective lens in which the tracking error signal is maximum, the disc tilt amount and the optimum lens tilt amount can be detected. As for a disc from which data has been read once, the disc tilt amount may be stored in a nonvolatile memory 72 included in the optical data device. When the apparatus is once powered off and then powered on, a recording or reading operation can quickly be started by retrieving the disc tilt amount from the nonvolatile memory 72. After the disc tilt amount has been obtained, what position the position of the objective lens 14 is relative to the optical disc is determined (step 104). Specifically, it is determined whether the radial position of the objective lens 14 relative to the center of the optical disc is greater than predetermined radial distance R0. Here, the position of the objective lens 14 over the optical disc refers to, for example, a position over the optical disc where light which has passed through the objective lens 14 is converged. Alternatively, the position of the optical disc over the objective lens 14 may refer to a position over the optical disc to which the objective lens 14 itself opposes. If the position is greater than R0, the objective lens 14 is tilted according to the disc tilt amount (step 105), and recording or reading of data is carried out (step 107). Thus, if the position of the objective lens 14 is at a position closer to the outer perimeter of the optical disc than radial distance R0, the actuating means (actuator) 15 controlled by the electric circuit 153 tilts the objective lens 14 according to the tilt of the optical disc.

In the operation of determining the position of the objective lens relative to the optical disc at step 104, if the lens position is R0 or smaller, the objective lens is kept horizontal (step 106). Then, recording or reading of data is carried out (step 107). At step 106, the objective lens can be maintained horizontal by not performing the tilt correction operation. Specifically, if the position of the objective lens 14 is between the center of the optical disc and the radial position R0 over the optical disc, the actuator 15 holds the objective lens generally horizontal without performing the tilt correction operation. Thus, if the lens position is R0 or smaller, recording or reading of signals is carried out while the objective lens is maintained horizontal. This arrangement enables to avoid the objective lens, or part of the lens holder of the objective lens, coming in contact with the protrusion 1001 of FIG. 42 to make a scratch in the portion of the contact or cause the control to deviate so that the operation of recording or reading of signals is interrupted.

If the actuator is instructed to move the objective lens from a position greater than R0 to a position smaller than R0, the actuator first stops tilting the lens, and moves the lens to the position smaller than R0 after or while returning the objective lens to the horizontal attitude.

The process of obtaining the disc tilt amount at step 103 may be performed between the determination of the lens position at step 104 and the process of tilting the lens at step 105. When tilting the objective lens in search for the optimum state with the view of obtaining the disc tilt amount, the determination of the lens position at step 104 may be carried out prior to the other processes. This arrangement also enables to avoid the objective lens, or part of the lens holder of the objective lens, coming in contact with the protrusion 1001 of FIG. 42 to make a scratch in the portion of the contact or cause the control to deviate so that the operation of obtaining the disc tilt amount is interrupted. Thus, holding the objective lens horizontal at a position on the inner perimeter side scarcely causes adverse effects on the operation of recording or reading of data. This is because the optical disc is fixed relative to the hole at the disc center in the optical data device so that part of the optical disc near the inner perimeter has the same tilt as the tilt of a fixing portion of the optical data device, i.e., it is held horizontal. The amount of "warpage" or bent of the optical disc itself which is generated on the inner perimeter side is smaller than on the outer perimeter side, and therefore, the objective lens may be held substantially horizontal in a disc region on the inner perimeter side. The "horizontal" state of the objective lens includes a state in which the tilt is adjusted in the manufacture of the optical data device such that recording or reading of data can satisfactorily be carried out with a "horizontal" optical disc. In summary, an advantage of the present invention resides in that tilting the objective lens according to the tilt amount inherent to the disc is not performed in the inner disc region which is equal to or smaller than R0. The present invention was conceived in view of the fact that the amount of "warpage" or bent of the optical disc itself which is largely generated in the outer disc region is smaller in the inner disc region, and therefore, the objective lens may be held substantially horizontal in the inner disc region.

The protrusion 1001 may be at a radial position of about 20 mm. Therefore, the range of R0 which is considered as being appropriate is about 25 mm to 35 mm. However, it may be appropriately selected according to the amount of "warpage" of the optical discs circulated in the market.

The actuator 15 performs the lens tilt control operation on the optical discs 9, 10, and 11 of different types, which have different base layer thicknesses. Among these discs, the above lens tilt control operation is desirably performed on the optical disc 9 which has a larger base layer thickness.

Thus, according to the present invention, when the objective lens is tilted to compensate for the disc tilt, the actuator stops tilting the objective lens during the focus lock-in operation, or when the objective lens resides in a specific region, such as an inner disc region, in order to avoid increasing the probability of contact between the objective lens and the optical disc. The present invention is especially advantageous when an optical head which is configured to record or read data in/from a high-density optical disc using an objective lens of a large NA is employed for recording or reading of data in/from optical discs of older generations, such as CDs and DVDs, using the same objective lens.

The present invention advantageously enables to avoid the objective lens, or part of the lens holder of the objective lens, coming in contact with an optical disc to make a scratch in the portion of the contact or cause the control to deviate so that the operation of recording or reading of signals is interrupted.

Especially when the operation of reading data from the third-generation optical discs for which a high numerical aperture objective lens is to be used and the operation of reading data from optical discs from which data is to be read with a lower numerical aperture and which has a thicker base layer are performed using a single objective lens, the working distance becomes shorter. However, still there is an advantage of avoiding the objective lens, or part of the lens holder of the objective lens, coming in contact with an optical disc to make a scratch in the portion of the contact or cause the control to deviate so that recording or reading of data is interrupted.

(Embodiment 12)

Figure 27:
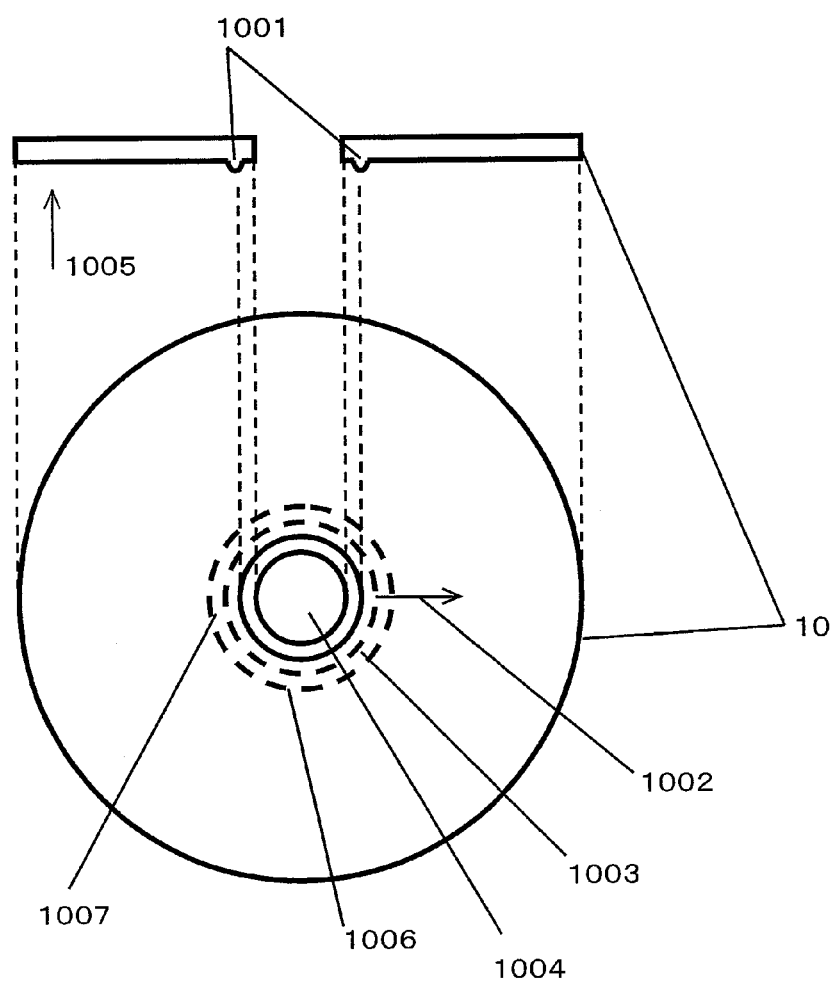
[FIG. 27] Diagram showing a configuration of an optical disc according to an embodiment of the present invention.

Embodiment 12 of the present invention is described with reference to FIG. 27 and FIG. 28. FIG. 27 shows a configuration of a DVD, which is a second-generation optical disc. The upper part of the drawing sheet shows a cross-sectional view, and the lower part shows a plan view. In the cross-sectional view, laser light 1005 comes in from the lower part of the drawing sheet for recording or reading of data. At the inner perimeter of the optical disc 10, the disc has a hole 1004. At a slightly outer position thereof, there is a protrusion 1001, and at a more outer position, there is a data zone boundary 1003. A region more outer than the data zone boundary 1003 is a data region on which the laser light 1005 is to impinge. A special-purpose region 1007 which resides between the imaginary boundaries 1003 and 1006 is used for a purpose different from normal data recording portions. The region 1007 may be, for example, a region for test writing in a data recording process, a region for storing data which describes the specifications of the optical disc itself, a region for storing the type and attribute of data written in a region outer than the boundary 1006, or a data region for storing data which is used for copyright protection. Since they are not general data in any case, a region in which the data is stored can be identified as an inner disc region. Whether or not they are the special-purpose regions can be determined by reading the data themselves or retrieving the addresses.

Figure 28:
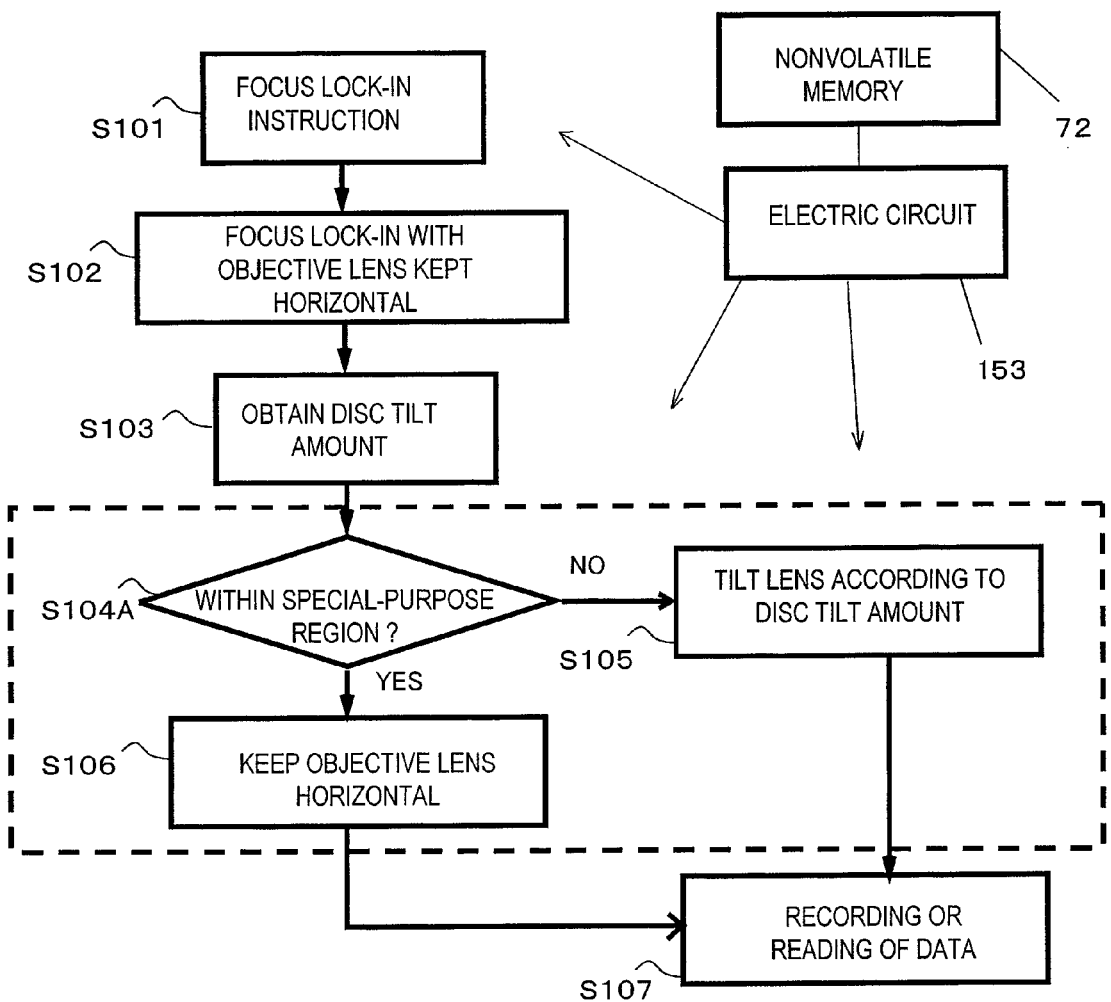
[FIG. 28] Chart illustrating a lens tilt correction control operation according to an embodiment of the present invention.

FIG. 28 shows an example of the procedure for determining using such a region whether or not a lens tilt operation is performed in the optical data device 167. If the position of the objective lens 14 is in the special-purpose region of the optical disc, the actuator 15 holds the objective lens generally horizontal without performing the tilt correction operation. If the position of the objective lens 14 is at a position outer than the special-purpose region of the optical disc, the actuator 15 tilts the objective lens 14 according to the tilt of the optical disc. Although not shown in the drawing, this process starts at power-on or insertion of an optical disc.

When a focus lock-in instruction is issued by the electric circuit 153 of the optical data device 167 (step 101), a focus lock-in operation is carried out without tilting of the objective lens (step 102). The electric circuit 153 and the definition of "horizontality" are the same as those of embodiment 11. After the focus lock-in, the amount of the tilt of the disc is obtained (step 103). After the disc tilt amount has been obtained, what position the objective lens 14 is at relative to the optical disc is determined (step 104A). The difference from embodiment 11 is this step. It is determined whether or not a region on which the laser light emitted from the objective lens 14 is impinging is the above-described special-purpose region. If it is not the special-purpose region, the lens is tilted according to the disc tilt amount (step 105), and recording or reading of data is carried out (step 107).

In the operation of step 104A, it is determined whether or not a region on which the laser light emitted from the objective lens is impinging is the above-described special-purpose region. If it is the special-purpose region, the objective lens is kept horizontal (step 106), and recording or reading of data is carried out (step 107). Thus, if the lens position is in the special-purpose region, recording or reading of signals is carried out while the objective lens is maintained horizontal. This arrangement enables to avoid the objective lens, or part of the lens holder of the objective lens, coming in contact with the protrusion 1001 of FIG. 42 to make a scratch in the portion of the contact or cause the control to deviate so that the operation of recording or reading of signals is interrupted.

If the actuator is instructed to move the objective lens from a position outer than the special-purpose region to a position within the special-purpose region, the actuator first stops tilting the lens, and moves the lens to the position within the special-purpose region after or while returning the objective lens to the horizontal attitude.

The process of obtaining the disc tilt amount at step 103 may be performed between the determination of the lens position at step 104A and the process of tilting the lens at step 105. The present invention was conceived in view of the fact that the amount of "warpage" or bent of the optical disc itself which is largely generated in part of the disc on the outer perimeter side is smaller on the inner perimeter side, and therefore, the objective lens may be held substantially horizontal in the inner disc region, and the inner disc region may be assigned as the special-purpose region.

(Embodiment 13)

Figure 29:
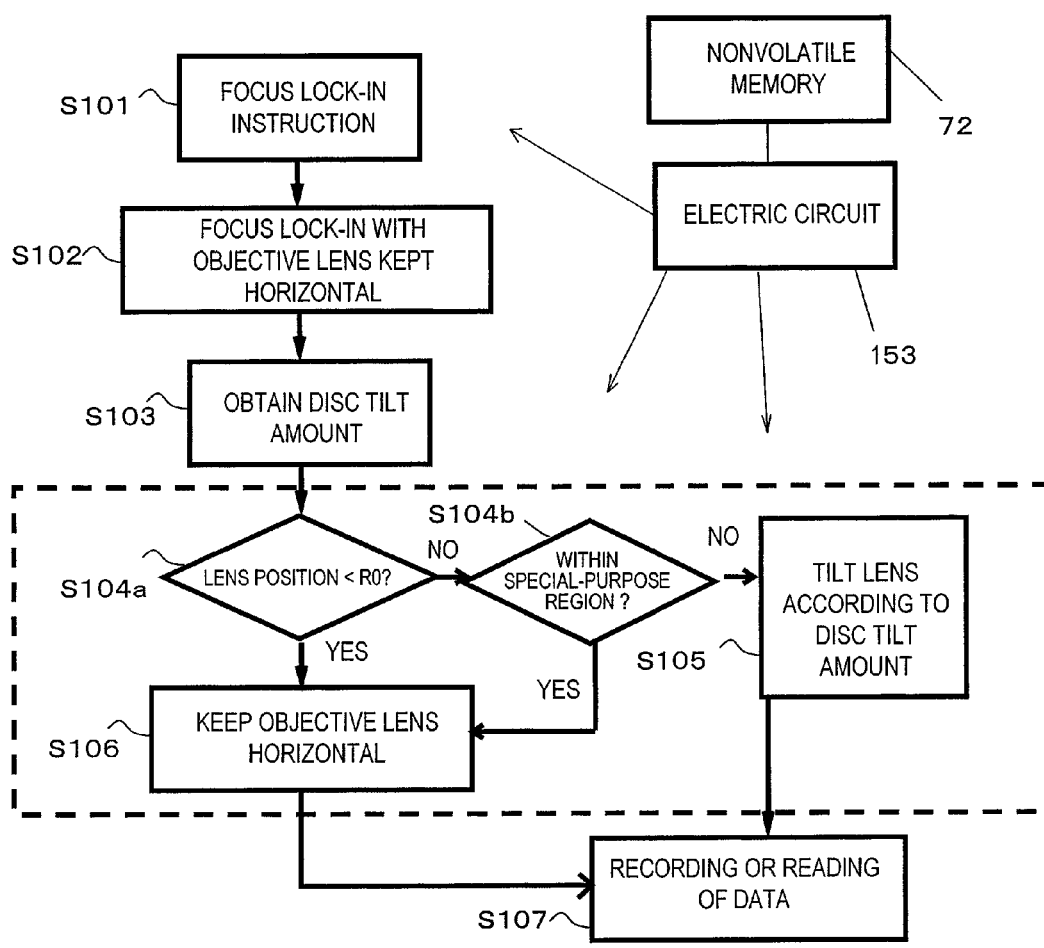
[FIG. 29] Chart illustrating a lens tilt correction control operation according to an embodiment of the present invention.

Embodiment 13 of the present invention is described with reference to FIG. 29. FIG. 29 shows an example of the procedure whose effects are improved by combining embodiment 11 and embodiment 12. Although not shown in the drawing, this process starts at power-on or insertion of an optical disc. When a focus lock-in instruction is issued by the electric circuit 153 of the optical data device (step 101), a focus lock-in operation is carried out without tilting of the objective lens 14 (step 102). The electric circuit 153 and the definition of "horizontality" are the same as those of embodiment 11. After the focus lock-in, the amount of the tilt of the disc is obtained (step 103).

Then, what position the objective lens is at relative to the optical disc is determined (step 104*a*). The difference from embodiments 11 and 12 is this step. It is determined what position the objective lens 14 is at relative to the optical disc. It is determined whether the radial distance from the center of the optical disc is smaller or greater than predetermined radial distance R0. If it is greater than R0, it is further determined whether or not a region on which the laser light emitted from the objective lens is impinging is the above-described special-purpose region (step 104*b*). If it is not the special-purpose region, the lens is tilted according to the disc tilt amount (step 105), and recording or reading of data is carried out (step 107).

If the determination in step 104*a* as to whether the radial distance from the center of the optical disc to the objective lens 14 is smaller or greater than predetermined radial distance R0 results in that it is smaller than R0, or if the determination in step 104*b* as to whether or not a region on which the laser light emitted from the objective lens 14 is impinging is the above-described special-purpose region results in that it is the special-purpose region, the objective lens is kept horizontal (step 106), and recording or reading of data is carried out (step 107). Thus, if the lens position is within radial distance R0, or if the lens position is in the special-purpose region, recording or reading of signals is carried out while the objective lens is maintained horizontal. This arrangement enables to surely avoid the objective lens, or part of the lens holder of the objective lens, coming in contact with the protrusion 1001 of FIG. 42 to make a scratch in the portion of the contact or cause the control to deviate so that the operation of recording or reading of signals is interrupted.

The order of the operation in step 104*a* of determining what position the objective lens is at relative to the optical disc and the operation in step 104*b* of determining whether or not a region on which the laser light emitted from the objective lens is impinging is the above-described special-purpose region may be reversed.

If the actuator is instructed to move the objective lens from a position which is greater than R0 and which is outside the special-purpose region to a position which is smaller than R0 or a position which is within the special-purpose region, the actuator first stops tilting the lens, and moves the lens to the radial position which is smaller than R0 or the position which is within the special-purpose region after or while returning the objective lens to the horizontal attitude.

The process of obtaining the disc tilt amount at step 103 may be performed between the determination of the lens position at step 104*b* and the process of tilting the lens at step 105.

Although the optical disc 10 is a DVD in the above description, the tilt control of the present invention is effective and applicable even when the optical disc 10 is a HD-DVD in which the base layer thickness of 0.6 mm and a blue laser light source are used in combination. An example of the objective lens 14 in such a case is described with reference to FIG. 30. The diffraction element 131 is formed on a substrate which is transparent to incoming laser light 44 and has a concentric grating pattern.

The objective lens 14 is designed to have numerical aperture NA of 0.85 or larger, and designed such that, as shown in FIG. 30(*a*), the 0th order diffracted light which has passed through the diffraction element 131 without diffraction, irrespective of whether it has passed through an outer ring portion 45 or an inner ring portion 46, forms a spot of light condensed to the diffraction limit on a data layer of the optical disc 9 which has a base layer thickness (t3) of 0.1 mm. FIG. 30(*b*) shows that the objective lens is capable of forming a spot of light condensed to the diffraction limit on a data layer of the optical disc 10 having a thick substrate (thickness t2=0.6 mm). The +1st order diffracted light diffracted by the inner ring portion 46 of the diffraction element (hologram) 131 is condensed by the objective lens 14 on the optical disc 10. Here, the +1st order diffracted light 43 is aberration-corrected such that it can be condensed to the diffraction limit via the substrate of thickness t2.

Thus, by combining the diffraction element 131 which diffracts the incoming light and the objective lens 14, a complex objective lens which is capable of forming a spot of light condensed to the diffraction limit on respective one of the optical discs having different substrate thicknesses (t2 and t3) using diffracted light of different diffraction orders can be realized. On the contrary to the above, the diffraction element 131 may be designed so as to exert a convex lens action With this design, the 0th order diffracted light is used for an optical disc of thickness t3, and the +1st order diffracted light is used for an optical disc of thickness t2, whereby the variation of the focal position can be decreased against the wavelength variation which can occur in recording or reading of data in/from the optical disc of thickness t3.

Figure 31:
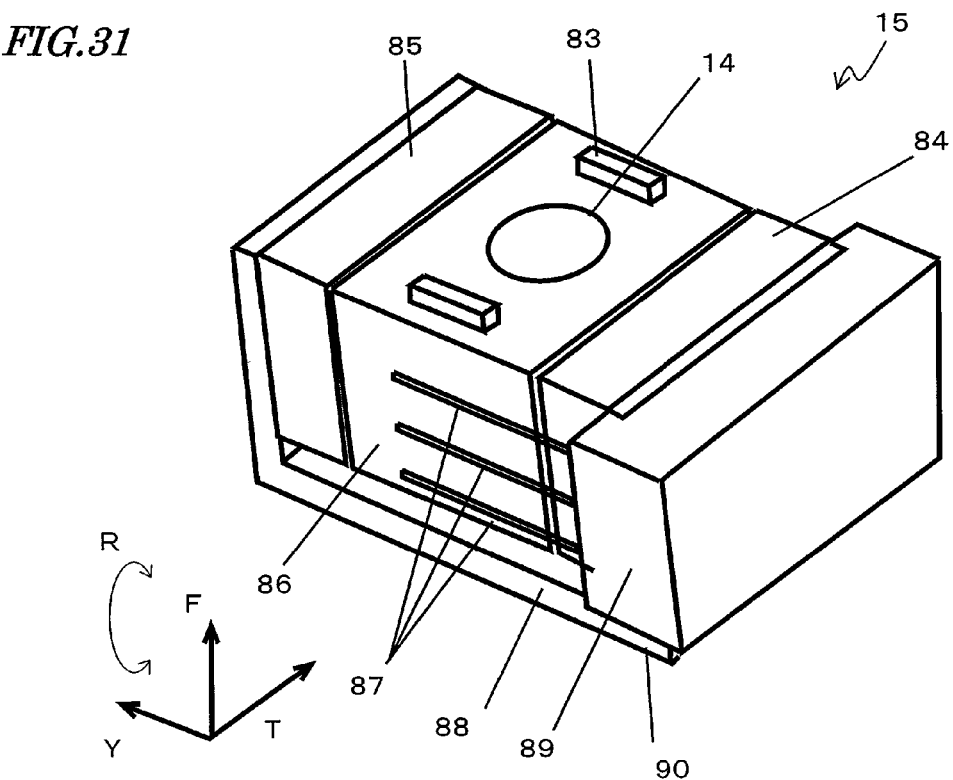
[FIG. 31] Diagram showing an objective lens actuator according to an embodiment of the present invention.

Next, an example of the objective lens actuator 15 which includes the objective lens 14 and which is configured to move the objective lens 14 in the optical axis direction and a direction perpendicular to the optical axis direction or to tilt the objective lens 14. The objective lens actuator 15 adjusts the tilt of the objective lens 14. Note that the present application is not limited to the use of this objective lens actuator configuration. In FIG. 31, F denotes the focusing direction, T denotes the tracking direction (the radial direction of the optical disc), Y denotes the tangential direction of an optical disc (not shown), and R denotes the tilt direction which is the direction of rotation around the Y-axis. Focusing direction F, tracking direction T, and direction Y are orthogonal to one another and correspond to the directions of the respective coordinate axes of a three-dimensional rectangular coordinate system.

A lens holder 86 is formed by resin molding. The lens holder 86 includes the objective lens 14. The lens holder 86 has a first focus coil, a second focus coil, and a tracking coil, although not shown. Six wires 87 are provided for powering these three coils, only three of which are shown in the drawing. The unshown three wires are provided on the opposite face.

A first magnet 84 and a second magnet 85 are magnetized so as to have four regions of different polarities which are defined by two lines extending in focusing direction F and tracking direction T. A suspension holder 89 is fixed to a base 90. The wires 87 are made of an elastic metal material, such as beryllium copper or phosphor bronze, and are in the form of wires or poles which have a circular, generally-polygonal, or oval cross-sectional shape. The support center of the wires 87 on the lens holder 86 is generally coincident with the center of mass of a movable element. The other end is fixed to the suspension holder 89. Reference numeral 83 denotes a buffer material for avoiding formation of a scratch even if the movable element should come in contact with the optical disc, which is formed of a soft material.

Flowing different amounts of currents through the first focus coil and the second focus coil of the objective lens actuator enables tilting of the objective lens 14 in the R direction.

(Embodiment 14)

Figure 32:
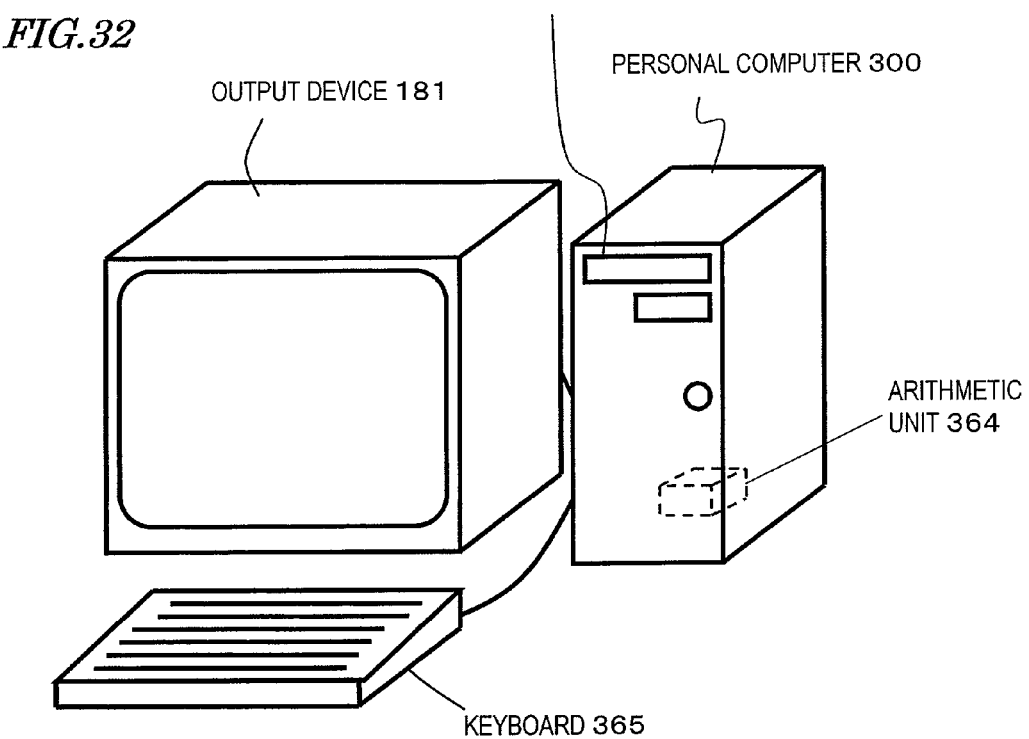
[FIG. 32] Diagram showing a computer according to an embodiment of the present invention.

FIG. 32 shows a computer 300 which includes the optical data device 167 according to an embodiment of the present invention.

A computer, an optical disc player, an optical disc recorder which includes the optical data device 167 of the above-described embodiment, or which employs the above-described data recording or reading method, are capable of stable recording or reading of data in/from different types of optical discs and are therefore advantageously applicable to a wide variety of uses.

In FIG. 32, the computer 300 includes the optical data device 167, an input device 365 for inputting data, such as a keyboard, mouse, touch panel, or the like, an arithmetic unit 364, such as a central processing unit (CPU), which is configured to carry out arithmetic operations based on data input via the input device, data read out by the optical data device 167, etc. Result data, such as results of the arithmetic operations in the arithmetic unit, are displayed via an output device 181, such as a cathode-ray tube monitor, a liquid crystal display, a printer, etc.

(Embodiment 15)

Figure 33:
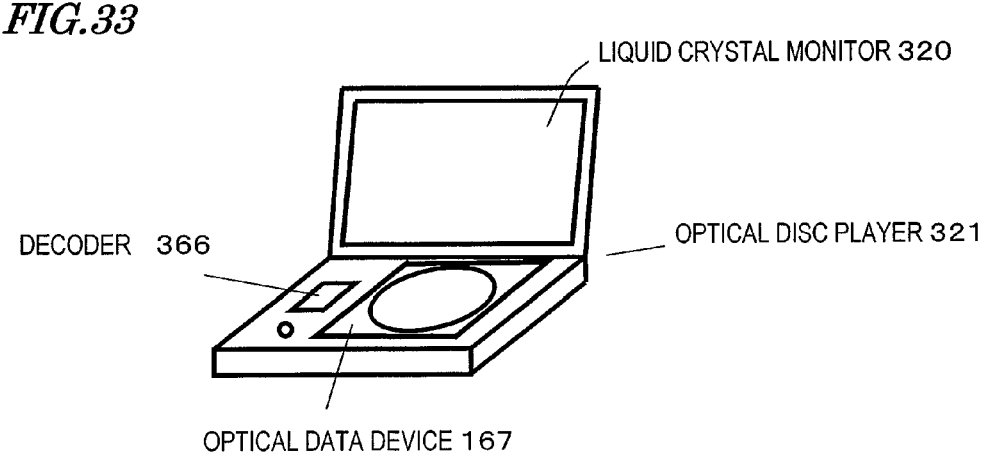
[FIG. 33] Diagram showing an optical disc player (vehicle navigation system) according to an embodiment of the present invention.

FIG. 33 shows an optical disc player 321 which includes the optical data device 167 according to an embodiment of the present invention.

In FIG. 33, the optical disc player 321 includes the optical data device 167 and a converter 366 for converting data signals obtained from the optical data device 167 to image data, such as a decoder. Also, this configuration can be used as a vehicle navigation system. A configuration of the embodiment which further includes a display device 320, such as a liquid crystal monitor, is also possible.

(Embodiment 16)

Figure 34:
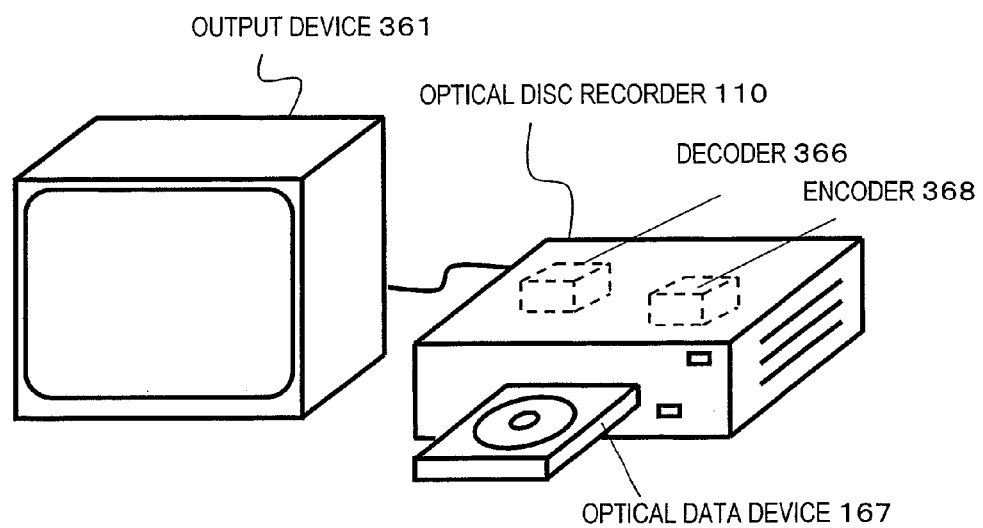
[FIG. 34] Diagram showing an optical disc recorder according to an embodiment of the present invention.

FIG. 34 shows an optical disc recorder 110 which includes the optical data device 167 according to an embodiment of the present invention.

In FIG. 34, the optical disc recorder 110 includes the optical data device 167 and a converter 368 for converting image data to a form of data which can be recorded by the optical data device 167 in an optical disc, such as an encoder. Desirably, the optical disc recorder 110 may further include a converter 366 for converting data signals obtained from the optical data device 167 to image data, such as a decoder. Playing video data on a monitor while recording of the video data in a disc is carried out on the other hand, or playing back data which has already been stored in a disc, is also possible. The optical disc recorder 110 may include an output device 361, such as a cathode-ray tube monitor or a liquid crystal display for displaying data, a printer, etc.

(Embodiment 17)

Figure 35:
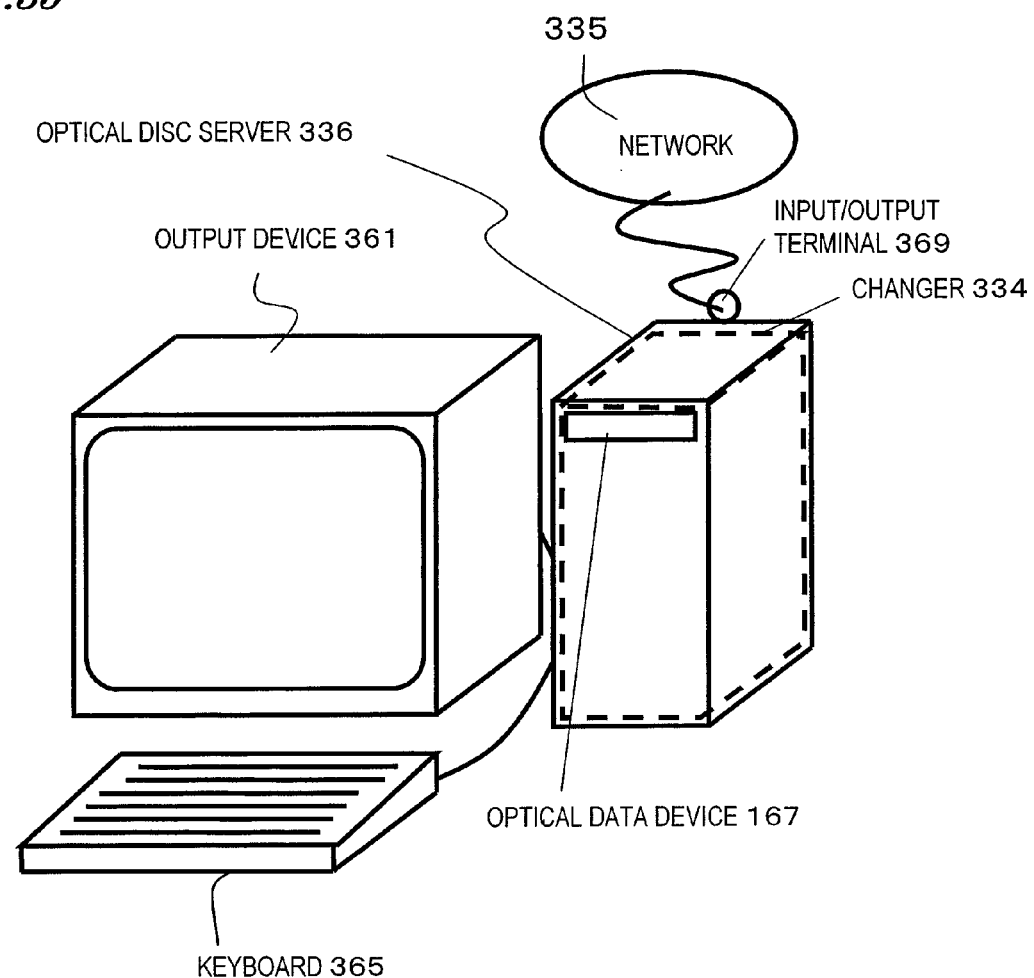
[FIG. 35] Diagram showing an optical disc server according to an embodiment of the present invention.

FIG. 35 shows an optical disc server 336 which includes the optical data device 167 according to an embodiment of the present invention. Input/output terminal 369 is a wired or wireless input/output terminal through which data to be recorded in the optical data device 167 is taken in, and data read out by the optical data device 167 is output to an external device. This configuration enables communication of data with a plurality of devices, such as a computer, a telephone set, a television tuner, etc., across a network, and can serve as a shared data server (optical disc server) among the plurality of devices. The optical disc server is capable of stable recording or reading of data in/from different types of optical discs and are therefore advantageously applicable to a wide variety of uses. The optical disc server may include an output device 361, such as a cathode-ray tube monitor or a liquid crystal display for displaying data, a printer, etc.

The optical disc server may further include a changer 334 for controlling insertion and removal of a plurality of optical discs in/from the optical data device 167, which advantageously enables storage or accumulation of a larger amount of data.

(Embodiment 18)

Figure 36:
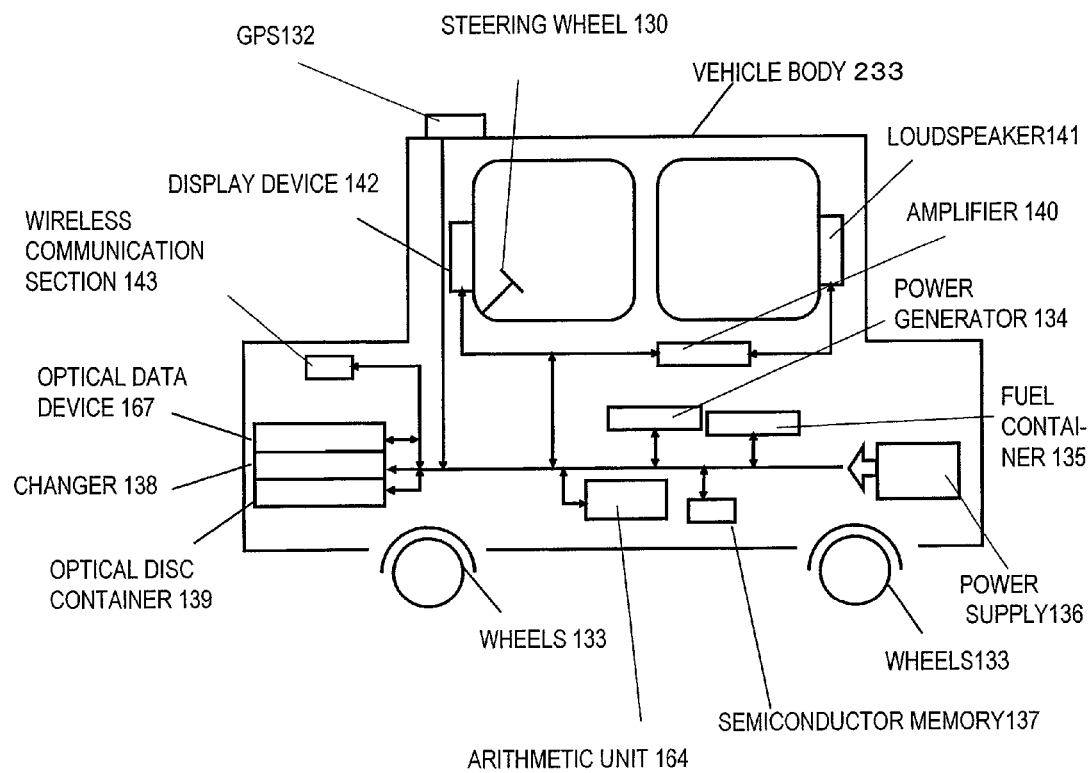
[FIG. 36] Diagram showing a vehicle according to an embodiment of the present invention.

FIG. 36 shows a vehicle (vehicle body) 233 which includes the optical data device 167 according to an embodiment of the present invention. A power generator 134 generates the power for moving the vehicle body 233. The vehicle body 233 includes a fuel container 135 for storing a fuel which is to be supplied to the power generator 134, and a power supply 136. Installing the optical data device 167 in the vehicle body 233 advantageously enables a user in the vehicle body to stably obtain data from various types of optical discs or store data. In the case where it is a train car or an automobile, it may further include wheels 133 for traveling. In the case where it is an automobile, it may further include a steering wheel 130.

The vehicle may further include a changer 138 or an optical disc container 139, so that a plurality of optical discs are easily usable. The vehicle may further include an arithmetic unit 164 which is, for example, configured to process data obtained from an optical disc into image data, a semiconductor memory 137 for temporarily storing data, and a display device 142. This configuration is capable of playing video data obtained from an optical disc. The vehicle may further include an amplifier 140 and a loudspeaker 141. This configuration is capable of playing sound data or music data obtained from an optical disc. The vehicle may further include a position sensor, such as a GPS terminal 132. This configuration is capable of notifying a user about the current position and the traveling direction in the form of images displayed on the display device 142 or sound messages emitted from the loudspeaker 141 together with map data retrieved from an optical disc. The vehicle may further include a wireless communication section 143. This configuration is capable of obtaining data from external data sources and using the obtained data complementarily to the data retrieved from an optical disc.

In embodiments 14 to 17 described above, FIG. 32 to FIG. 35 show the output devices 181, 361 or the liquid crystal monitor 320. However, as a matter of course, a form of product in the market which has an output terminal but does not have an output device or liquid crystal monitor that is to be separately sold is possible. Although FIG. 33 and FIG. 34 do not show an input device, a form of product in the market which has an input device, such as a keyboard, touch panel, mouse, remote controller, or the like, is also possible. On the contrary, in embodiments 14 to 17 described above, a form of product which only has an input terminal, excluding an input device that is to be separately sold, is also possible.

The above-described devices and vehicles of embodiments 14 to 18 have a function of recording or reading data in/from a data medium using light and therefore may be generically referred to as optical data apparatuses.

Industrial Applicability

An optical head device according to the present invention is capable of recording or reading of data in/from a plurality of types of optical discs which are different in base layer thickness, applicable wavelength, recording density, etc. A multiple compatibility optical data device which uses this optical head device is compatible with optical discs of multiple standards, such as CD, DVD, BD, etc. Therefore, they are applicable to every systems which are capable of storing data, such as computers, optical disc players, optical disc recorders, vehicle navigation systems, editing systems, data servers, AV components, vehicles, etc.

The invention claimed is:

1. A complex objective lens, comprising:
a diffraction element; and
a refractive lens,
wherein the diffraction element includes a first grating,
a cross-sectional shape of the first grating is a stepped shape where one step difference is d1,
the one step difference d1 is a value between a largest one and a smallest one among multiples of (J×λ1), (K×λ2), and (L×λ3) by a factor of 1/(M×(nc−1)),
(J×λ1), (K×λ2), and (L×λ3) are substantially equal,
(J, K, L)=(6, 4, 3) and
M is 5
where J, K, L, M are natural numbers which meet J>M>K>L,
M is a number of step levels in one period of the first grating, and
nc is a value between a largest one and a smallest one among refractive indices of a material of the diffraction element for blue light at wavelength λ1, red light at wavelength λ2, and infrared light at wavelength λ3.

2. A complex objective lens, comprising:
a diffraction element; and
a refractive lens,
wherein the diffraction element includes a first grating,
a cross-sectional shape of the first grating is a stepped shape where one step difference is d1,
the one step difference d1 is a value between a largest one and a smallest one among multiples of (J×λ1), (K×λ2), and (L×λ3) by a factor of 1/(M×(nc−1)),
(J×λ1), (K×λ2), and (L×λ3) are substantially equal, and
(J, K, L)=(8, 5, 4)
where J, K, L, M are natural numbers which meet J>M>K>L,
M is a number of step levels in one period of the first grating, and
nc is a value between a largest one and a smallest one among refractive indices of a material of the diffraction element for blue light at wavelength λ1, red light at wavelength λ2, and infrared light at wavelength λ3.

3. The complex objective lens of claim 2, wherein M is 6.
4. The complex objective lens of claim 2, wherein M is 7.
5. A complex objective lens, comprising:
a diffraction element; and
a refractive lens,
wherein the diffraction element includes a first grating,
a cross-sectional shape of the first grating is a stepped shape where one step difference is d1,
the one step difference d1 is a value between a largest one and a smallest one among multiples of (J×λ1), (K×λ2), and (L×λ3) by a factor of 1/(M×(nc−1)),
(J×λ1), (K×λ2), and (L×λ3) are substantially equal,
(J, K, L)=(10, 6, 5) and
M is 9
where J, K, L, M are natural numbers which meet J>M>K>L,
M is a number of step levels in one period of the first grating, and
nc is a value between a largest one and a smallest one among refractive indices of a material of the diffraction element for blue light at wavelength λ1, red light at wavelength λ2, and infrared light at wavelength λ3.

6. The complex objective lens of claim 1, wherein
the blue light undergoes a convex lens action of the diffraction element, and
the red light and the infrared light undergo a concave lens action of the diffraction element.

7. The complex objective lens of claim 2, wherein
the blue light undergoes a convex lens action of the diffraction element, and
the red light and the infrared light undergo a concave lens action of the diffraction element.

8. The complex objective lens of claim 3, wherein
the blue light undergoes a convex lens action of the diffraction element, and
the red light and the infrared light undergo a concave lens action of the diffraction element.

9. The complex objective lens of claim 4, wherein
the blue light undergoes a convex lens action of the diffraction element, and
the red light and the infrared light undergo a concave lens action of the diffraction element.

10. The complex objective lens of claim 5, wherein
the blue light undergoes a convex lens action of the diffraction element, and
the red light and the infrared light undergo a concave lens action of the diffraction element.

11. The complex objective lens of claim 1, wherein
a focal length for the red light is longer than a focal length for the blue light, and
a focal length for the infrared light is longer than a focal length for the red light.

12. The complex objective lens of claim 2, wherein
a focal length for the red light is longer than a focal length for the blue light, and
a focal length for the infrared light is longer than a focal length for the red light.

13. The complex objective lens of claim 3, wherein
a focal length for the red light is longer than a focal length for the blue light, and
a focal length for the infrared light is longer than a focal length for the red light.

14. The complex objective lens of claim 4, wherein
a focal length for the red light is longer than a focal length for the blue light, and
a focal length for the infrared light is longer than a focal length for the red light.

15. The complex objective lens of claim 5, wherein
a focal length for the red light is longer than a focal length for the blue light, and
a focal length for the infrared light is longer than a focal length for the red light.

16. The complex objective lens of claim 1, wherein
the diffraction element is provided on a surface of the objective lens.

17. The complex objective lens of claim 2, wherein
the diffraction element is provided on a surface of the objective lens.

18. The complex objective lens of claim 3, wherein
the diffraction element is provided on a surface of the objective lens.

19. The complex objective lens of claim 4, wherein
the diffraction element is provided on a surface of the objective lens.

20. The complex objective lens of claim 5, wherein
the diffraction element is provided on a surface of the objective lens.

21. An optical head device which includes the complex objective lens of claim 1, the optical head device comprising:
a first light source configured to emit blue light at wavelength $\lambda 1$;
a second light source configured to emit red light at wavelength $\lambda 2$; and
a third light source configured to emit infrared light at wavelength $\lambda 3$;
wherein the complex objective lens is configured to
condense the blue light emitted from the first light source on a data layer of a first data medium via a base layer of thickness t1,
condense the red light emitted from the second light source on a data layer of a second data medium via a base layer of thickness t2, and
condense the infrared light emitted from the third light source on a data layer of a third data medium via a base layer of thickness t3, and
the optical head device further includes a photodetection section which is configured to receive reflected light from the first, second, and third data media and output an electric signal according to an amount of the received light, and
$t1<t2<t3$.

22. An optical head device which includes the complex objective lens of claim 2, the optical head device comprising:
a first light source configured to emit blue light at wavelength $\lambda 1$;
a second light source configured to emit red light at wavelength $\lambda 2$; and
a third light source configured to emit infrared light at wavelength $\lambda 3$;
wherein the complex objective lens is configured to
condense the blue light emitted from the first light source on a data layer of a first data medium via a base layer of thickness t1,
condense the red light emitted from the second light source on a data layer of a second data medium via a base layer of thickness t2, and
condense the infrared light emitted from the third light source on a data layer of a third data medium via a base layer of thickness t3, and
the optical head device further includes a photodetection section which is configured to receive reflected light from the first, second, and third data media and output an electric signal according to an amount of the received light, and
$t1<t2<t3$.

23. An optical head device which includes the complex objective lens of claim 3, the optical head device comprising:
a first light source configured to emit blue light at wavelength $\lambda 1$;
a second light source configured to emit red light at wavelength $\lambda 2$; and
a third light source configured to emit infrared light at wavelength $\lambda 3$;
wherein the complex objective lens is configured to
condense the blue light emitted from the first light source on a data layer of a first data medium via a base layer of thickness t1,
condense the red light emitted from the second light source on a data layer of a second data medium via a base layer of thickness t2, and
condense the infrared light emitted from the third light source on a data layer of a third data medium via a base layer of thickness t3, and
the optical head device further includes a photodetection section which is configured to receive reflected light from the first, second, and third data media and output an electric signal according to an amount of the received light, and
$t1<t2<t3$.

24. An optical head device which includes the complex objective lens of claim 4, the optical head device comprising:
a first light source configured to emit blue light at wavelength $\lambda 1$;
a second light source configured to emit red light at wavelength $\lambda 2$; and
a third light source configured to emit infrared light at wavelength $\lambda 3$;
wherein the complex objective lens is configured to
condense the blue light emitted from the first light source on a data layer of a first data medium via a base layer of thickness t1,
condense the red light emitted from the second light source on a data layer of a second data medium via a base layer of thickness t2, and
condense the infrared light emitted from the third light source on a data layer of a third data medium via a the optical head device further includes a photodetection section which is configured to receive reflected light from the first, second, and third data media and output an electric signal according to an amount of the received light, and t1<t2<t3.

25. An optical head device which includes the complex objective lens of claim 5, the optical head device comprising:

a first light source configured to emit blue light at wavelength λ1;

a second light source configured to emit red light at wavelength λ2; and a third light source configured to emit infrared light at wavelength λ3;

wherein the complex objective lens is configured to
condense the blue light emitted from the first light source on a data layer of a first data medium via a base layer of thickness t1,
condense the red light emitted from the second light source on a data layer of a second data medium via a base layer of thickness t2, and condense the infrared light emitted from the third light source on a data layer of a third data medium via a base layer of thickness t3, and the optical head device further includes a photodetection section which is configured to receive reflected light from the first, second, and third data media and output an electric signal according to an amount of the received light, and t1<t2<t3.

26. An optical data device, comprising:

the optical head device of claim 21;

a motor for spinning the first, second, and third data media; and an electric circuit for controlling and driving the motor, the complex objective lens, and the first, second, and third light sources based on a signal obtained from the optical head device.

27. An optical data device, comprising:

the optical head device of claim 22;

a motor for spinning the first, second, and third data media; and an electric circuit for controlling and driving the motor, the complex objective lens, and the first, second, and third light sources based on a signal obtained from the optical head device.

28. An optical data device, comprising:

the optical head device of claim 23;

a motor for spinning the first, second, and third data media; and an electric circuit for controlling and driving the motor, the complex objective lens, and the first, second, and third light sources based on a signal obtained from the optical head device.

29. An optical data device, comprising:

the optical head device of claim 24;

a motor for spinning the first, second, and third data media; and an electric circuit for controlling and driving the motor, the complex objective lens, and the first, second, and third light sources based on a signal obtained from the optical head device.

30. An optical data device, comprising:

the optical head device of claim 25;

a motor for spinning the first, second, and third data media; and an electric circuit for controlling and driving the motor, the complex objective lens, and the first, second, and third light sources based on a signal obtained from the optical head device.

* * * * *